United States Patent
Marcouiller et al.

(10) Patent No.: US 11,327,248 B2
(45) Date of Patent: *May 10, 2022

(54) OPTICAL ASSEMBLIES WITH MANAGED CONNECTIVITY

(71) Applicants: CommScope Technologies LLC, Hickory, NC (US); CommScope Connectivity UK Limited, Swindon (GB)

(72) Inventors: Thomas Marcouiller, Shakopee, MN (US); Christopher Charles Taylor, Cheltenham Glos (GB); John T. Pfarr, Le Sueur, MN (US); Kristofer Bolster, Jordan, MN (US); Oscar Fernando Bran de Leon, Belle Plaine, MN (US); Loren J. Mattson, Richfield, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/995,219

(22) Filed: Aug. 17, 2020

(65) Prior Publication Data

US 2021/0033801 A1 Feb. 4, 2021

Related U.S. Application Data

(63) Continuation of application No. 16/388,983, filed on Apr. 19, 2019, now Pat. No. 10,746,943, which is a (Continued)

(51) Int. Cl.
*G02B 6/38* (2006.01)
*G02B 6/44* (2006.01)
(Continued)

(52) U.S. Cl.
CPC ......... *G02B 6/3879* (2013.01); *G02B 6/3817* (2013.01); *G02B 6/3825* (2013.01);
(Continued)

(58) Field of Classification Search
CPC .. G02B 6/3895; G02B 6/3879; G02B 6/4452; G02B 6/3825
See application file for complete search history.

(56) References Cited

U.S. PATENT DOCUMENTS

| 3,243,761 A | 3/1966 | Piorunneck |
|---|---|---|
| RE26,692 E | 10/1969 | Ruehlemann |

(Continued)

FOREIGN PATENT DOCUMENTS

| CA | 2499803 | 4/2004 |
|---|---|---|
| CN | 101650457 A | 2/2010 |

(Continued)

OTHER PUBLICATIONS

*Avaya's Enhanced SYSTIMAX® iPatch System Enables IT Managers to Optimise Network Efficiency and Cut Downtime*, Press Release, May 9, 2003, obtained from http://www.avaya.com/usa/about-avaya/newsroom/news-releases/2003/pr-030509 on Jan. 7, 2009.

(Continued)

*Primary Examiner* — Sung H Pak
(74) *Attorney, Agent, or Firm* — Merchant & Gould P.C.

(57) ABSTRACT

An adapter block assembly includes an adapter block, a circuit board arrangement, and a cover attached to the adapter block so that the circuit board arrangement is held to the adapter block by the cover. Contact assemblies can be disposed between the adapter block and the circuit board arrangement. The cover can be latched, heat staked, or otherwise secured to the adapter block. Each component of
(Continued)

the adapter block assembly can include one or more parts (e.g., multiple adapter blocks, multiple circuit boards, and/or multiple cover pieces).

20 Claims, 52 Drawing Sheets

Related U.S. Application Data continuation of application No. 15/722,648, filed on Oct. 2, 2017, now Pat. No. 10,268,000, which is a continuation of application No. 15/065,338, filed on Mar. 9, 2016, now Pat. No. 9,778,424, which is a continuation of application No. 14/169,912, filed on Jan. 31, 2014, now Pat. No. 9,285,552.

(60) Provisional application No. 61/843,718, filed on Jul. 8, 2013, provisional application No. 61/761,034, filed on Feb. 5, 2013.

(51) Int. Cl.
  *G02B 6/42* (2006.01)
  *H01R 12/72* (2011.01)
  *H01R 24/64* (2011.01)

(52) U.S. Cl.
  CPC ............ *G02B 6/3895* (2013.01); *G02B 6/428* (2013.01); *G02B 6/4261* (2013.01); *G02B 6/4452* (2013.01); *H01R 12/728* (2013.01); *H01R 24/64* (2013.01); *Y10T 29/49826* (2015.01)

(56) References Cited

U.S. PATENT DOCUMENTS

| | | |
|---|---|---|
| 3,954,320 A | 5/1976 | Hardesty |
| 4,127,317 A | 11/1978 | Tyree |
| 4,737,120 A | 4/1988 | Grabbe et al. |
| 4,953,194 A | 8/1990 | Hansen et al. |
| 4,968,929 A | 11/1990 | Hauck et al. |
| 5,041,005 A | 8/1991 | McHugh |
| 5,052,940 A | 10/1991 | Bengal |
| 5,064,381 A | 11/1991 | Lin |
| 5,107,075 A | 4/1992 | Currier, Jr. |
| 5,107,532 A | 4/1992 | Hansen et al. |
| 5,161,988 A | 11/1992 | Krupka |
| 5,166,970 A | 11/1992 | Ward |
| 5,199,895 A | 4/1993 | Chang |
| 5,222,164 A | 6/1993 | Bass, Sr. et al. |
| 5,265,187 A | 11/1993 | Morin et al. |
| 5,305,405 A | 4/1994 | Emmons et al. |
| 5,353,367 A | 10/1994 | Czosnowski et al. |
| 5,393,249 A | 2/1995 | Morgenstern et al. |
| 5,394,503 A | 2/1995 | Dietz, Jr. et al. |
| 5,413,494 A | 5/1995 | Dewey et al. |
| 5,418,334 A | 5/1995 | Williams |
| 5,419,717 A | 5/1995 | Abendschein et al. |
| 5,448,675 A | 9/1995 | Leone et al. |
| 5,467,062 A | 11/1995 | Burroughs et al. |
| 5,470,251 A | 11/1995 | Sano |
| 5,473,715 A | 12/1995 | Schofield et al. |
| 5,483,467 A | 1/1996 | Krupka et al. |
| 5,579,425 A | 11/1996 | Lampert et al. |
| 5,674,085 A | 10/1997 | Davis et al. |
| 5,685,741 A | 11/1997 | Dewey et al. |
| 5,712,942 A | 1/1998 | Jennings et al. |
| 5,800,192 A | 9/1998 | David et al. |
| 5,821,510 A | 10/1998 | Cohen et al. |
| 5,854,824 A | 12/1998 | Bengal et al. |
| 5,871,368 A | 2/1999 | Erdner et al. |
| 5,910,776 A | 6/1999 | Black |
| 6,002,331 A | 12/1999 | Laor |
| 6,095,837 A | 8/2000 | David et al. |
| 6,095,851 A | 8/2000 | Laity et al. |
| 6,116,961 A | 9/2000 | Henneberger et al. |
| 6,222,908 B1 | 4/2001 | Bartolutti et al. |
| 6,222,975 B1 | 4/2001 | Gilbert et al. |
| 6,227,911 B1 | 5/2001 | Boutros et al. |
| 6,234,830 B1 | 5/2001 | Ensz et al. |
| 6,238,235 B1 | 5/2001 | Shavit et al. |
| 6,280,231 B1 | 8/2001 | Nicholls |
| 6,285,293 B1 | 9/2001 | German et al. |
| 6,300,877 B1 | 10/2001 | Schannach et al. |
| 6,330,148 B1 | 12/2001 | Won et al. |
| 6,330,307 B1 | 12/2001 | Bloch et al. |
| 6,350,148 B1 | 2/2002 | Bartolutti et al. |
| 6,364,694 B1 | 4/2002 | Lien |
| 6,409,392 B1 | 6/2002 | Lampert et al. |
| 6,421,322 B1 | 7/2002 | Koziy et al. |
| 6,422,895 B1 | 7/2002 | Lien |
| 6,424,710 B1 | 7/2002 | Bartolutti et al. |
| 6,437,894 B1 | 8/2002 | Gilbert et al. |
| 6,456,768 B1 | 9/2002 | Boncek et al. |
| D466,479 S | 12/2002 | Pein et al. |
| 6,499,861 B1 | 12/2002 | German et al. |
| 6,511,231 B2 | 1/2003 | Lampert et al. |
| 6,522,737 B1 | 2/2003 | Bartolutti et al. |
| 6,554,484 B2 | 4/2003 | Lampert |
| 6,574,586 B1 | 6/2003 | David et al. |
| 6,612,856 B1 | 9/2003 | McCormack |
| 6,626,697 B1 | 9/2003 | Martin et al. |
| 6,636,152 B2 | 10/2003 | Schannach et al. |
| 6,684,179 B1 | 1/2004 | David |
| 6,725,177 B2 | 4/2004 | David et al. |
| 6,743,044 B2 | 6/2004 | Musolf et al. |
| 6,793,408 B2 | 9/2004 | Levy et al. |
| 6,802,735 B2 | 10/2004 | Pepe et al. |
| 6,808,116 B1 | 10/2004 | Eslambolchi et al. |
| 6,811,446 B1 | 11/2004 | Chang |
| 6,814,624 B2 | 11/2004 | Clark et al. |
| 6,850,685 B2 | 2/2005 | Tinucci et al. |
| 6,898,368 B2 | 5/2005 | Colombo et al. |
| 6,905,363 B2 | 6/2005 | Musolf et al. |
| 6,932,517 B2 | 8/2005 | Swayze et al. |
| D510,068 S | 9/2005 | Haggay et al. |
| 6,939,168 B2 | 9/2005 | Oleynick et al. |
| 6,961,675 B2 | 11/2005 | David |
| 6,971,895 B2 | 12/2005 | Sago et al. |
| 6,976,867 B2 | 12/2005 | Navarro et al. |
| 7,073,953 B2 | 7/2006 | Roth et al. |
| 7,077,710 B2 | 7/2006 | Haggay et al. |
| 7,081,808 B2 | 7/2006 | Colombo et al. |
| 7,088,880 B1 | 8/2006 | Gershman |
| 7,112,090 B2 | 9/2006 | Caveney et al. |
| 7,123,810 B2 | 10/2006 | Parrish |
| 7,153,142 B2 | 12/2006 | Shifris et al. |
| 7,165,728 B2 | 1/2007 | Durrant et al. |
| 7,193,422 B2 | 3/2007 | Velleca et al. |
| 7,207,819 B2 | 4/2007 | Chen |
| 7,210,858 B2 | 5/2007 | Sago et al. |
| 7,226,217 B1 | 6/2007 | Benton et al. |
| 7,234,944 B2 | 6/2007 | Nordin et al. |
| 7,241,157 B2 | 7/2007 | Zhuang et al. |
| 7,297,018 B2 | 11/2007 | Caveney et al. |
| 7,300,214 B2 | 11/2007 | Doo et al. |
| 7,312,715 B2 | 12/2007 | Shalts et al. |
| D559,186 S | 1/2008 | Kelmer |
| 7,315,224 B2 | 1/2008 | Gurovich et al. |
| 7,352,289 B1 | 4/2008 | Harris |
| 7,356,208 B2 | 4/2008 | Becker |
| 7,370,106 B2 | 5/2008 | Caveney |
| 7,384,300 B1 | 6/2008 | Salgado et al. |
| 7,396,245 B2 | 7/2008 | Huang et al. |
| 7,458,517 B2 | 12/2008 | Durrant et al. |
| 7,479,032 B2 | 1/2009 | Hoath et al. |
| 7,490,996 B2 | 2/2009 | Sommer |
| 7,497,709 B1 | 3/2009 | Zhang |
| 7,519,000 B2 | 4/2009 | Caveney et al. |
| 7,534,137 B2 | 5/2009 | Caveney et al. |
| 7,552,872 B2 | 6/2009 | Tokita et al. |
| 7,563,116 B2 | 7/2009 | Wang |

(56) References Cited

U.S. PATENT DOCUMENTS

| | | |
|---|---|---|
| 7,570,861 B2 | 8/2009 | Smrha et al. |
| 7,575,454 B1 | 8/2009 | Aoki et al. |
| 7,588,470 B2 | 9/2009 | Li et al. |
| 7,591,667 B2 | 9/2009 | Gatnau Navarro et al. |
| 7,607,926 B2 | 10/2009 | Wang |
| 7,635,280 B1 | 12/2009 | Crumlin et al. |
| 7,648,377 B2 | 1/2010 | Naito et al. |
| 7,682,174 B2 | 3/2010 | Chen |
| 7,722,370 B2 | 5/2010 | Chin |
| 7,727,026 B2 | 6/2010 | Qin et al. |
| 7,785,154 B2 | 8/2010 | Peng |
| 7,798,832 B2 | 9/2010 | Qin et al. |
| 7,811,119 B2 | 10/2010 | Caveney et al. |
| 7,814,240 B2 * | 10/2010 | Salgado ............ H01R 13/7035 710/15 |
| 7,867,017 B1 | 1/2011 | Chen |
| 7,869,426 B2 | 1/2011 | Hough et al. |
| 7,872,738 B2 | 1/2011 | Abbott |
| 7,880,475 B2 | 2/2011 | Crumlin et al. |
| 8,157,582 B2 | 4/2012 | Frey et al. |
| 8,282,425 B2 | 10/2012 | Bopp et al. |
| 8,287,316 B2 | 10/2012 | Pepe et al. |
| 8,596,882 B2 | 12/2013 | Smrha et al. |
| 8,690,593 B2 | 4/2014 | Anderson et al. |
| 9,128,262 B2 | 9/2015 | Campbell et al. |
| 9,285,552 B2 * | 3/2016 | Marcouiller ......... G02B 6/3825 |
| 9,778,424 B2 | 10/2017 | Marcouiller et al. |
| 10,268,000 B2 | 4/2019 | Marcouiller et al. |
| 10,746,943 B2 * | 8/2020 | Marcouiller ......... G02B 6/3879 |
| 2002/0008613 A1 | 1/2002 | Nathan et al. |
| 2002/0081076 A1 | 6/2002 | Lampert et al. |
| 2003/0031423 A1 | 2/2003 | Zimmel |
| 2004/0052471 A1 | 3/2004 | Colombo et al. |
| 2004/0052498 A1 | 3/2004 | Colombo et al. |
| 2004/0117515 A1 | 6/2004 | Sago et al. |
| 2004/0240807 A1 | 12/2004 | Frohlich et al. |
| 2005/0165710 A1 | 7/2005 | Givaty |
| 2005/0249477 A1 | 11/2005 | Parrish |
| 2006/0009061 A1 | 1/2006 | Machado et al. |
| 2006/0141871 A1 | 6/2006 | Sakamoto |
| 2006/0160395 A1 | 7/2006 | Macauley et al. |
| 2006/0193591 A1 | 8/2006 | Rapp et al. |
| 2006/0228086 A1 | 10/2006 | Holmberg et al. |
| 2007/0116411 A1 | 5/2007 | Benton et al. |
| 2007/0237470 A1 | 10/2007 | Aronson et al. |
| 2007/0254529 A1 | 11/2007 | Pepe et al. |
| 2008/0090450 A1 | 4/2008 | Harano et al. |
| 2008/0090454 A1 | 4/2008 | Hoath et al. |
| 2008/0100456 A1 | 5/2008 | Downie et al. |
| 2008/0100467 A1 | 5/2008 | Downie et al. |
| 2008/0175532 A1 | 7/2008 | Ruckstuhl et al. |
| 2008/0175550 A1 | 7/2008 | Coburn et al. |
| 2009/0034911 A1 | 2/2009 | Murano |
| 2009/0097846 A1 | 4/2009 | Kozischek et al. |
| 2009/0166404 A1 | 7/2009 | German et al. |
| 2009/0215310 A1 | 8/2009 | Hoath et al. |
| 2009/0232455 A1 | 9/2009 | Nhep |
| 2010/0048064 A1 | 2/2010 | Peng |
| 2010/0211664 A1 | 8/2010 | Raza et al. |
| 2010/0211665 A1 | 8/2010 | Raza et al. |
| 2010/0211697 A1 | 8/2010 | Raza et al. |
| 2010/0215049 A1 | 8/2010 | Raza et al. |
| 2010/0303421 A1 | 12/2010 | He et al. |
| 2011/0043371 A1 | 2/2011 | German et al. |
| 2011/0085774 A1 | 4/2011 | Murphy et al. |
| 2011/0092100 A1 | 4/2011 | Coffey et al. |
| 2011/0115494 A1 | 5/2011 | Taylor et al. |
| 2011/0116748 A1 | 5/2011 | Smrha et al. |
| 2011/0222819 A1 | 9/2011 | Anderson et al. |
| 2011/0235979 A1 | 9/2011 | Anderson et al. |
| 2011/0255829 A1 | 10/2011 | Anderson et al. |
| 2012/0003877 A1 | 1/2012 | Bareel et al. |
| 2012/0021636 A1 | 1/2012 | Debendictis et al. |
| 2012/0133524 A1 | 5/2012 | Anderson et al. |
| 2012/0168521 A1 | 7/2012 | Jones et al. |
| 2012/0208401 A1 | 8/2012 | Petersen |
| 2012/0322310 A1 | 12/2012 | Taylor |
| 2013/0071084 A1 | 3/2013 | Nhep |
| 2014/0023328 A1 | 1/2014 | Lambourn |
| 2014/0219615 A1 | 8/2014 | Petersen et al. |
| 2014/0220794 A1 | 8/2014 | Taylor et al. |
| 2014/0241691 A1 | 8/2014 | Solheid et al. |
| 2014/0286610 A1 | 9/2014 | Anderson et al. |

FOREIGN PATENT DOCUMENTS

| | | |
|---|---|---|
| CN | 202600189 U | 12/2012 |
| DE | 102 44 304 | 3/2004 |
| DE | 10 2004 033 940 A1 | 2/2006 |
| EP | 1 199 586 A2 | 4/2002 |
| EP | 1 237 024 A1 | 9/2002 |
| EP | 1 467 232 A1 | 10/2004 |
| EP | 1 662 287 A1 | 5/2006 |
| JP | 2004-165089 | 6/2004 |
| WO | WO 00/65696 | 11/2000 |
| WO | WO 02/47215 A1 | 6/2002 |
| WO | WO 2007/061490 A2 | 5/2007 |
| WO | WO 2010/001400 A1 | 1/2010 |
| WO | WO 2010/081186 A1 | 7/2010 |
| WO | WO 2010/121639 A1 | 10/2010 |
| WO | WO 2012/149020 A2 | 11/2012 |
| WO | WO 2014/009344 A1 | 1/2014 |

OTHER PUBLICATIONS

*Avaya's Enhanced SYSTIMAX® iPatch System Enables IT Managers to Optimise Network Efficiency and Cut Downtime*, Press Release, May 20, 2003, obtained from http://www.avaya.com/usa/about-avaya/newsroom/news-releases/2003/pr-030520 on Jan. 7, 2009.

European Search Report for Application No. 14749636.8 dated Jul. 26, 2016.

European Search Report for Application No. 14749636.8 dated Nov. 29, 2016.

Extended European Search Report for Application No. 20173538.8 dated Sep. 24, 2020.

FOCIS 10—Fiber Optic Connector Intermateability Standard—Type LC, TIA/EIA-604-10A, 38 pages (Mar. 2002).

*Intelligent patching systems carving out a 'large' niche*, Cabling Installation & Maintenance, vol. 12, Issue 7, Jul. 2004 (5 pages).

*IntelliMAC: The intelligent way to make Moves, Adds or Changes!* NORDX/CDT © 2003 (6 pages).

International Search Report and Written Opinion for PCT/US2014/014870 dated May 19, 2014.

ITRACS Physical Layer Manager FAQ, obtained on Jun. 11, 2008 from http://www.itracs.com/products/physical-layer-manager-faqs.html (6 pages).

Meredith, L., "Managers missing point of intelligent patching," *Daa Center News*, Jun. 21, 2005, obtained Dec. 2, 2008 from http://searchdatacenter.techtarget.com/news/article/0,289142,sid80_gcil099991,00.html.

Ohtsuki, F. et al., "Design of Optical Connectors with ID Modules," *Electronics and Communications in Japan*, Part 1, vol. 77, No. 2, pp. 94-105 (Feb. 1994).

*SYSTIMAX® iPatch System Wins Platinum Network of the Year Award*, Press Release, Jan. 30, 2003, obtained from http://www.avaya.com/usa/about-avaya/newsroom/news-releases/2003/pr-030130a on Jan. 7, 2009.

TrueNet; TFP Series Rack Mount Fiber Panels, Spec Sheet; May 2008; 8 pages.

* cited by examiner

OPTICAL ASSEMBLIES WITH MANAGED CONNECTIVITY

CROSS-REFERENCE TO RELATED APPLICATIONS

This application is a continuation of application Ser. No. 16/388,983, filed Apr. 19, 2019, now U.S. Pat. No. 10,746,943, which is a continuation of application Ser. No. 15/722,648, filed Oct. 2, 2017, now U.S. Pat. No. 10,268,000, which is a continuation of application Ser. No. 15/065,338, filed Mar. 9, 2016, now U.S. Pat. No. 9,778,424, which is a continuation of application Ser. No. 14/169,912, filed Jan. 31, 2014, now U.S. Pat. No. 9,285,552, which application claims the benefit of provisional application Ser. No. 61/843,718, filed Jul. 8, 2013, and titled "Optical Assemblies with Managed Connectivity;" and of provisional application Ser. No. 61/761,034, filed Feb. 5, 2013, and titled "Optical Assemblies with Managed Connectivity," which applications are incorporated herein by reference in their entirety.

BACKGROUND

In communications infrastructure installations, a variety of communications devices can be used for switching, cross-connecting, and interconnecting communications signal transmission paths in a communications network. Some such communications devices are installed in one or more equipment racks to permit organized, high-density installations to be achieved in limited space available for equipment.

Communications devices can be organized into communications networks, which typically include numerous logical communication links between various items of equipment. Often a single logical communication link is implemented using several pieces of physical communication media. For example, a logical communication link between a computer and an inter-networking device such as a hub or router can be implemented as follows. A first cable connects the computer to a jack mounted in a wall. A second cable connects the wall-mounted jack to a port of a patch panel, and a third cable connects the inter-networking device to another port of a patch panel. A "patch cord" cross connects the two together. In other words, a single logical communication link is often implemented using several segments of physical communication media.

Network management systems (NMS) are typically aware of logical communication links that exist in a communications network, but typically do not have information about the specific physical layer media (e.g., the communications devices, cables, couplers, etc.) that are used to implement the logical communication links. Indeed, NMS systems typically do not have the ability to display or otherwise provide information about how logical communication links are implemented at the physical layer level.

SUMMARY

The present disclosure relates to communications connector assemblies and connector arrangements that provide physical layer management capabilities. In accordance with certain aspects, the disclosure relates to fiber optic connector assemblies and connector arrangements.

In accordance with some aspects of the disclosure, an optical adapter block assembly includes an adapter block, a circuit board arrangement, and a cover. The adapter block defines ports and apertures associated with the ports. Contact assemblies can be disposed in the apertures of the adapter block so that portions of each contact assembly extend into an interior of the adapter block. The circuit board arrangement has a first side including circuit board components and a second side configured to seat on the adapter block. The second side also is configured to electrically connect to the contact assemblies disposed in the apertures of the adapter block. The cover is configured to seat on the first side of the circuit board arrangement. The cover is attached to the adapter block so that the circuit board arrangement is held to the adapter block by the cover.

In certain examples, the cover is latched to the adapter block. In certain examples, the cover is heat staked to the adapter block.

In accordance with other aspects of the disclosure, an optical adapter block assembly includes a first adapter block, a second adapter block, and a connecting member that couples to a first side of the first adapter block and to a second side of the second adapter block to hold the first and second adapter blocks together as a unit. The first adapter block defines front ports at a front of the first adapter block and a rear ports at a rear of the first adapter block. The top of the first adapter block defines an aperture for each port of the first adapter block. The second adapter block defines front ports at a front of the second adapter block and rear ports at a rear of the second adapter block. The top of the second adapter block defines an aperture for each port of the second adapter block.

In accordance with other aspects of the disclosure, an optical adapter block assembly includes an adapter block, a circuit board arrangement, and a cover that is heat staked to the adapter block. The adapter block defines front and rear ports. The adapter block also defines apertures at a top of the adapter block with each aperture being associated with one of the front ports or rear ports. The adapter block also includes heat stakes extending upwardly from the top of the adapter block. The circuit board arrangement defines openings through which the heat stakes pass when the circuit board arrangement is disposed on the adapter block. The cover includes a top plate from which wells extend downwardly. The wells define through-holes and counter-bores through which the heat stakes extend when the cover is mounted to the adapter block. A tip of each heat stake is configured to be melted into the counter-bore of the respective well to secure the cover plate and the circuit board arrangement to the adapter block.

In certain examples, the heat stakes are positioned adjacent the apertures in the adapter block to hold the circuit board securely to the adapter block in the location of the apertures. Contact assemblies can be mounted in the apertures. Positioning the heat stakes at the apertures inhibits movement of the circuit board away from the adapter at the apertures that may otherwise be caused by deflection of the contact assemblies within the apertures.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

In general, media segments connect equipment of the communications network. Non-limiting examples of media segments include optical cables, electrical cables, and hybrid cables. This disclosure will focus on optical media segments. The media segments may be terminated with optical plug connectors, media converters, or other optical termination components.

Figure 1:
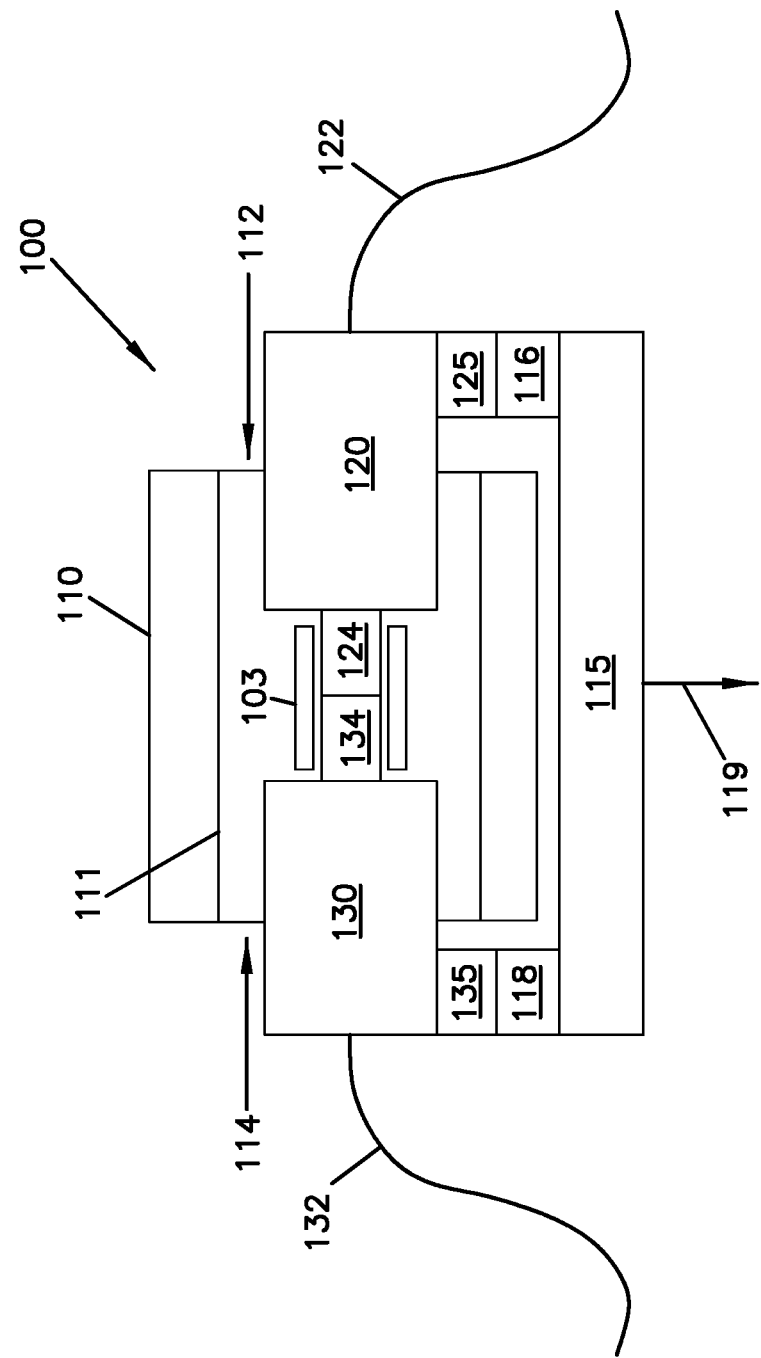
FIG. 1 is a schematic diagram showing two optical connectors with physical layer storage inserted at an optical adapter having media reading interfaces to access the physical layer storage of the connectors.
Figure 2:
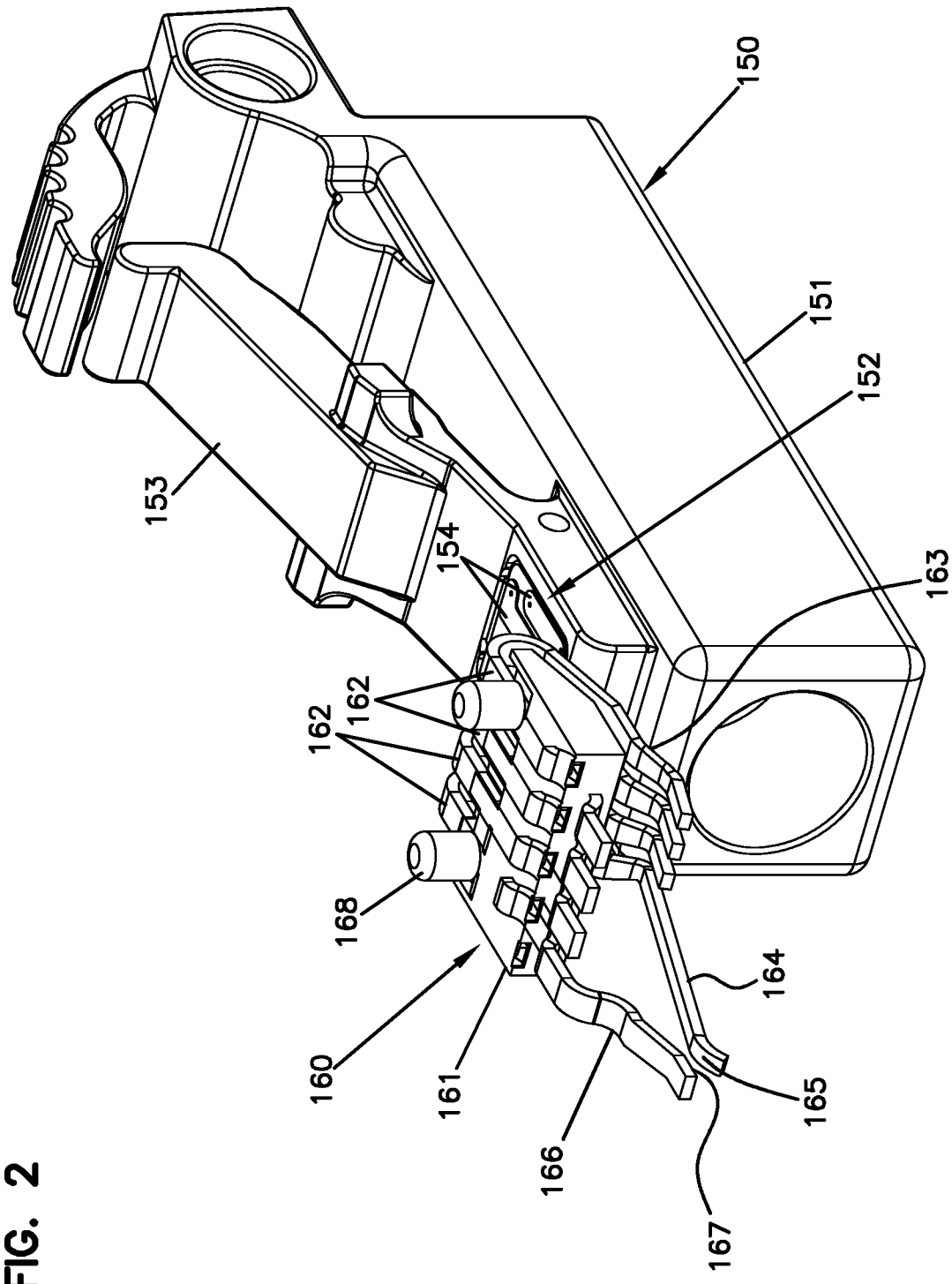
FIG. 2 is a perspective view of an example optical connector having physical layer storage aligned with an example contact assembly suitable for implementing a media reading interface.

FIG. 1 is a schematic diagram of one example connection system 100 including an adapter block assembly (e.g., optical adapters, electrical sockets, wireless readers, etc.) 110 at which communications signals from a first media segment (e.g., an optical fiber, an electrical conductor, a wireless transceiver, etc.) 122 pass to another media segment 132. In some implementations, the media segments 122, 132 are terminated by connector arrangements 120, 130, respectively. The example adapter block assembly 110 connects segments of optical communications media in an optical network. In other implementations, however, the adapter block assembly 110 can connect electrical segments, wireless segments, or some combination thereof.

The adapter block assembly 110 includes a fiber optic adapter defining at least one connection opening 111 having a first port end 112 and a second port end 114. A sleeve (e.g., a split sleeve) 103 is arranged within the connection opening 111 of the adapter 110 between the first and second port ends 112, 114. Each port end 112, 114 is configured to receive a connector arrangement 120. Each fiber connector arrangement 120, 130 includes a ferrule 124, 134 through which optical signals from the optical fiber 122, 132, respectively, pass. The ferrules 124, 134 are held and aligned by a sleeve 103 to allow optical signals to pass between the ferrules 124, 134. The aligned ferrules 124, 134 of the connector arrangements 120, 130 create an optical path along which the communication signals may be carried.

In accordance with aspects of the disclosure, the communications network is coupled to or incorporates a data management system that provides physical layer information (PLI) functionality as well as physical layer management (PLM) functionality. As the term is used herein, "PLI functionality" refers to the ability of a physical component or system to identify or otherwise associate physical layer information with some or all of the physical components used to implement the physical layer of the communications network. As the term is used herein, "PLM functionality" refers to the ability of a component or system to manipulate or to enable others to manipulate the physical components used to implement the physical layer of the communications network (e.g., to track what is connected to each component, to trace connections that are made using the components, or to provide visual indications to a user at a selected component).

As the term is used herein, "physical layer information" refers to information about the identity, attributes, and/or status of the physical components used to implement the physical layer of the communications network. Physical layer information of the communications network can include media information, device information, and location information. Media information refers to physical layer information pertaining to cables, plugs, connectors, and other such physical media. Non-limiting examples of media information include a part number, a serial number, a plug type, a conductor type, a cable length, cable polarity, a cable pass-through capacity, a date of manufacture, a manufacturing lot number, the color or shape of the plug connector, an insertion count, and testing or performance information. Device information refers to physical layer information pertaining to the communications panels, inter-networking devices, media converters, computers, servers, wall outlets, and other physical communications devices to which the media segments attach. Location information refers to physical layer information pertaining to a physical layout of a building or buildings in which the network is deployed.

In accordance with some aspects, one or more of the components (e.g., media segments, equipment, etc.) of the communications network are configured to store physical layer information pertaining to the component as will be disclosed in more detail herein. Some components include media reading interfaces that are configured to read stored physical layer information from the components. The physical layer information obtained by the media reading interface may be communicated over the network for processing and/or storage.

For example, the adapter block assembly 110 of FIG. 1 can be configured to collect physical layer information from the connector arrangements 120, 130 terminating one or more of the media segments 122, 132. In some implementations, the first connector arrangement 120 may include a storage device 125 that is configured to store physical layer information pertaining to the segment of physical communications media 122 and/or to the first connector arrangement 120. In certain implementations, the connector arrangement 130 also includes a storage device 135 that is configured to store information pertaining to the second connector arrangement 130 and/or to the second optic cable 132 terminated thereby.

In one implementation, each of the storage devices 125, 135 is implemented using an EEPROM (e.g., a PCB surface-mount EEPROM). In other implementations, the storage devices 125, 135 are implemented using other non-volatile memory device. Each storage device 125, 135 is arranged and configured so that it does not interfere or interact with the communications signals communicated over the media segments 122, 132.

In accordance with some aspects, the adapter 110 is coupled to at least a first media reading interface 116. In certain implementations, the adapter 110 also is coupled to at least a second media interface 118. In certain implementations, the adapter 110 is coupled to multiple media reading interfaces. In an example, the adapter 110 includes a media reading interface for each port end defined by the adapter 110. In another example, the adapter 110 includes a media reading interface for each connection opening 111 defined by the adapter 110. In other implementations, the adapter 110 can include any desired number of media reading interfaces 116, 118.

In some implementations, at least the first media reading interface 116 is mounted to a printed circuit board 115. In some implementations, the printed circuit board 115 also can include the second media reading interface 118. The printed circuit board 115 of the adapter 110 can be communicatively connected to one or more programmable processors and/or to one or more network interfaces (see data line 119 of FIG. 1). The network interface may be configured to send the physical layer information to a physical layer data management network. Examples of data management networks can be found in U.S. Provisional Application No. 61/760,816, filed Feb. 5, 2013, and titled "Systems and Methods for Associating Location Information with a Communication Sub-Assembly Housed within a Communication Assembly," the disclosures of which are hereby incorporated herein by reference.

When the first connector arrangement 120 is received in the first port end 112 of the adapter 110, the first media reading interface 116 is configured to enable reading (e.g., by an electronic processor) of the information stored in the storage device 125. The information read from the first connector arrangement 120 can be transferred through the printed circuit board 115 to the physical layer data management network. When the second connector arrangement 130 is received in the second port end 114 of the adapter 110, the second media reading interface 118 is configured to enable reading (e.g., by an electronic processor) of the information stored in the storage device 135. The information read from the second connector arrangement 130 can be transferred through the printed circuit board 115 or another circuit board to the physical layer data management network.

In some such implementations, the storage devices 125, 135 and the media reading interfaces 116, 118 each include at least three (3) leads—a power lead, a ground lead, and a data lead. The three leads of the storage devices 125, 135 come into electrical contact with three (3) corresponding leads of the media reading interfaces 116, 118 when the corresponding media segment is inserted in the corresponding port. In other example implementations, a two-line interface is used with a simple charge pump. In still other implementations, additional leads can be provided (e.g., for potential future applications). Accordingly, the storage devices 125, 135 and the media reading interfaces 116, 118 may each include four (4) leads, five (5) leads, six (6) leads, etc.

FIGS. 2-5 illustrate one example optical connector 150 suitable for implementing any of the connector arrangements 120, 130 of FIG. 1. The optical connector 150 includes a connector body 151 including a latch 153 or other securement feature that enables the connector 150 to be secured to an adapter port. In some implementations, the optical connector 150 includes a contact region 152 at which one or more electrical contacts 154 can be coupled to the connector body 151. For example, the contacts 154 can be laid on a circuit board that is mounted to or within the body 151. The contacts 154 are electrically coupled to a memory or storage device that holds physical layer information pertaining to the connector 150 and/or to an optical fiber terminated by the connector 150.

One example contact assembly 160 suitable for implementing any of the media reading interfaces 116, 118 of FIG. 1 also is shown. The contact assembly 160 includes a body 161 that holds one or more electrical contacts 162 together. Each of the contacts 162 includes a contact section 163 at which the contact 162 physically touches (e.g., presses against, swipes along, etc.) one of the contacts 154 at the connector contact region 152 when the connector 150 is brought into contact with the contact assembly 160 (see FIG. 5). For example, the contact sections 163 may touch the connector contacts 154 when the connector 150 is plugged into a corresponding port end of an optical adapter. When the connector 150 is brought into contact with the contact assembly 160, engagement with the connector contacts 154 causes the contact sections 163 of the contact assembly contacts 162 to deflect towards the body 161 (see FIG. 5).

Additional information about how physical layer information can be read from the plug connectors by the contact assemblies at adapters can be found in U.S. Publication No. 2011-0262077, the disclosure of which is hereby incorporated herein by reference.

Figure 3:
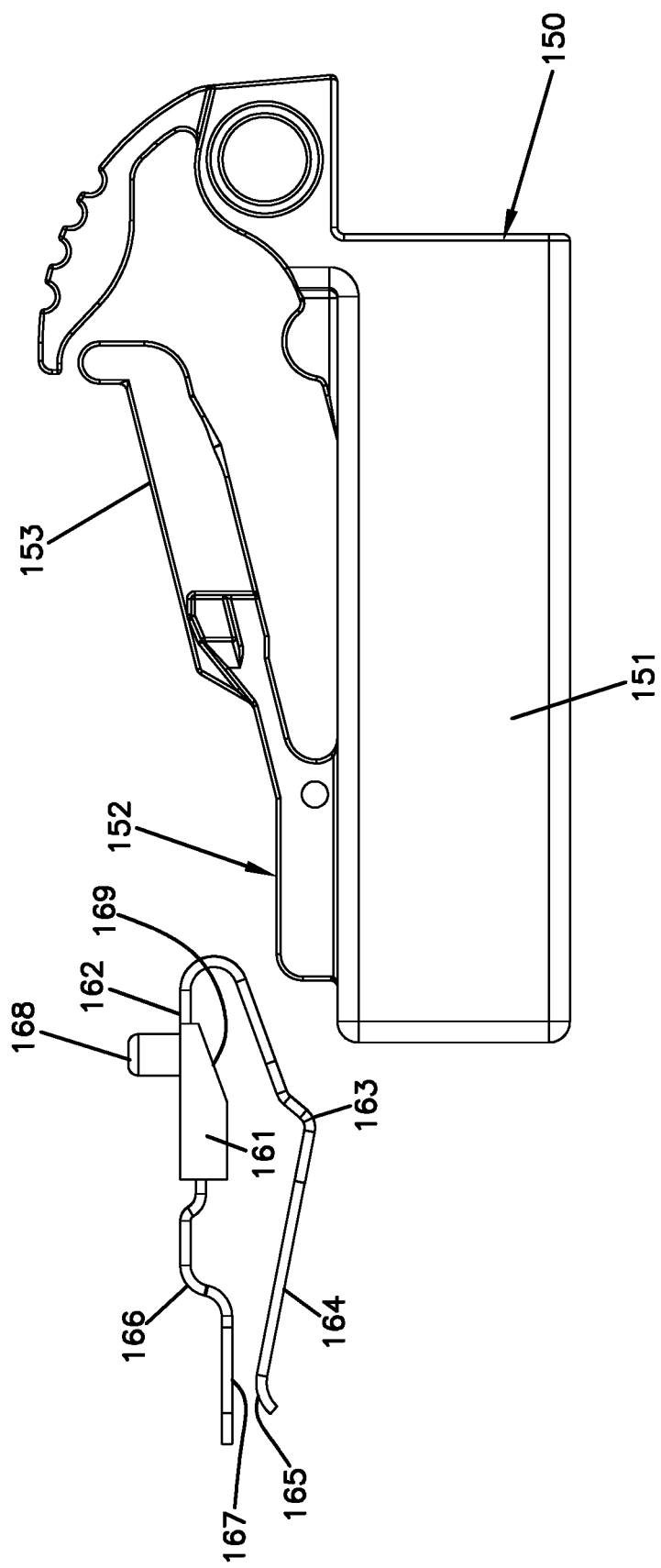
FIG. 3 is a side elevational view of FIG. 2.
Figure 4:
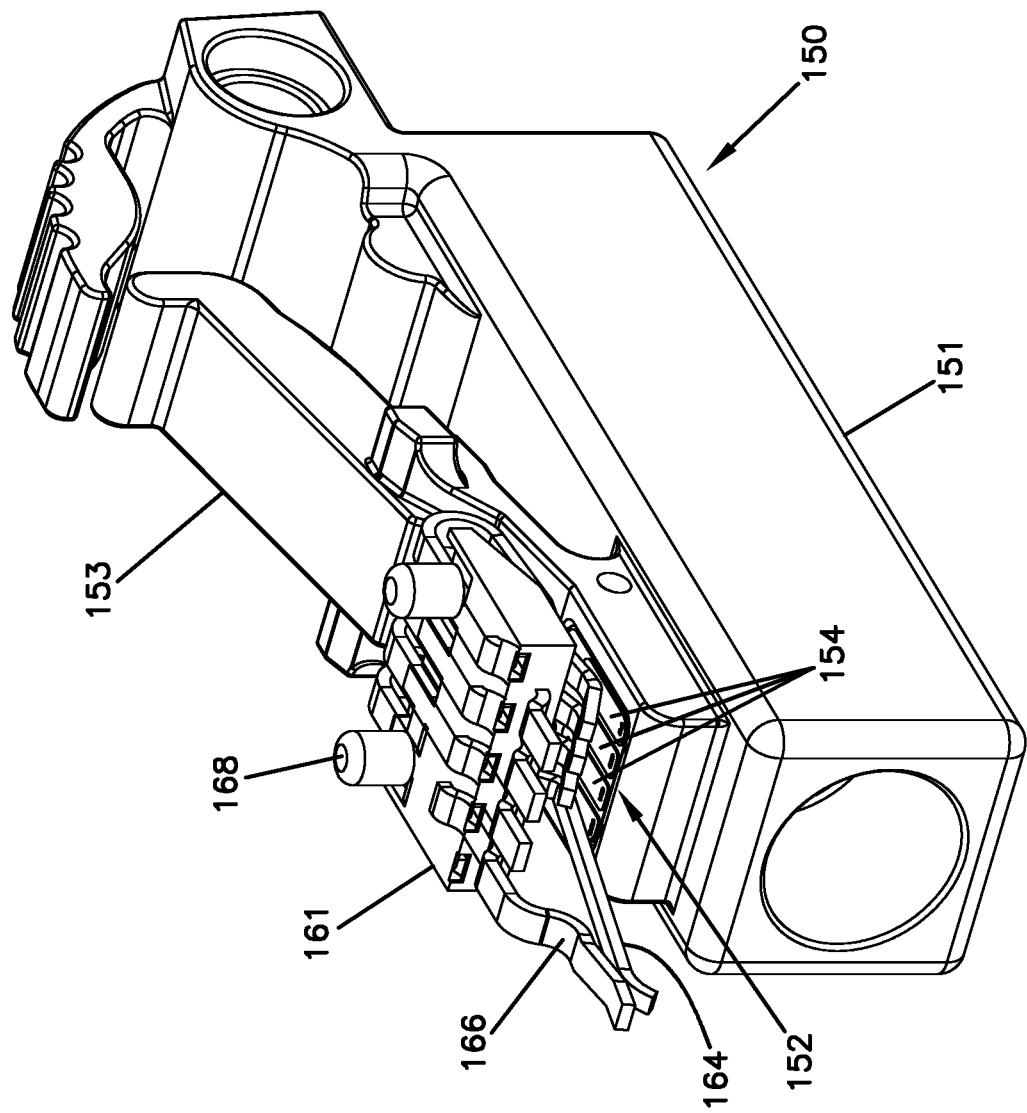
FIG. 4 is a perspective view of the example optical connector of FIG. 2 interacting with the contact assembly of FIG. 2.
Figure 5:
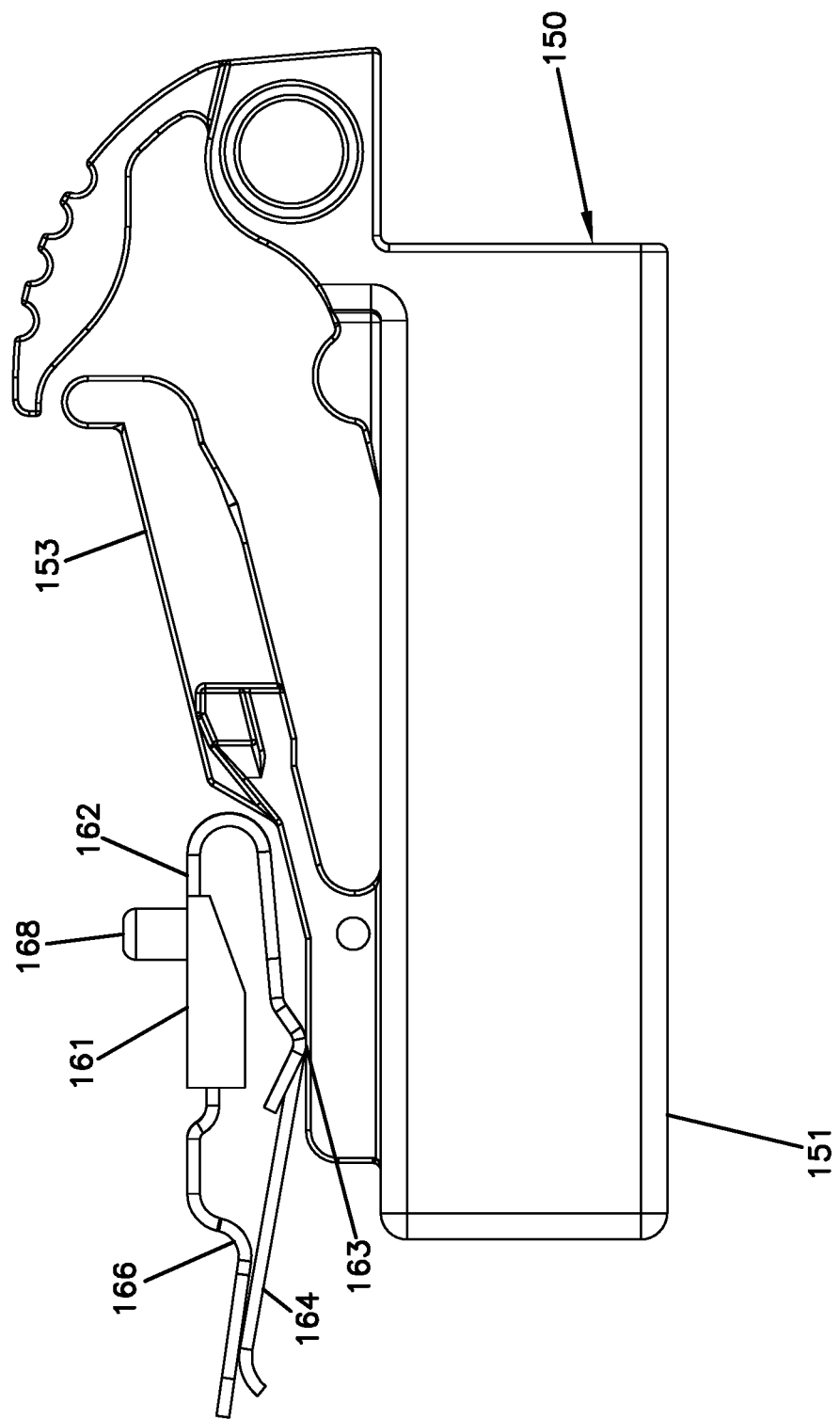
FIG. 5 is a side elevational view of FIG. 4.
Figure 6:
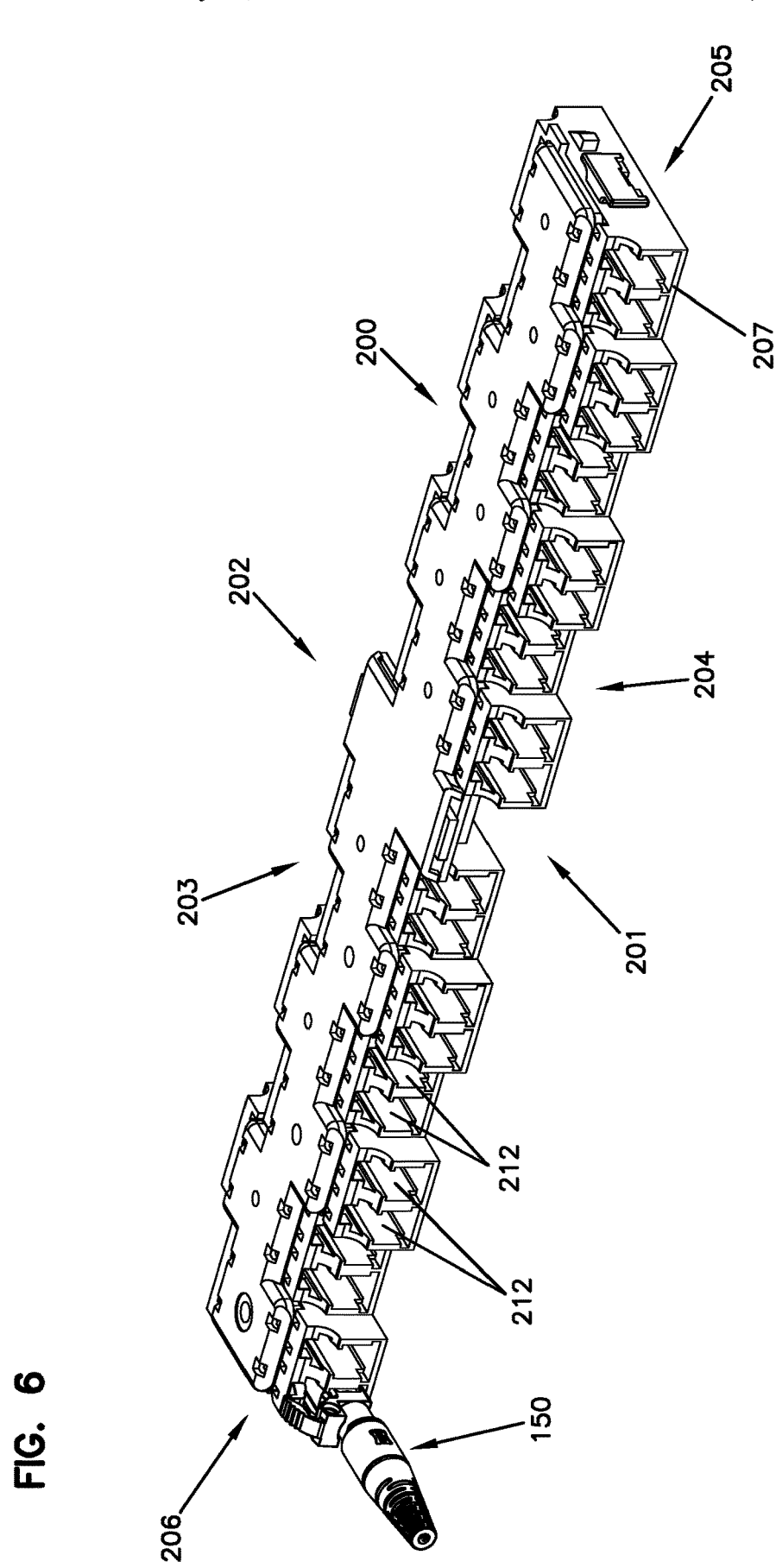
FIG. 6 is a front perspective view of a first example adapter block assembly including adapter blocks, a joining member, a circuit board, and a cover.

In some implementations, the contact assembly 160 includes a sensing contact 166 that extends outwardly from the body 161. A first of the contacts 162 includes an extension 164 that aligns with the sensing contact 166. When the optical connector 150 is spaced from the contact assembly 160, the extension 164 is spaced from the sensing contact 166 (FIG. 3). When the contact sections 163 of the contact assembly contacts 162 deflect towards the body 161, the extension 164 deflects towards the sensing contact 166. A first contact area 165 on the extension 164 touches (e.g., presses against, swipes along, etc.) a second contact area 167 on the sensing contact 166 (FIG. 5), thereby shorting the first contact 162 and the sensing contact 166 together. An electronic processor or other portion of the data management network determines when the contacts 162, 166 short together to identify when a connector 150 has been inserted into an adapter port.

In some implementations, the contact assembly body 161 is configured to be secured at an aperture defined in an adapter block. In other implementations, the contact assembly body 161 is configured to be secured to a circuit board or other surface. For example, in certain implementations, the body 161 can include one or more pegs 168 that extend outwardly from the body 161 to be received in apertures defined in the surface. In the example shown, the body 161 defines two pegs 168 extending away from the contact sections 163. In certain implementations, the contact assembly body 161 defines a tapered section 169 that accommodates deflection of the contacts 162 (e.g., when an optical connector 150 engages the contact assembly 160.

Further details regarding one example contact assembly suitable for use as contact assembly 160 are shown and described in copending U.S. Provisional Application No. 61/843,752, filed Jul. 8, 2013, and titled "Optical Assemblies with Managed Connectivity," the disclosure of which is hereby incorporated herein by reference.

In accordance with some aspects of the disclosure, one or more contact assemblies 160 can be mounted to an adapter block assembly. FIGS. 6-45 illustrate various example implementations of connector assemblies suitable for receiving the contact assemblies 160. Each adapter block assembly includes at least a first adapter block, at least a first circuit board, and at least a first cover. One or more contact assemblies 160 are disposed between the first adapter block and the first circuit board. In certain implementations, the first circuit board holds the contact assemblies 160 to the first adapter block. In some implementations, the first cover holds the first circuit board to the first adapter block. In other implementations, the first cover is mounted to the first circuit board. Certain type of connector assemblies can include multiple adapter blocks coupled together using a joining member. Certain type of connector assemblies can include multiple circuit boards held together by a single cover or multiple covers mounted to a single circuit board.

FIGS. 6-20 illustrate a first example adapter block assembly 200 suitable for implementing the adapter block assembly 110 of FIG. 1. The adapter block assembly 200 has a front 201, a rear 202, a top 203, a bottom 204, a first side 205, and a second side 206. A periphery 207 of the adapter block assembly 200 defined by the front 201, rear 202, and sides 205, 206 defines a staggered configuration. Ports 212 for receiving optical connectors (e.g., optical connectors 150) along insertion axes A (FIG. 11) are provided at the front 201 and rear 202 of the adapter block assembly 200. In some implementations, adjacent ports 212 are staggered forwardly/rearwardly relative to each other. In the example shown, adjacent pairs of ports 212 are staggered forwardly/rearwardly relative to each other. The staggering of the ports 212 enhances access to individual connectors 150 plugged into the ports 212.

Additional information about adapter blocks or other connector assemblies having staggered configurations can be found in U.S. Publication No. 2013-0183018, filed Jan. 9, 2013, and titled "Fiber Optic Adapter Block," the disclosure of which is hereby incorporated herein by reference.

Figure 7:
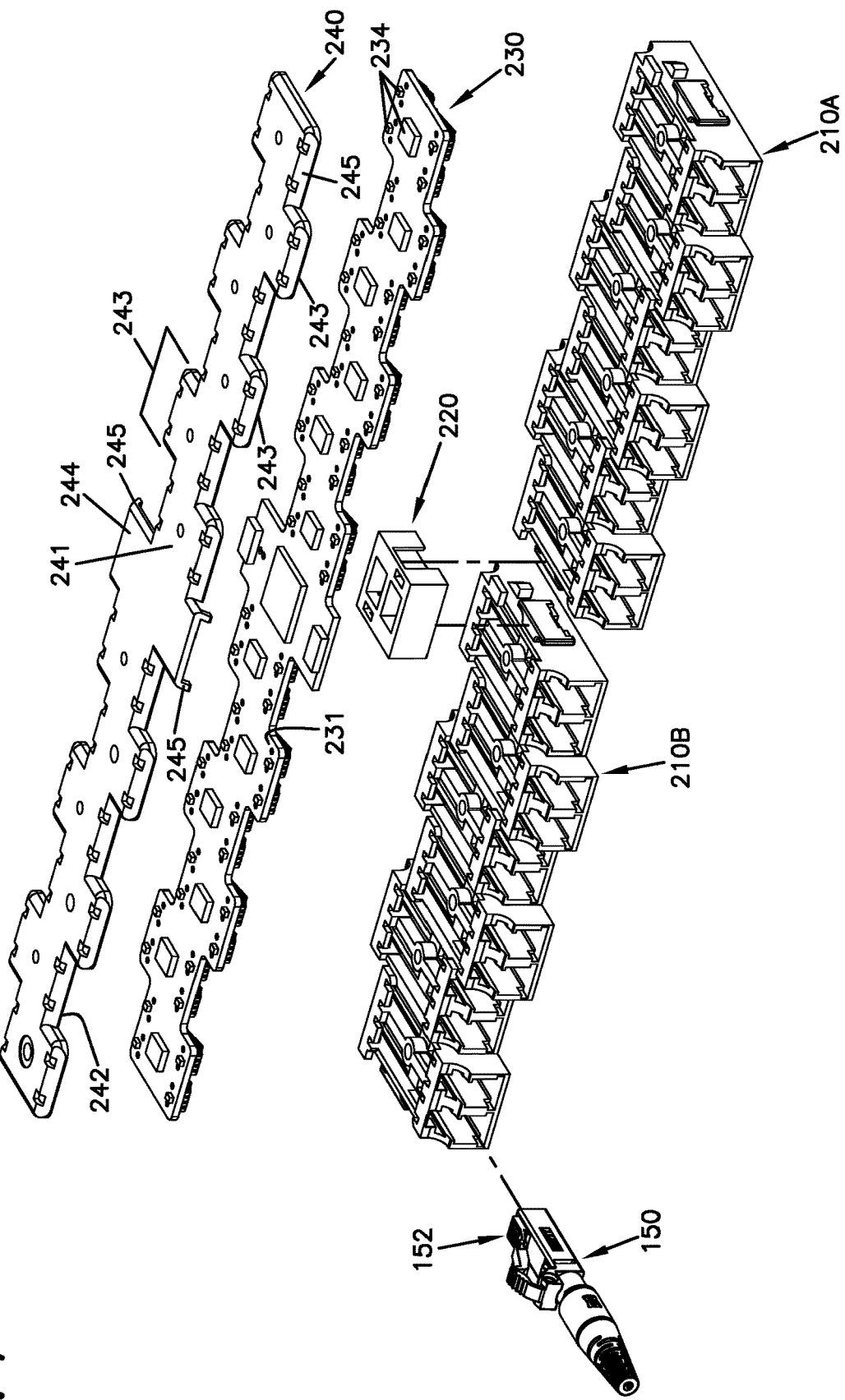
FIG. 7 shows the components of the first adapter block assembly of FIG. 6 exploded outwardly from each other.

As shown in FIG. 7, the adapter block assembly 200 includes a first adapter block 210A, a second adapter block 210B, a joining member 220, a circuit board 230, and a cover 240. The joining member 220 couples the first and second adapter blocks 210A, 210B together. The circuit board 230 couples to the joined first and second adapter blocks 210A, 210B. Contact assemblies 160 and circuit board components 234 (e.g., memory) are mounted to the circuit board 230. The contact assemblies 160 face towards the adapter blocks 210A, 210B. The cover 240 extends over at least some of the components 234 of the circuit board 230.

Figure 8:
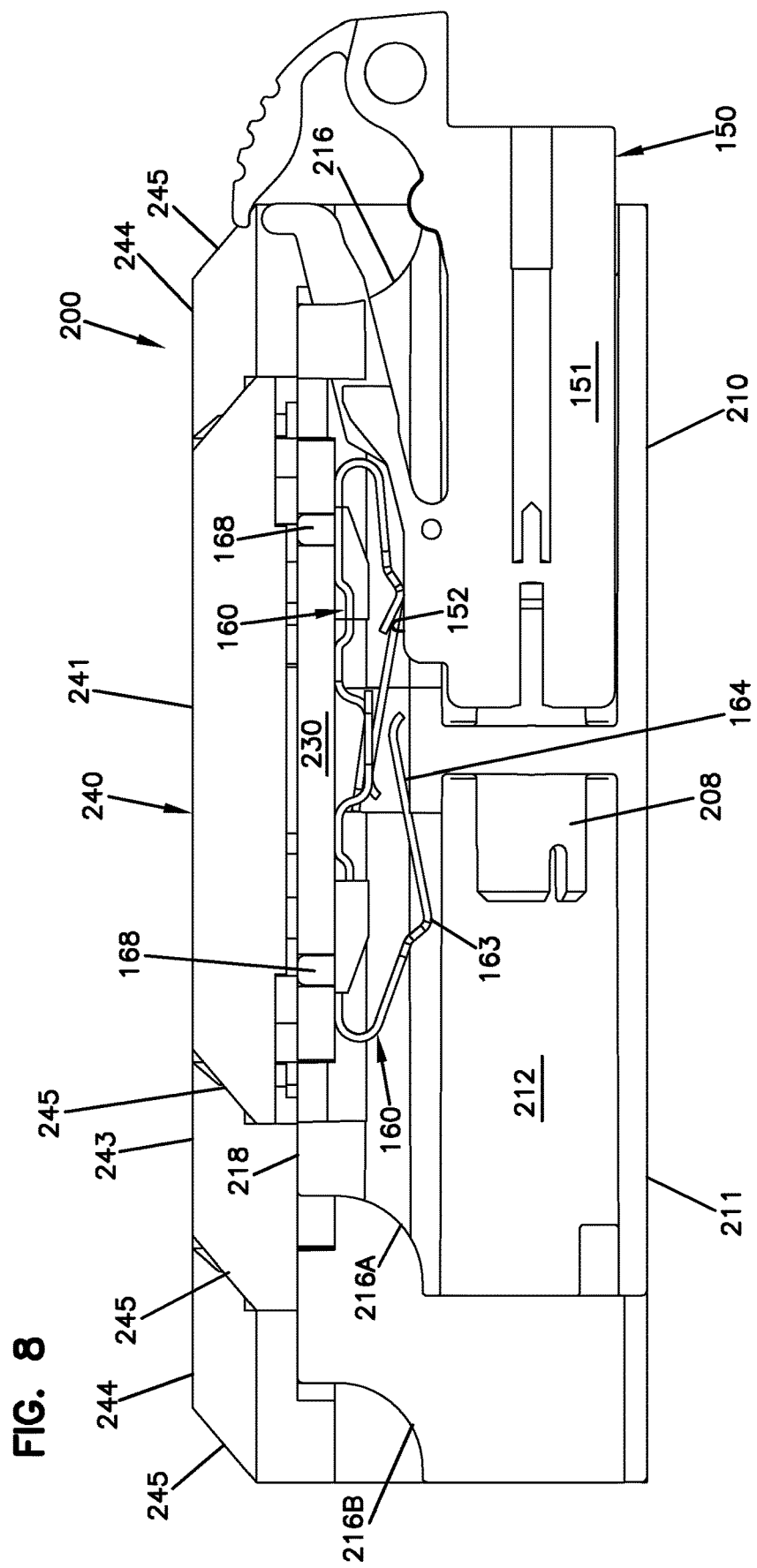
FIG. 8 is a cross-sectional view of the first adapter block assembly of FIG. 6.
Figure 9:
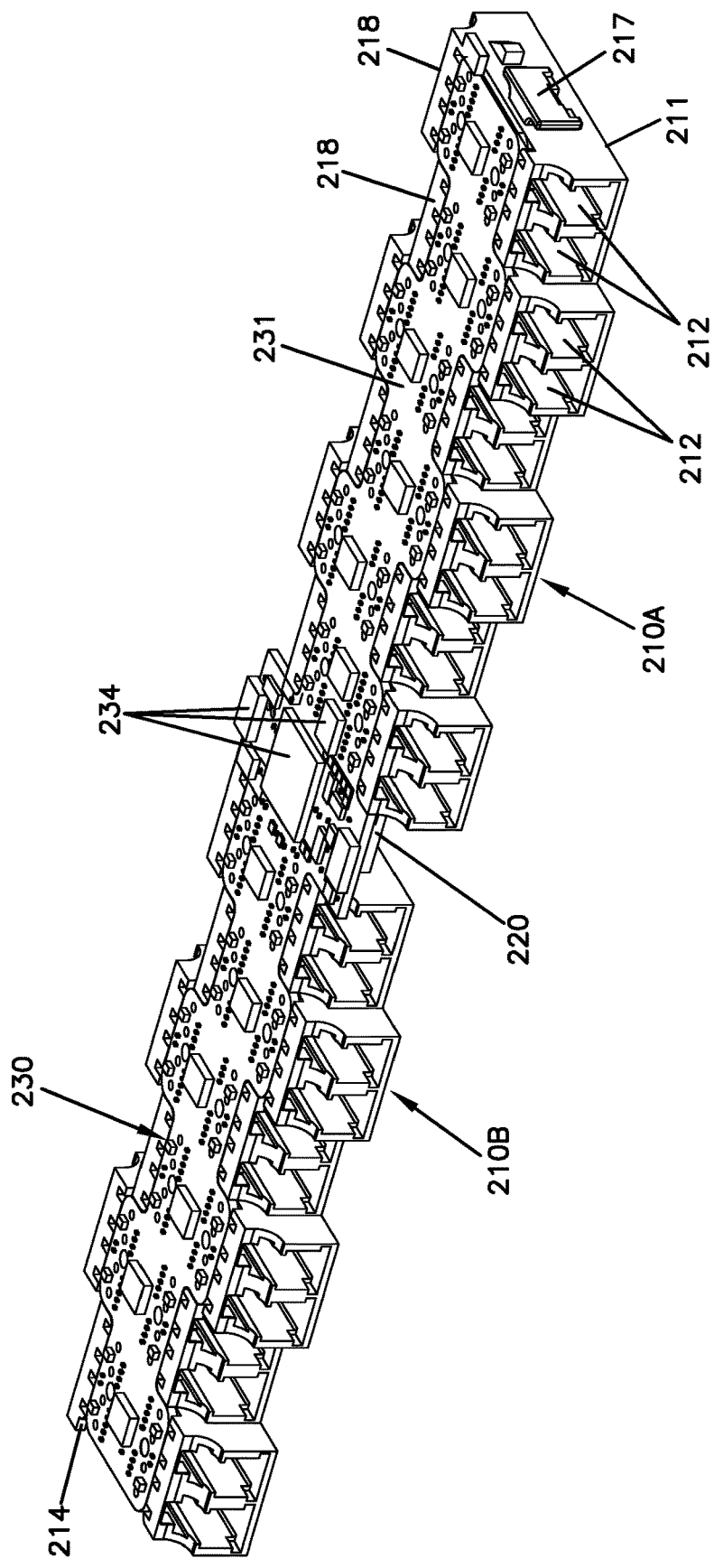
FIG. 9 is a front perspective view of the first adapter block assembly of FIG. 6 with the cover removed.
Figure 10:
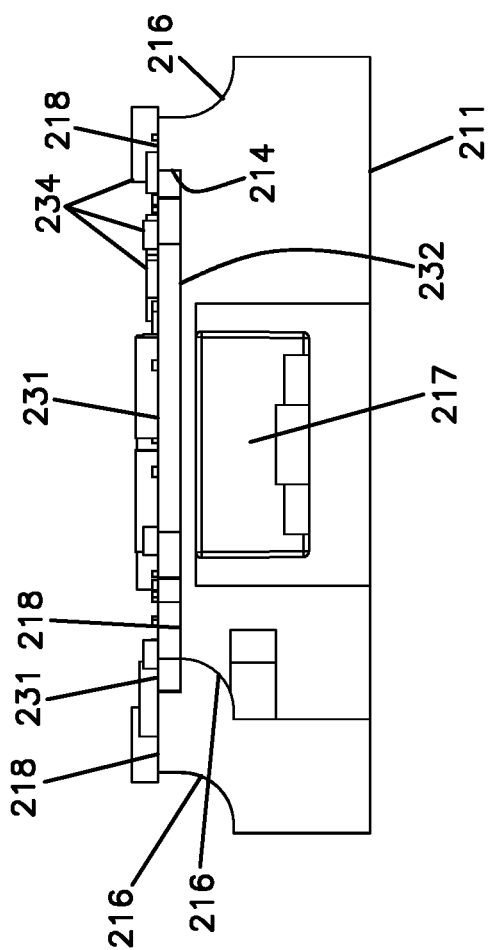
FIG. 10 is a side elevational view of the first adapter block assembly of FIG. 9.

FIG. 8 is a cross-sectional view of the adapter block assembly 200 taken along the insertion axis A of one of the ports 212. A first optical connector 150 is shown plugged into the right port 212 and the left port 212 is shown empty. A ferrule of the optical connector 150 is held at a sleeve 208 disposed between the left and right ports 212. The sleeve 208 is configured to align and hold ferrules of connectors 150 inserted at opposite ports 212. The latch arm 153 of the connector 150 latches or otherwise secures to an interior of the adapter block 210.

A contact assembly 160 is disposed between the adapter block 210 and the circuit board 230. A right contact assembly 160 corresponds with the right port 212 and a left contact assembly 160 corresponds with the left port 212. Contacts 162 of the contact assembly 160 extend through apertures 215 in the adapter block 210. The contacts 162 are positioned and oriented so that the contact sections 163 align with the contact region 152 of optical connectors 150 received at corresponding ports 212. Pegs 168 extend into the circuit board 230.

In some implementations, the circuit board 230 is mounted flush with the adapter block 210. For example, in certain implementations, the circuit board 230 can be mounted within a recessed area 214 of the adapter block 210 between end sections 218 (e.g., see FIGS. 9 and 10). The periphery of the circuit board 230 is recessed inwardly relative to the ports 212. For example, in certain implementations, the adapter block 210 defines front and rear curved sections 216 that extend downwardly from the end sections 218 and outwardly to define the front and rear ports 212. The circuit board 230 has a bottom surface 232 that seats on the recessed section 214 and a top surface 231 that lies about level with the top of the end sections 218. In certain implementations, components 234 mounted to the first surface 231 of the board 230 extend upwardly past the top of the end sections 218.

Referring back to FIG. 8, the cover 240 extends over the first surface 231 of the circuit board 230. The cover 240 has a top surface 241 that faces away from the circuit board 231 and a bottom surface 242 that faces towards the circuit board 232. In some implementations, the cover 240 (e.g., the second surface 242) seats on the first surface 231. In other implementations, a periphery of the cover 240 seats on the end sections 218. A hollow section of the cover 240 defined by a raised second surface 242 extends over the first surface 231 of the circuit board 230 to accommodate the board components 234.

In certain implementations, the periphery of the cover 240 seats on only portions of the end sections 218. For example, the periphery of the cover 240 can be recessed inwardly from the ports 212 to enhance access to the ports 212. In an example, the periphery of the cover 240 can be recessed inwardly from the front and rear curved portions 216. In some implementations, the cover 240 can define ramped or tapered sections 245 at the front and rear of the cover 240. The tapered sections 245 further enhance access to the ports 212 by reducing the material that might otherwise block finger access to the ports 212 when the cover 240 is mounted to the adapter block 210.

Figure 11:
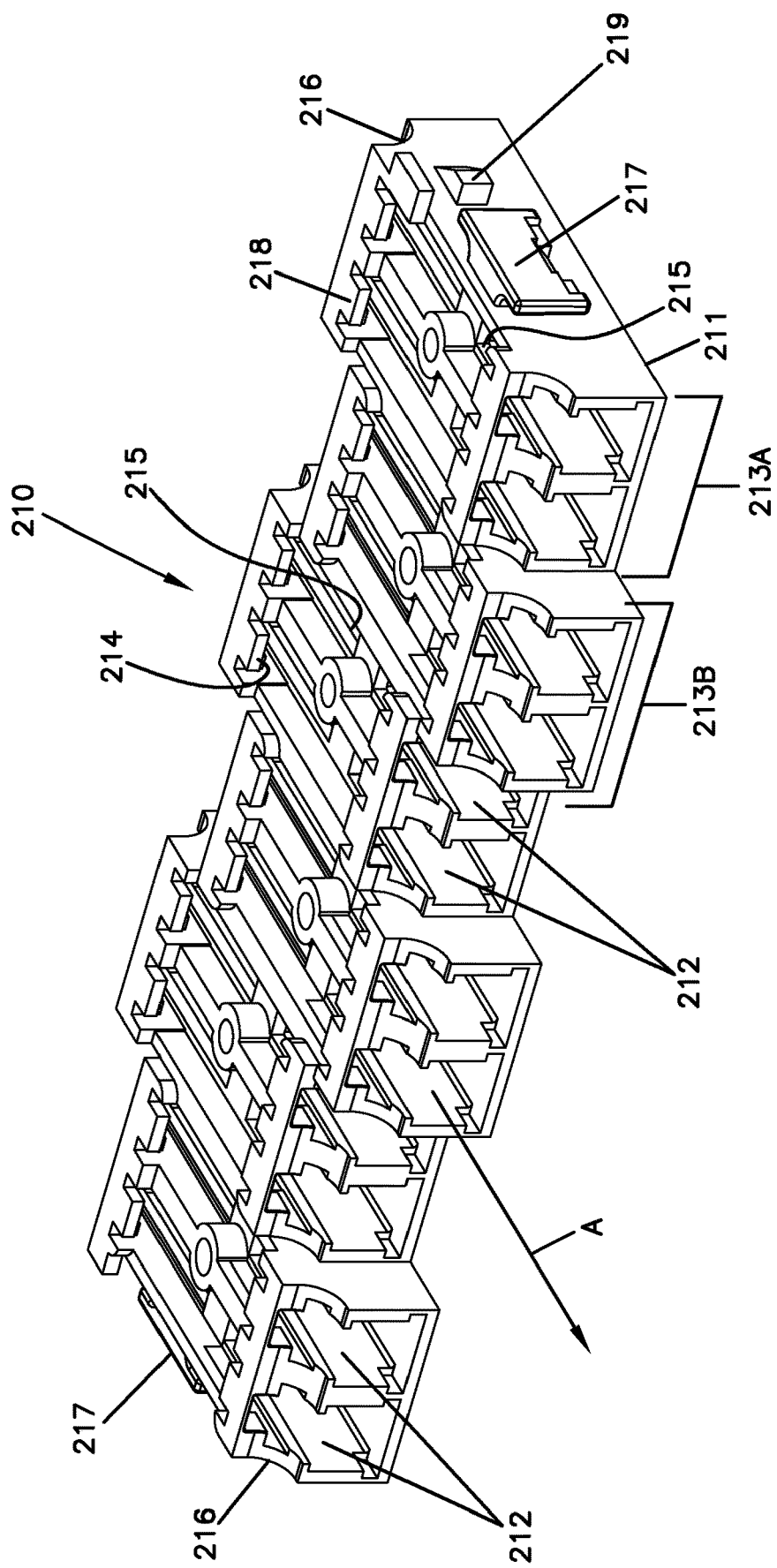
FIG. 11 is a front perspective view of an example adapter block suitable for use with the first adapter block assembly of FIG. 6.
Figure 12:
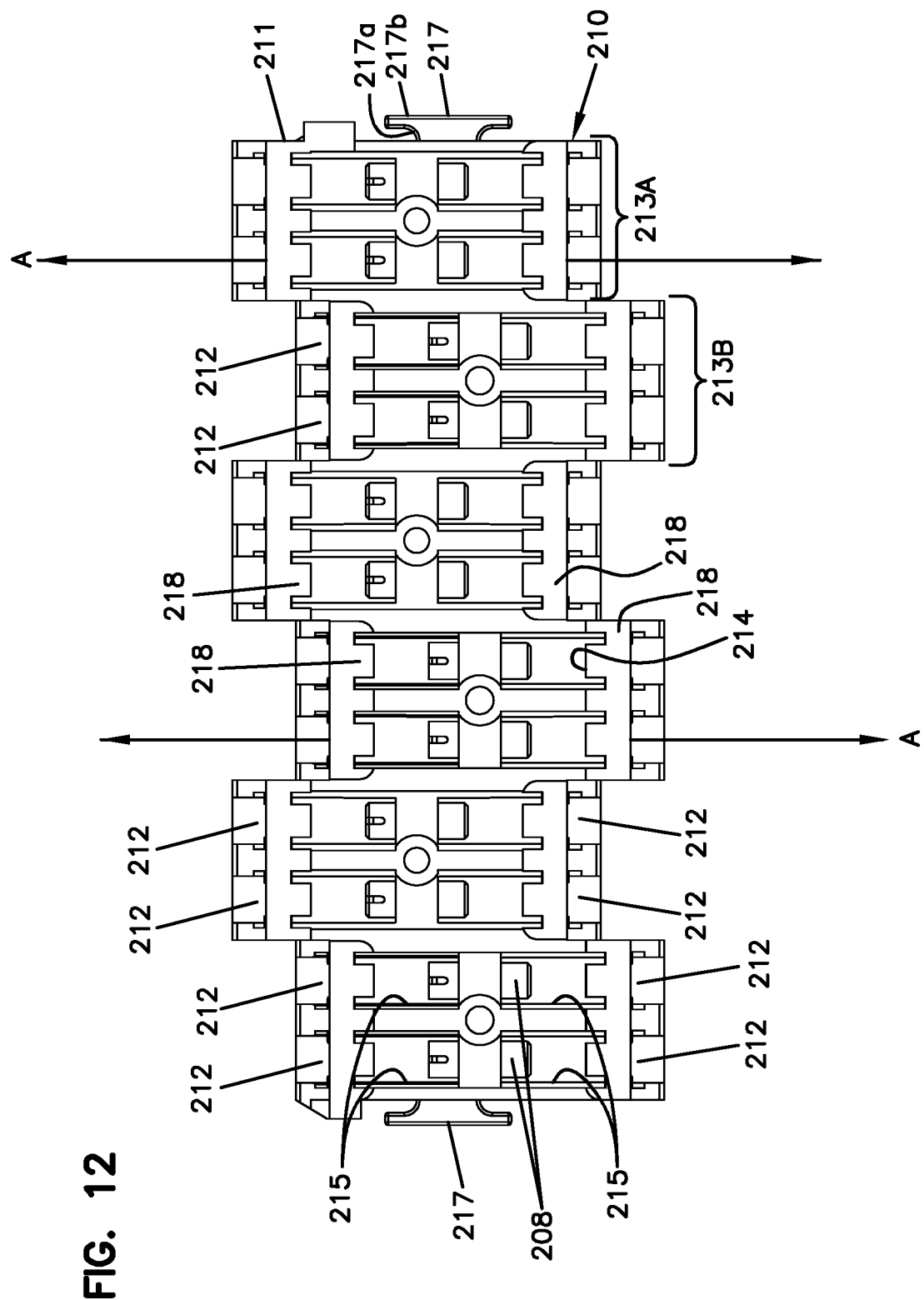
FIG. 12 is a top plan view of the adapter block of FIG. 11.

FIGS. 11-12 illustrate one example adapter block 210 suitable for use in the adapter block assembly 200. The adapter block 210 includes a block body 211 that defines a plurality of front and rear ports 212. The front ports 212 align with the rear ports 212. The front ports 212 form a lateral row that extends along a common (e.g., horizontal) axis. The rear ports 212 also form a lateral row that extends along a common (e.g., horizontal) axis. The top of the adapter block 210 defines the recessed area 214 between a front end section 218 and a rear end section 218. Apertures 215 are defined in the recessed area 214 and extend into a hollow interior of the adapter block 210.

In some implementations, the front ports 212 are located generally flush relative to each other. In other implementations, however, a perimeter of the adapter block 210 can have a staggered configuration so that some of the front ports 212 are offset forwardly/rearwardly along the insertion axes relative to others of the front ports 212. In one example, adjacent front ports 212 are forwardly/rearwardly offset from each other. In the example shown, sections of the adapter block 210 are forwardly/rearwardly offset from each other. For example, a first section 213A of the adapter block 210 is offset rearwardly relative to a second section 213B of the adapter block 210 (see FIG. 11). In certain implementations, each section 213A, 213B defines at least one of the front ports 212 and one of the rear ports 212. In an example, each section 213A, 213B defines two each of the front and rear ports 212.

In some implementations, the adapter block 210 is configured to be coupled to one or more adapter blocks 210 and/or to be coupled to a tray, blade, drawer, tray, or other such structure (hereinafter "tray"). In certain implementations, each adapter block 210 includes an engagement member 217 that extends outwardly from at least one side 205, 206 of the adapter block 210. In an example, an engagement member 217 extends outwardly from both sides 205, 206 of the adapter block 210. In certain implementations, the engagement member 217 has a T-shaped profile when viewed from above or below the adapter block 210. For example, the engagement member 217 can have a first portion 217a extending outwardly from the side 205, 206 of the adapter block 210 and a second portion 217b extending generally orthogonally across the first portion 217a (FIG. 12). In certain implementations, a stop member 219 also extends outwardly from opposite sides 205, 206 of the adapter block 210.

Figure 13:
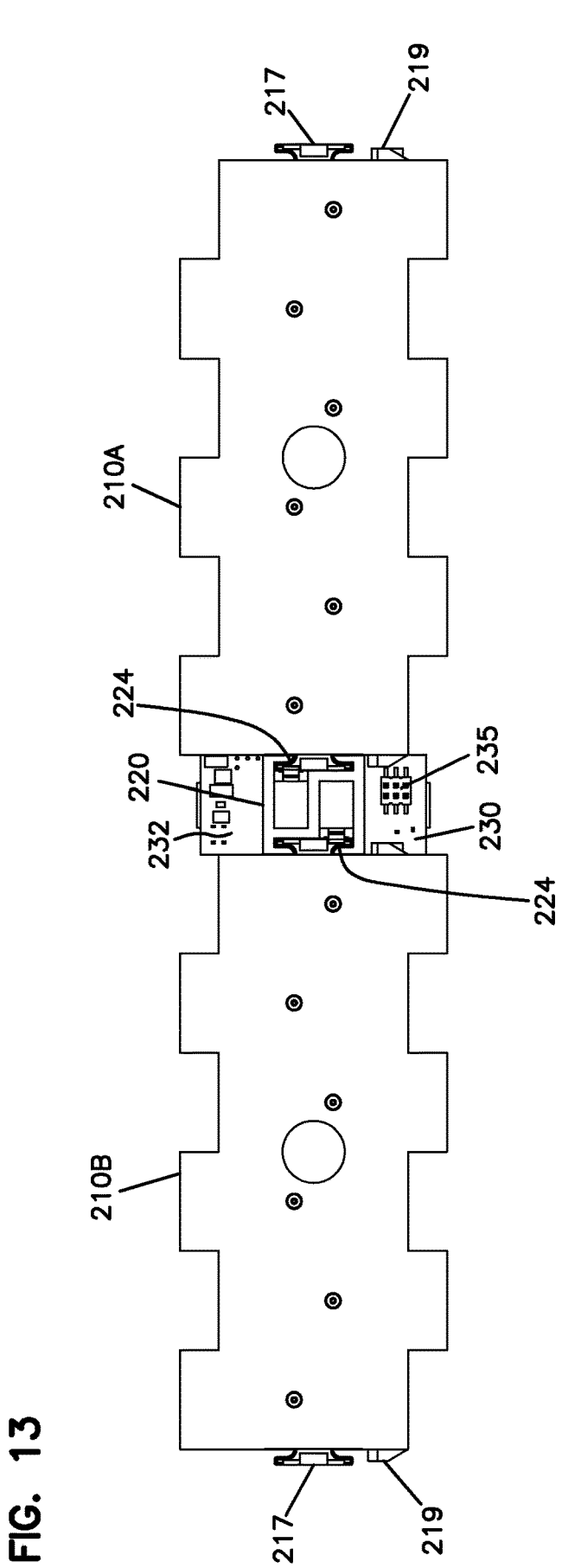
FIG. 13 is a bottom plan view of the adapter block of FIG. 11.
Figure 14:
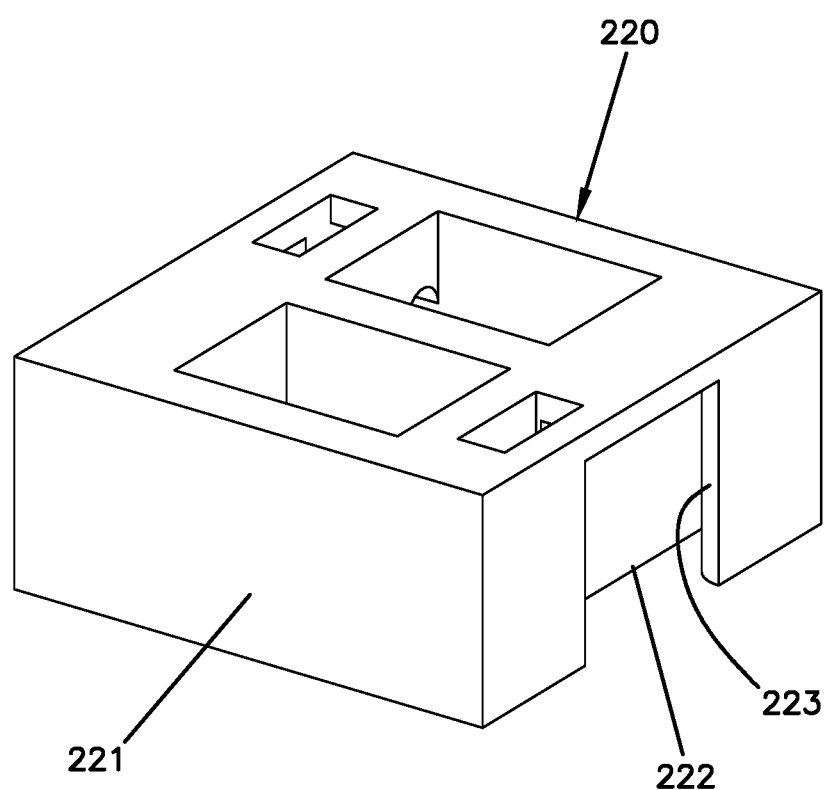
FIG. 14 is a perspective view of an example joining member suitable for use with the first adapter block assembly of FIG. 6.
Figure 15:
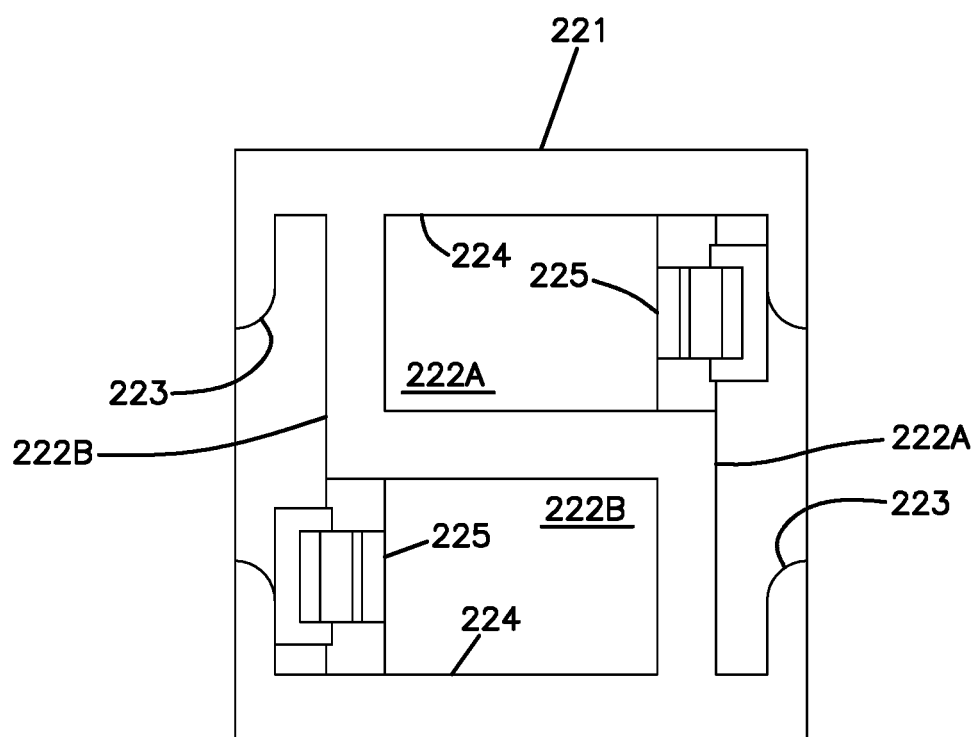
FIG. 15 is a bottom plan view of the joining member of FIG. 14.
Figure 16:
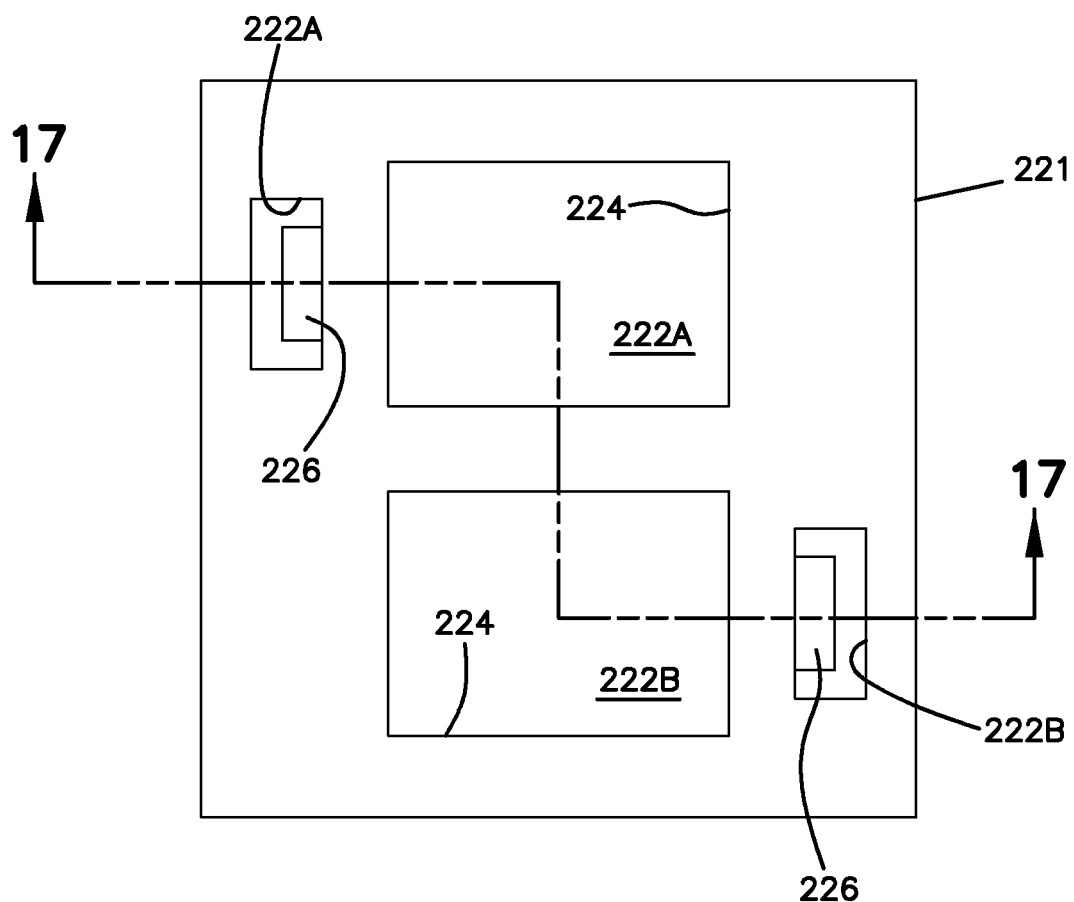
FIG. 16 is a top plan view of the joining member of FIG. 14.
Figure 17:
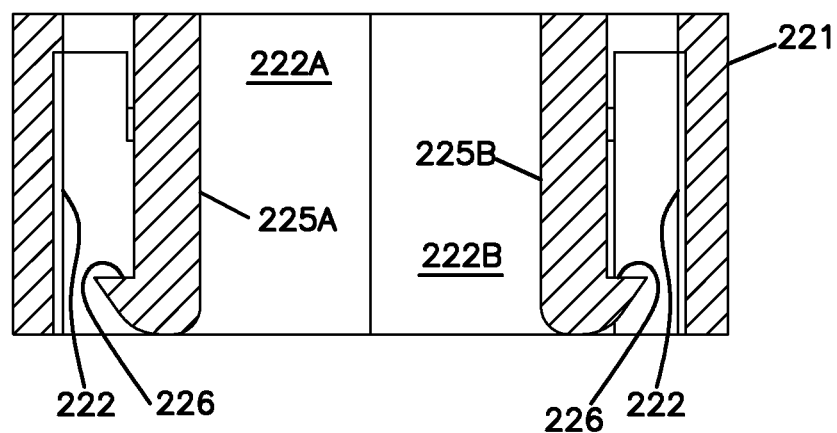
FIG. 17 is a cross-sectional view of the joining member taken along the 17-17 line of FIG. 16.

Referring to FIGS. 13-17, two or more adapter blocks 210 can be coupled together using a joining member 220. As shown in FIG. 13, the joining member 220 includes a body 221 defining one or more interior cavities 222 that are sized to receive the engagement members 217 of the adapter blocks 210. In the example shown in FIG. 15, the joining member 220 includes a first interior cavity 222A that is separated from a second interior cavity 222B. In certain implementations, two cavities 222 are formed at opposite sides of the joining member 220 to hold two adapter blocks 210 together end-to-end. In an example, each interior cavity 222A, 222B extends along two adjacent sides of the joining member to form an L-shape.

Each cavity 222 is accessible through an open bottom of the joining member 220 (FIG. 15), a respective aperture 224 defined in a top of the joining member 220 (FIG. 16), and a respective slot 223 (FIG. 14) defined in one of the sides of the joining member body 221. The slots 223 of the joining member 220 are sized to enable an adapter block engagement member 217 to enter one of the cavities 222 (see FIG. 13). For example, the engagement member 217 can be slid into the cavity 222 through the open bottom of the joining member 220 with the first portion 217a of engagement member 217 passing through the slot 223. The second portion 217b of the engagement member 217 abuts against the body 221 to hold the adapter block 210 laterally relative to the joining member 220 (see FIG. 13).

In some implementations, a latching hook 225 extends downwardly within each of the cavities 222 of the joining member 220. For example, in FIG. 17, a first latching hook 225A extends downwardly within cavity 222A and a second latching hook 225B extends downwardly within cavity 222B. Each latching hook 225A, 225B defines a shoulder 226 facing towards the top of the joining member 220. Each latching hook 225A, 225B is configured to deflect laterally within the cavity 222A, 222B. When the engagement member 217 is being slid into the cavity 222, the section portion 217b of the engagement member 217 pushes against the latching hook 225 to cause deflection of the latching hook 225 away from the slot 223. When the engagement member 217 has been fully inserted within the cavity 222, the latching hook 225 snaps over the section portion 217b of the engagement member 217 to hold the engagement member 217 within the cavity 222 (see FIG. 13).

Figure 18:
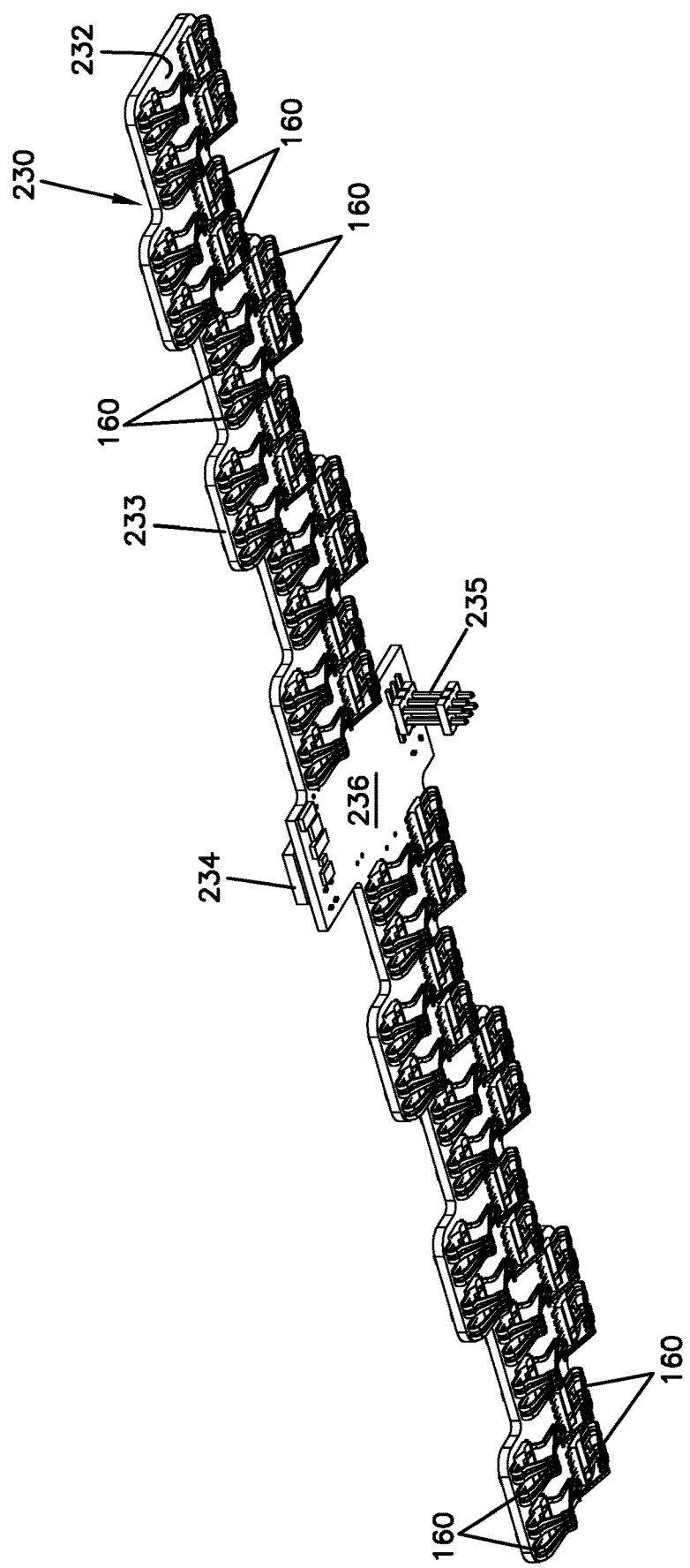
FIG. 18 is a bottom perspective view of contact assemblies mounted to an example circuit board suitable for use with the first adapter block assembly of FIG. 6.

FIG. 18 illustrates an example circuit board arrangement suitable for use with the adapter block assembly 200. The example circuit board arrangement includes a circuit board 230 having contact assemblies 160 mounted to a second surface 232. In some implementations, a perimeter 233 of the circuit board 230 has a staggered configuration so that some of the contact assemblies 160 are mounted further forwardly/rearwardly relative to others of the contact assemblies 160. In the example shown in FIG. 7, the staggered configuration of the circuit board 230 generally aligns with the staggered configuration of the adapter blocks 210.

The circuit board 230 shown in FIG. 18 is configured to couple to two different adapter blocks 210. For example, the circuit board 230 includes an intermediate portion 236 sized to extend over a joining member 220 coupling together two adapter blocks 210. A circuit board connector 235 extends downwardly from the second surface 232 of the circuit board 230 at the intermediate portion 236. The circuit board connector 235 is configured to electrically connect the circuit board 230 (e.g., and hence components 234 and contacts 160 on the circuit board 230) to a second circuit board or other electrical circuit as will be disclosed in more detail herein. In certain implementations, the joining member 220 is sized to accommodate passage of the circuit board connector 235 between the adapter blocks 210 and within the periphery 233 of the circuit board 230.

Figure 19:
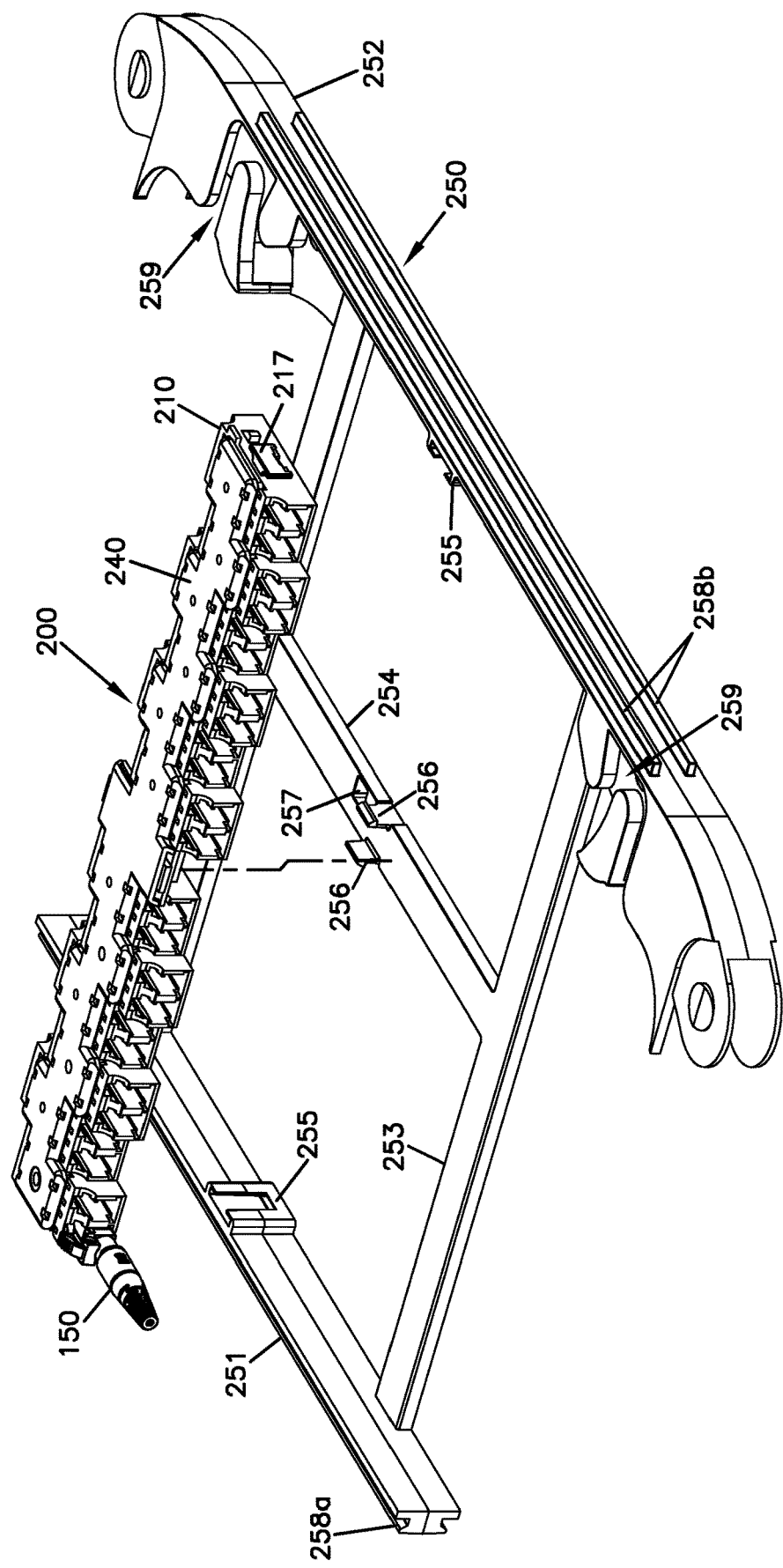
FIG. 19 is a perspective view showing the adapter block assembly of FIG. 6 exploded upwardly from an example tray.
Figure 20:
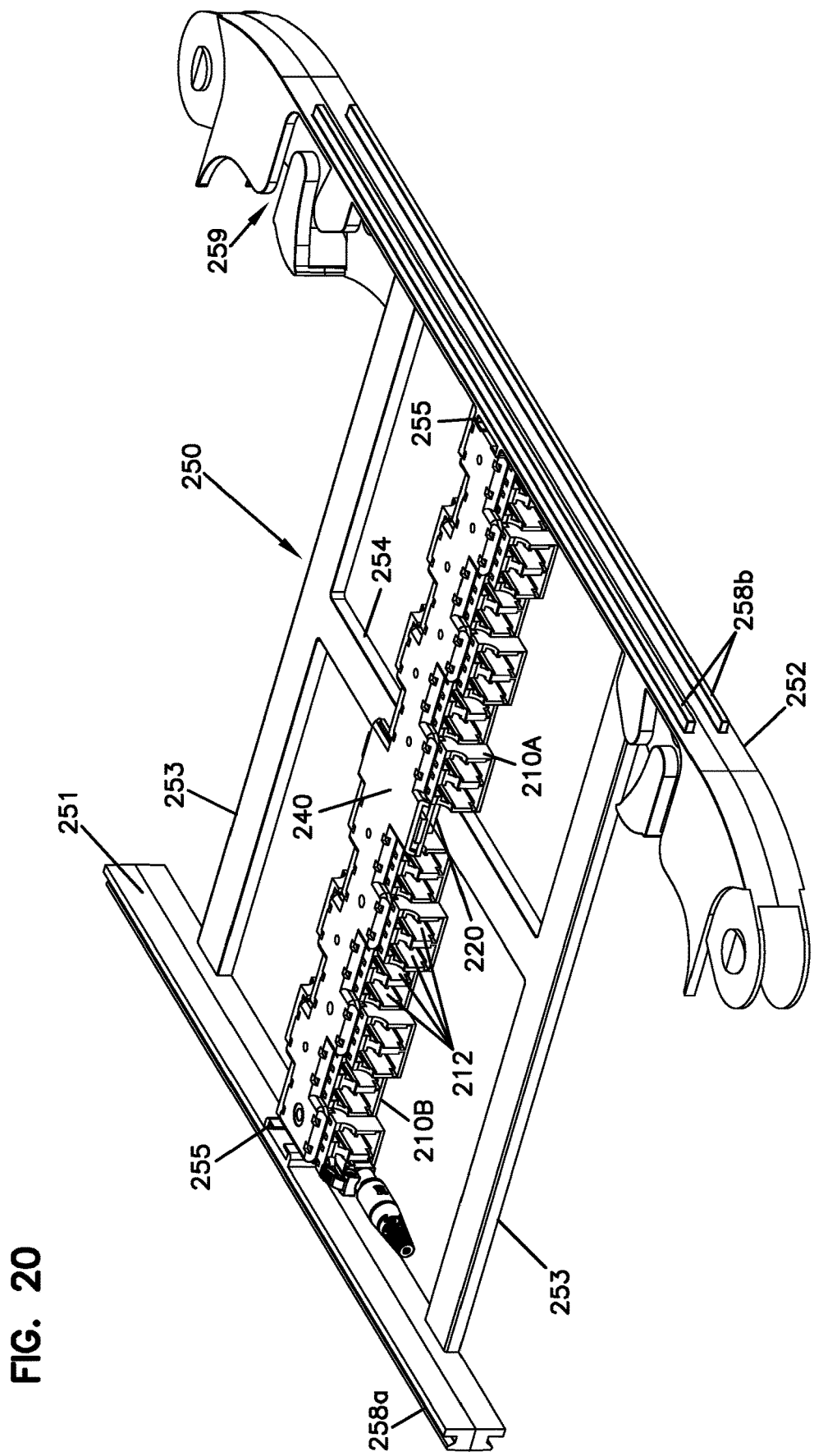
FIG. 20 is a perspective view showing the adapter block assembly of FIG. 6 mounted to the tray of FIG. 19.
Figure 21:
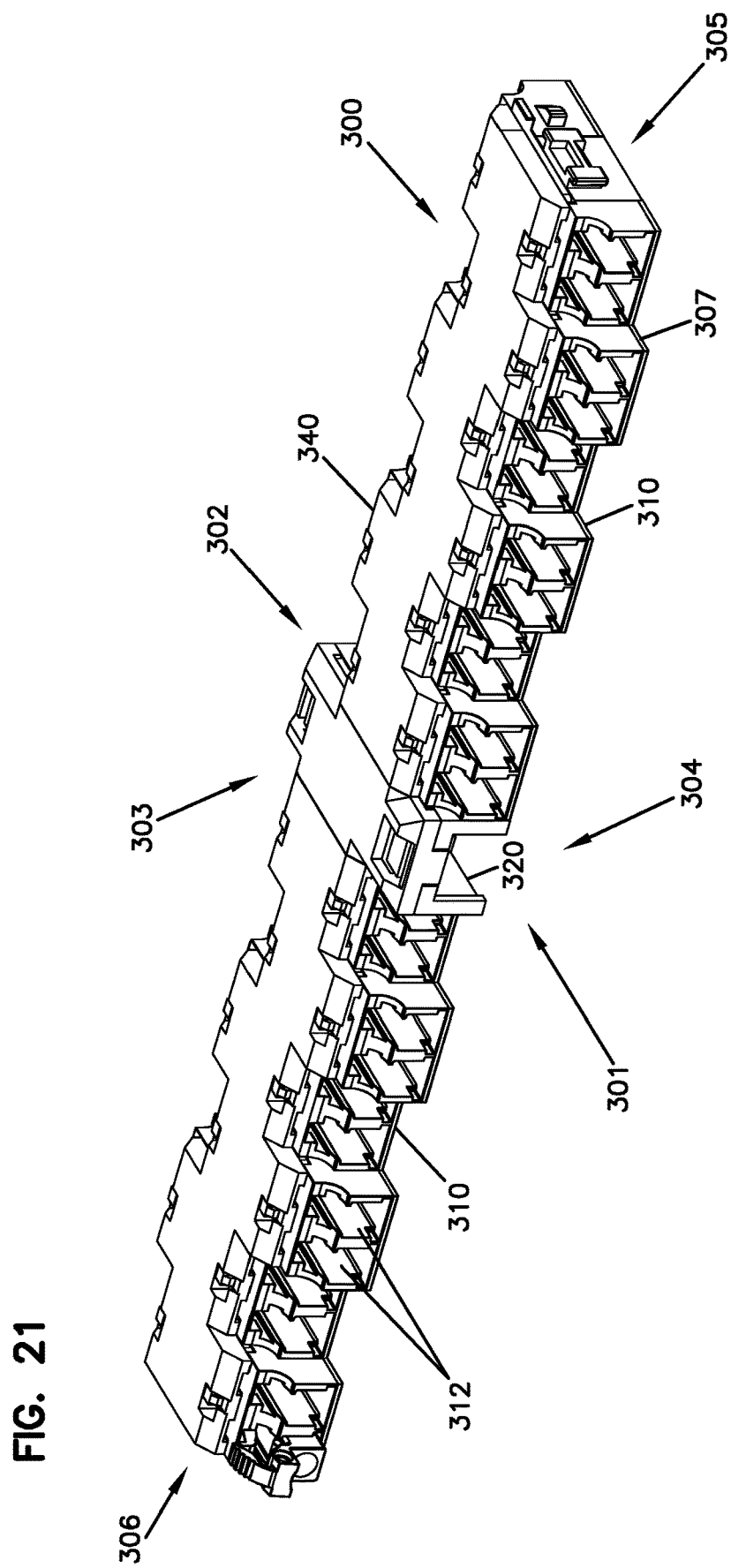
FIG. 21 is a front perspective view of a second example adapter block assembly including adapter blocks, a joining member, a circuit board, and multiple cover pieces.
Figure 22:
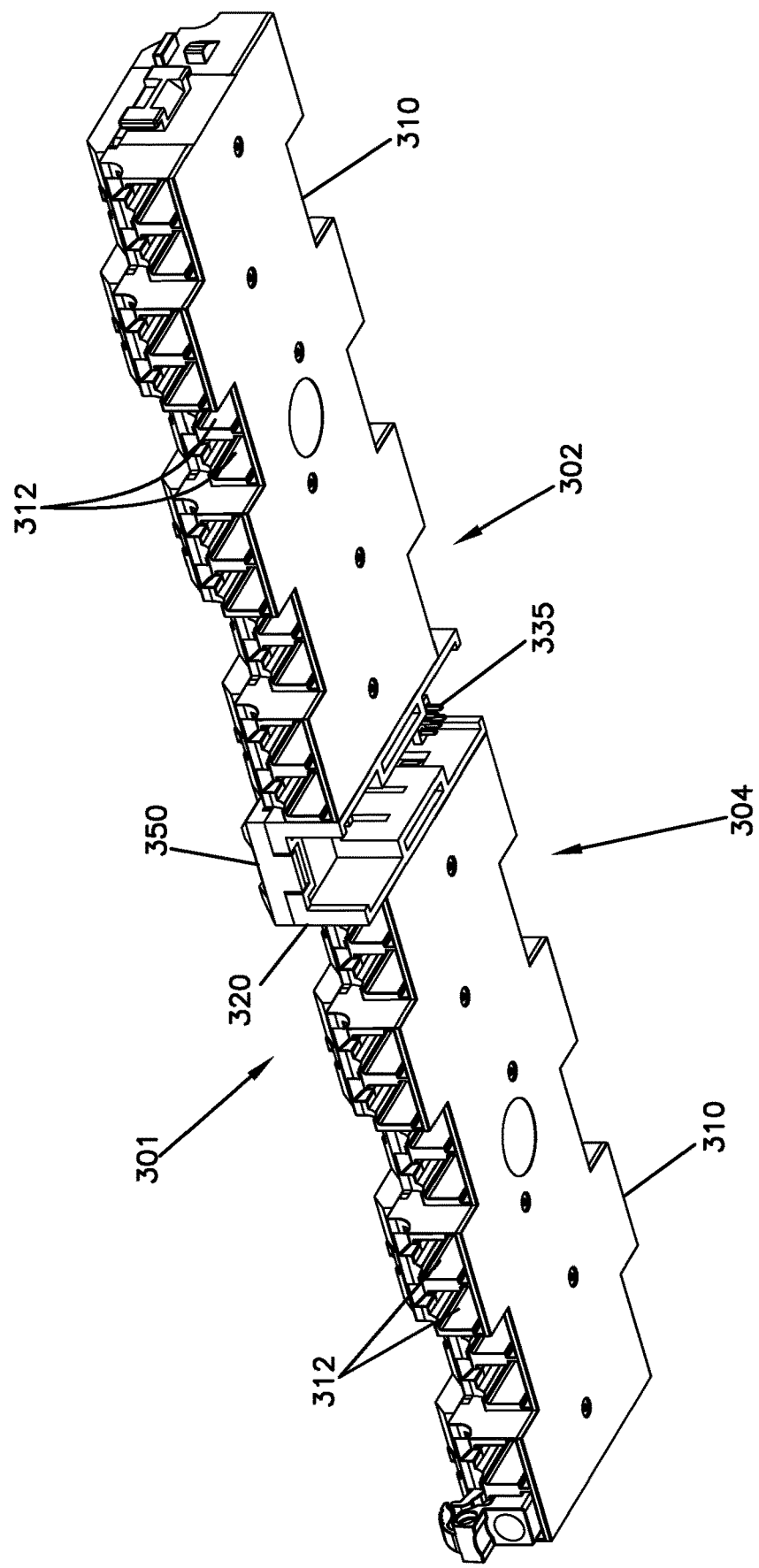
FIG. 22 is a bottom perspective view of the adapter block assembly of FIG. 21.

FIGS. 19 and 20 illustrate mounting the adapter block assembly 200 to an example tray 250. The tray 250 is configured to receive at least one adapter block assembly 200. In some implementations, the tray 250 also is configured to manage optical fibers/cables routed to the ports 212 of the adapter block assembly 200. In the example shown in FIG. 19, the tray 250 includes cross-members 253 extending between two side rails 251, 252. A mounting rail 254 extends between the cross-members 253. In some implementations, latching fingers 256 extend upwardly from the mounting rail 254.

The latching fingers 256 are configured to engage the adapter block assembly 200 (e.g., the joining member 220) to further secure the adapter block assembly 200 to the tray 250. In certain implementations, two latching fingers 256 face in opposite directions towards the side rails 251, 252. In certain implementations, the latching fingers 256 extend upwardly through the cavities 222 defined in the joining member 220 and through the apertures 224 defined at the top of the joining member 220 to latch over the top of the joining member 220. In other implementations, the latching members 256 latch over shoulders defined within the joining member 220. In still other implementations, another type of adapter block assembly securement structure can be disposed at the mounting rail 254.

Mounting structures 255 are provided at the inner sides of the side rails 251, 252. In certain implementations, the mounting structures 255 are laterally aligned. The mounting structures 255 are configured to receive the engagement members 217 of the adapter blocks 217. For example, the mounting structures 255 receive the engagement members 217 extending outwardly from the sides 205, 206 of the adapter block assembly 200. In an example, each mounting structures 255 defines a T-shaped cavity having an open top through which an engagement member 217 can slide. Each mounting structures 255 also includes a shelf on which the engagement member 217 can seat.

In certain implementations, the tray 250 is moveable (e.g., slideable, pivotal, etc.) relative to a rack, cabinet, or other mounting structure. For example, exterior surfaces of the side rails 251, 252 can include guides 258 that interact with guides on the holding structure. In certain implementations, the tray 250 includes cable management guides 259 that form routing paths for optical fibers/cables routed onto the tray 250. The management guides 259 may aid in managing the optical fibers/cables during movement of the tray 250.

In some implementations, the tray 250 provides an electrical connection between the adapter block assembly 200 and a data management network. In some implementations, an electrical circuit (e.g., a second circuit board) is mounted to the mounting rail 254. For example, the mounting rail 254 and/or one or more of the cross-members 253 can define a pocket or channel sized to fit the circuit board (e.g., see FIG. 46). The circuit board includes connectors (e.g., pin receptacles) configured to receive the circuit board connectors 235 of the printed circuit board 230 within the adapter block assembly 200. In some implementations, the circuit board extends over the mounting rail 254 and over at least part of one of the cross-members 253 towards an aperture in the second side rail 252 through which the circuit board can connect to a chassis electrical circuit (e.g., backplane, cable, etc.).

In other implementations, an electrical cable (e.g., a flexible cable) or other circuit can extend from the chassis electrical circuit, through the aperture in the second side rail 252, extend across at least part of the cross-members 253, and connect to the second circuit board. A cover can be positioned over the cross-member channel to protect the flex circuit. In an example, the cover can be latched (e.g., using latches 256) other otherwise secured to the cross-member 253. In certain implementations, the chassis electrical circuit includes a local processor to manage the data obtained from the adapter block assembly 200. In other implementations, the chassis electrical circuit includes a data port through which the data can be carried to a data management network.

FIGS. 21-35 illustrate a second example adapter block assembly 300 suitable for implementing the adapter block assembly 110 of FIG. 1. The adapter block assembly 300 has a front 301, a rear 302, a top 303, a bottom 304, a first side 305, and a second side 306. A periphery 307 of the adapter block assembly 300 defined by the front 301, rear 302, and sides 305, 306 defines a staggered configuration. Ports 312 for receiving optical connectors (e.g., optical connectors 150) along insertion axes are provided at the front 301 and rear 302 of the second adapter block assembly 300. In some implementations, adjacent ports 312 are staggered forwardly/rearwardly relative to each other. In the example shown, adjacent pairs of ports 312 are staggered forwardly/rearwardly relative to each other. The staggering of the ports 312 enhances access to individual connectors 150 plugged into the ports 312.

Figure 23:
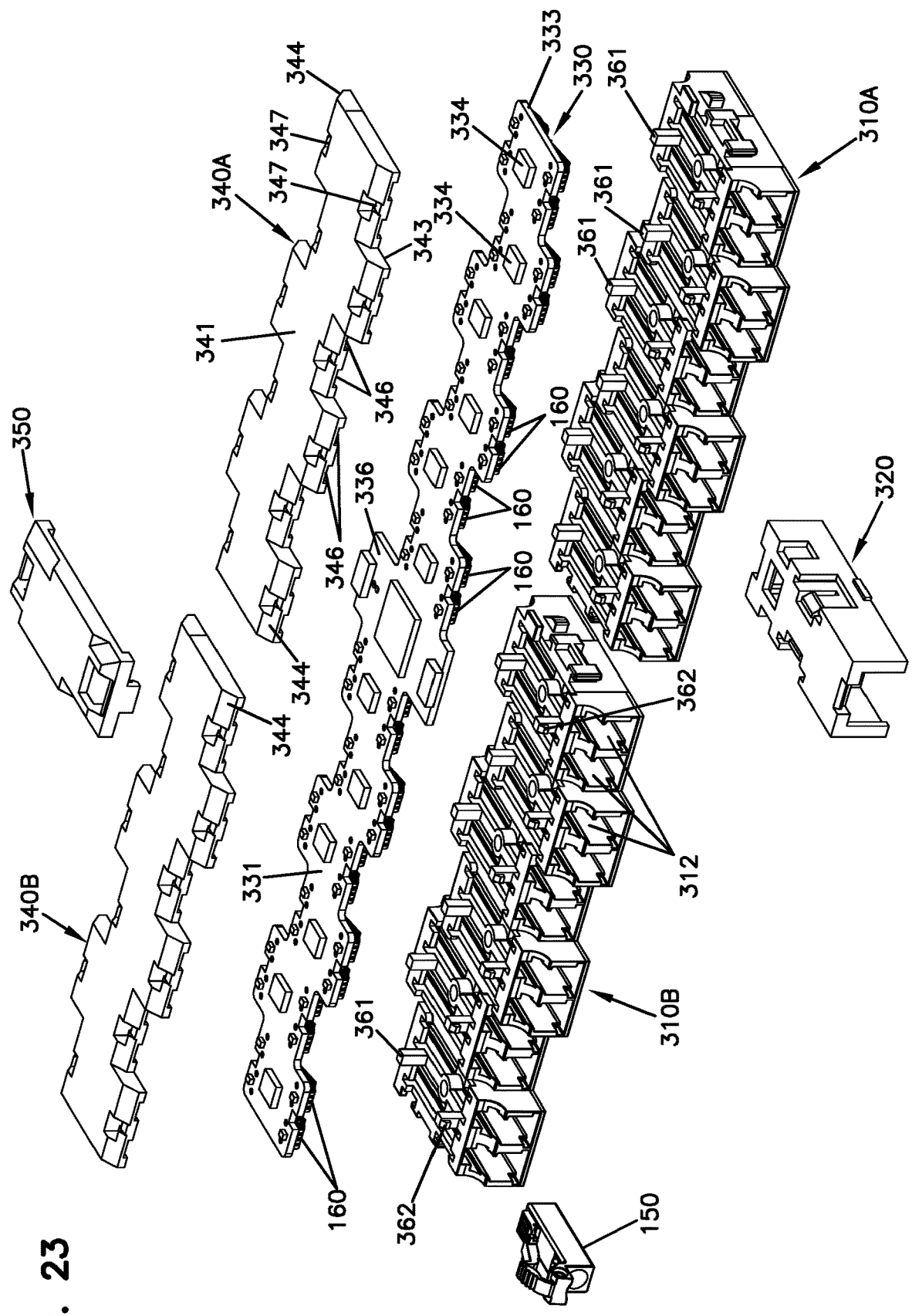
FIG. 23 shows the components of the first adapter block assembly of FIG. 21 exploded outwardly from each other.

As shown in FIG. 23, the adapter block assembly 300 includes a first adapter block 310A, a second adapter block 310B, a joining member 320, a circuit board 330, a first cover 340A, a second cover 340B, and an intermediate cover 350. The joining member 320 couples the first and second adapter blocks 310A, 310B together. The circuit board 330 seats on the joined first and second adapter blocks 310A, 310B. The first and second covers 340A, 340B are disposed over the circuit board 330 and couples to the adapter blocks 310A, 310B as will be disclosed in more detail herein. The intermediate cover 350 extends over an intermediate portion 336 of the circuit board 330 between the first and second covers 340A, 340B. In other implementations, the covers 340A, 340B, 350 can be formed as a single piece. In still other implementations, the circuit board 330 can be separated into multiple pieces.

Contact assemblies 160 and circuit board components 334 (e.g., memory) are mounted to the circuit board 330. For example, at least some of the components 334 can be mounted to a first side 331 of the circuit board 330 and the contact assemblies 160 can be mounted to a second side 332 of the circuit board 330. The contact assemblies 160 face towards the adapter blocks 310A, 310B when the circuit board 330 is disposed between the adapter blocks 310 and the covers 340. The covers 340A, 340B extends over at least some of the components 334 of the circuit board 330. In some implementations, the covers 340A, 340B are secured to the adapter blocks 310A, 310B, thereby holding the circuit board 330 therebetween.

Figure 24:
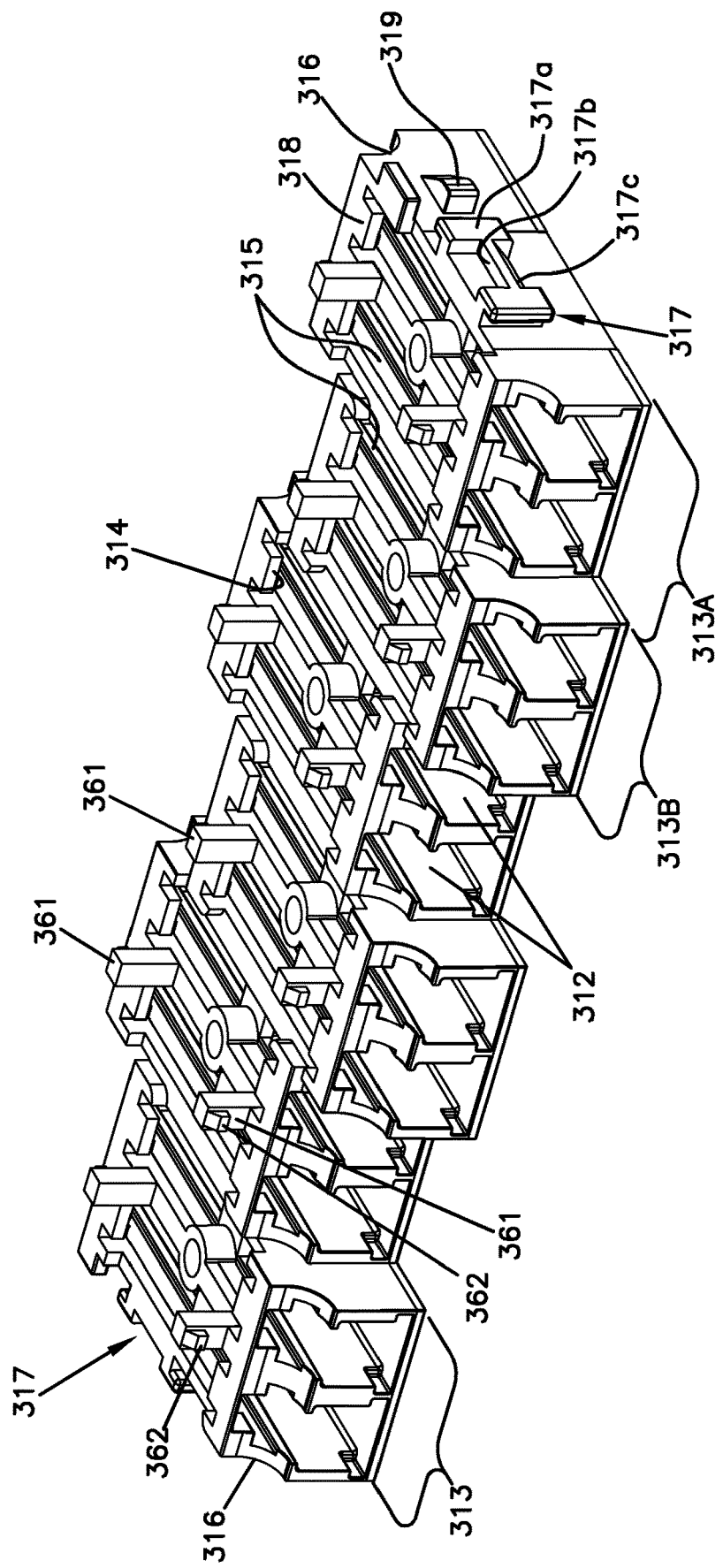
FIG. 24 is a front perspective view of an example adapter block suitable for use with the first adapter block assembly of FIG. 21.
Figure 25:
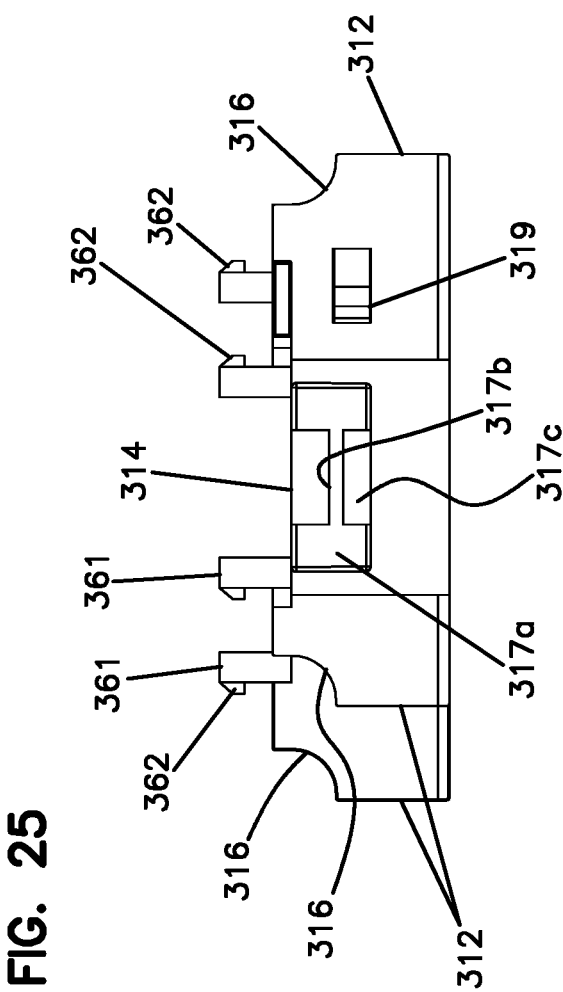
FIG. 25 is a side elevational view of the first adapter block assembly of FIG. 21.
Figure 26:
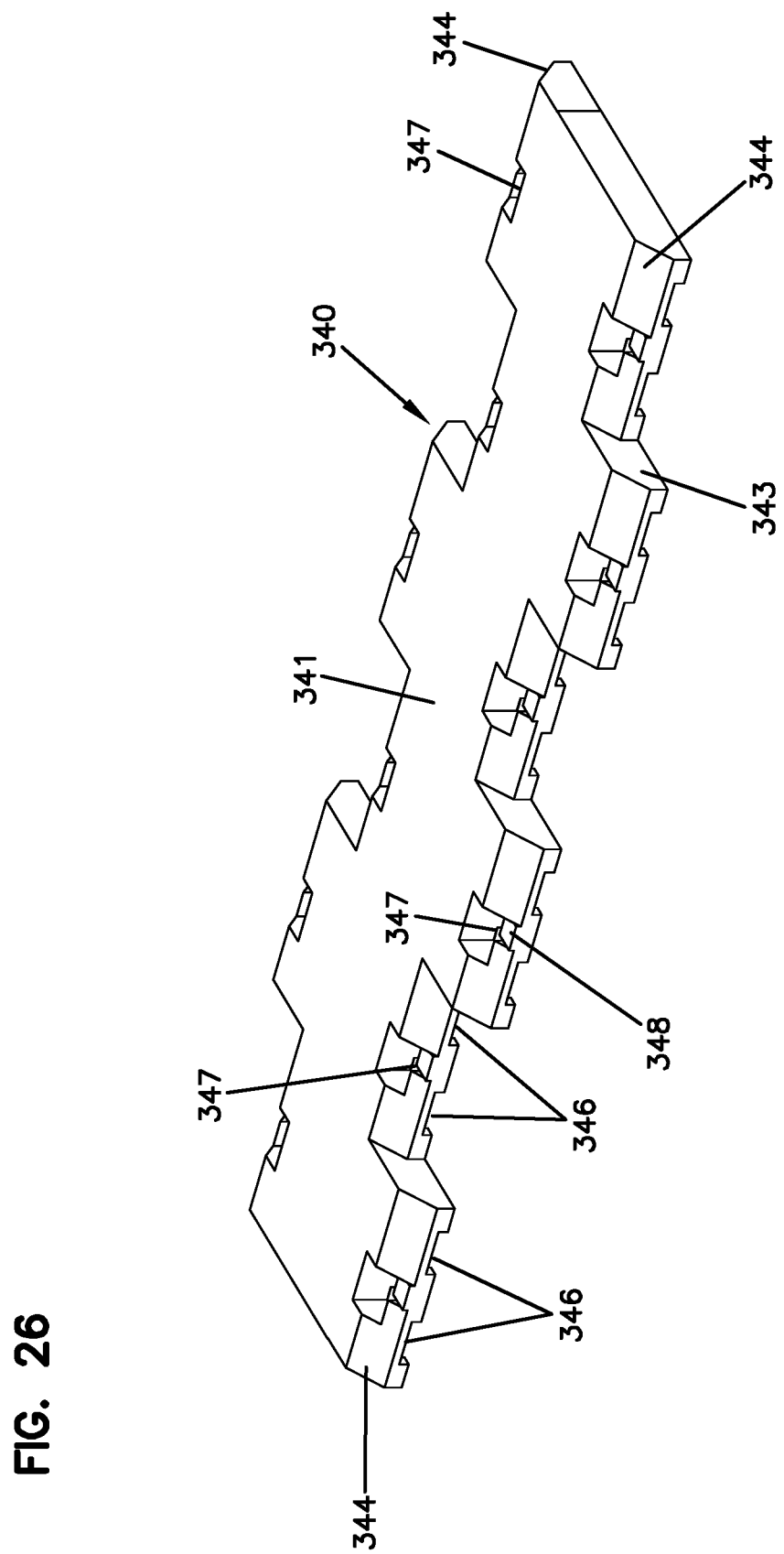
FIGS. 26-29 illustrate an example cover piece suitable for use with the first adapter block assembly of FIG. 21.

FIGS. 24 and 25 illustrate one example adapter block 310 suitable for use as adapter blocks 310A, 310B. The example adapter block 310 includes an adapter body 311 defining one or more front ports 312 and one or more rear ports 312. Each front port 312 aligns with one of the rear ports 312. The front ports 312 form a lateral row that extends along a common (e.g., horizontal) axis. The rear ports 312 also form a lateral row that extends along a common (e.g., horizontal) axis.

In some implementations, the front ports 312 are located generally flush relative to each other. In other implementations, however, a perimeter of the adapter block 310 can have a staggered configuration so that some of the front ports 312 are offset forwardly/rearwardly along the insertion axes relative to others of the front ports 312. In one example, adjacent front ports 312 are forwardly/rearwardly offset from each other. In the example shown, sections of the adapter block 310 are forwardly/rearwardly offset from each other. For example, a first section 313A of the adapter block 310 is offset rearwardly relative to an adjacent second section 313B of the adapter block 310 (see FIG. 24). In certain implementations, each section 313A, 313B defines at least one of the front ports 312 and one of the rear ports 312. In an example, each section 313A, 313B defines two each of the front and rear ports 312.

The top of the adapter block 310 defines the recessed area 314 between a front end section 318 and a rear end section 318. The recessed area 314 enables the circuit board 330 to be flush mounted with the adapter block 310. For example, a circuit board 330 mounted in the recessed area 314 would lie flush with a top of the front and rear end sections 318. Apertures 315 are defined in the recessed area 314 and extend into a hollow interior of the adapter block 310. The contact assemblies 160 of the circuit board 330 extend through the apertures 310 when the circuit board 330 is disposed at the recessed area 314. In certain implementations, the adapter block 310 defines front and rear curved sections 316 that extend downwardly from the end sections 318 and outwardly to define the front and rear ports 312.

The adapter block 310 is configured to latch to the cover 340. For example, in some implementations, the adapter block 310 can include latch arms 361 that extend upwardly from a top of the adapter block 310. The latch arms 361 include latch hooks 362 that extend outwardly from the latch arms 361. In the example shown, a front latch arm 361 and a rear latch arm 361 extend upwardly at each section 313 of the adapter block 310 (see FIG. 24). In other implementations, a greater or fewer number of latch arms 361 may extend upwardly from the adapter block 310.

FIGS. 26-29 illustrate an example cover 340 that is configured to receive the latch arms 361 to secure the cover 340 to the adapter block 310. The example cover 340 has a first surface 341 facing away from the adapter block 310, a second surface 342 facing towards the adapter block 310, and a perimeter 343 extending between the first and second surfaces 341, 342. In some implementations, the cover 340 is sized so that the perimeter 343 is recessed inwardly from a perimeter of the adapter block 310 to enhance access to the ports 312 (and connectors inserted therein) of the adapter block 310. In certain implementations, the cover 340 defines tapered or chamfered edges 344 extending between the first surface 341 and the perimeter 343.

Figure 27:
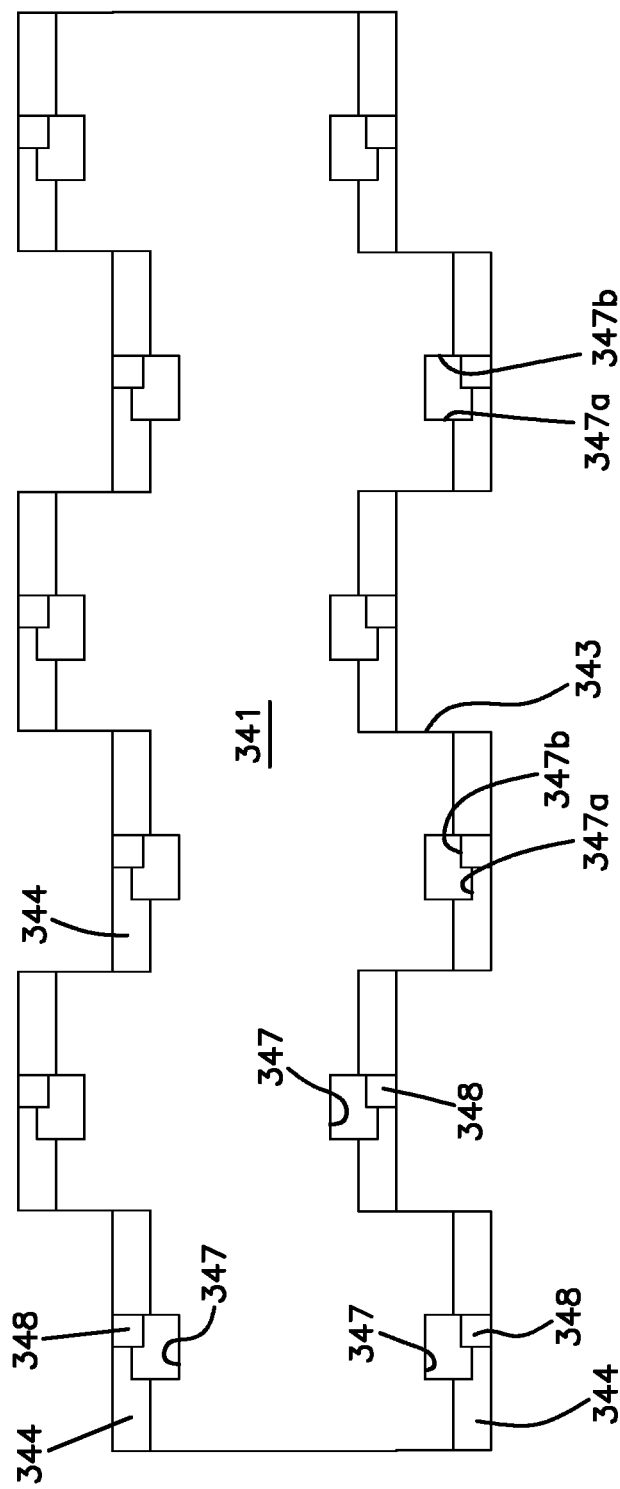

The cover 340 also defines through-openings 347 that extend through the first and second surfaces 341, 342 of the cover 340. The through-openings 347 are wider than the latch arms 361. The cover 340 also defines platforms 348 adjacent the through-openings 347. As shown in FIG. 27, each through-opening 347 includes a first portion 347a that is sized to enable the entire latch arm 361 to pass therethrough without deflecting the latch arm 361. The through-openings 347 also define second portions 347b adjacent the platforms 348. The second portions 347b are too small to enable the latch hooks 362 of the latch arms 361 to pass therethrough. Accordingly, when the cover 340 is mounted to the adapter block 310, the latch arms 361 are inserted through the first portions 347a of the through-openings 347. When the latch hooks 362 of the arms 361 clear the openings 347, the cover 340 is laterally moved so that the platforms 348 are disposed beneath the latch hooks 362 of the arms 361. The platforms 348 inhibit passage of the latch arms 361 back through the through-openings 347. Friction and the contact force between the latch hooks 362 and the platforms 348 inhibits a return lateral movement of the cover 340 to align the latch hooks 362 with the first through-opening portions 347a.

Figure 28:
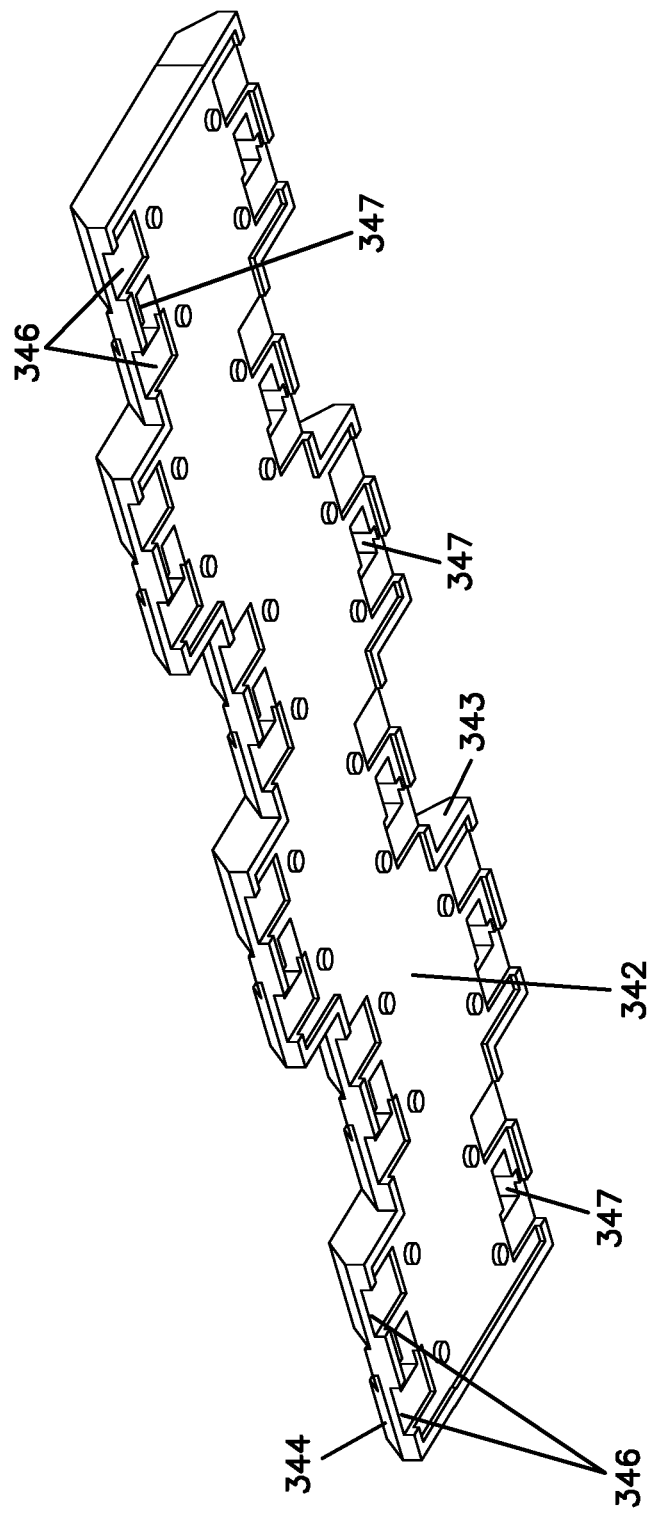
Figure 29:
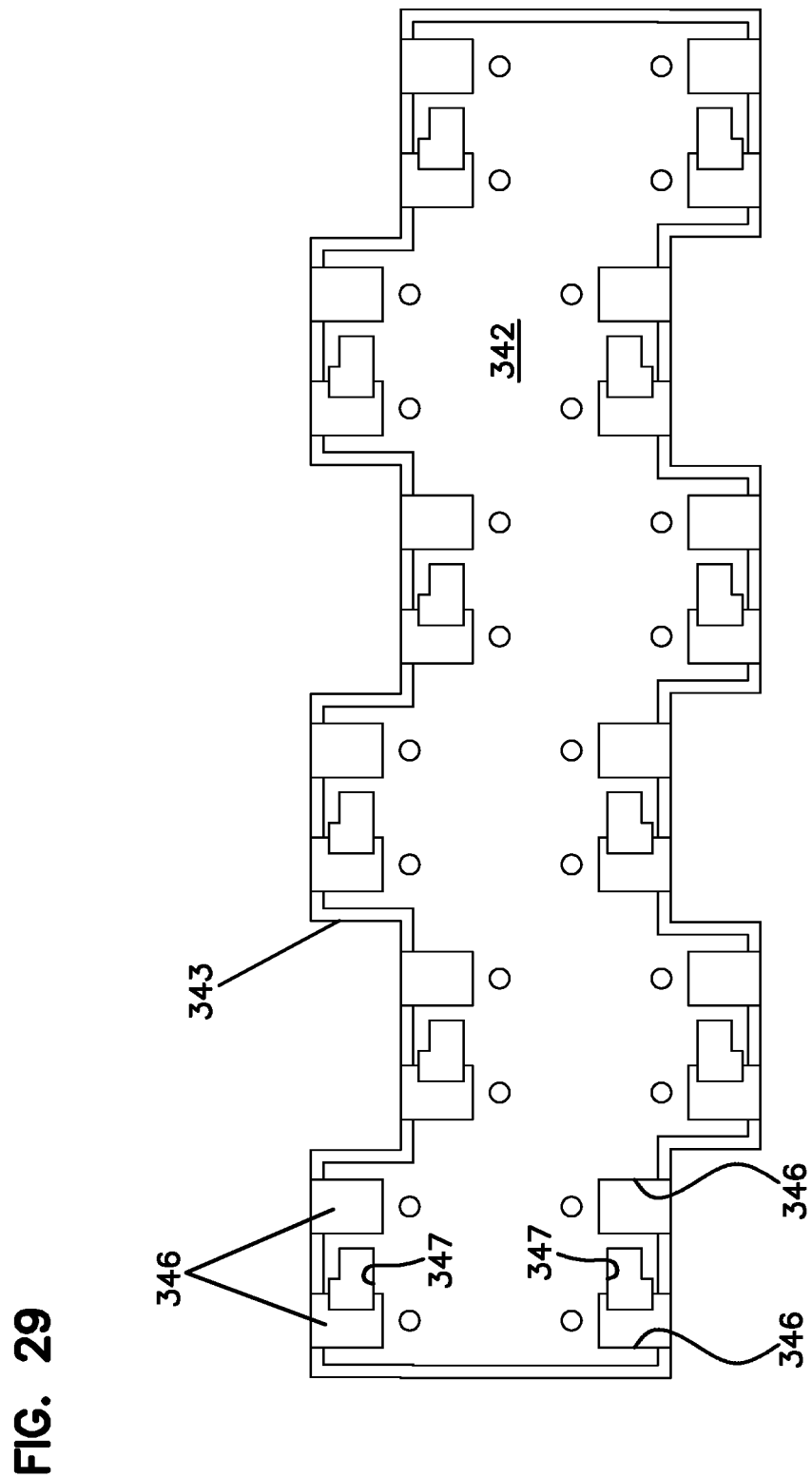

As seen in FIG. 28, the second surface 342 of the cover 340 defines recesses 346 that extend through the perimeter 343 of the cover 340. The recesses 346 accommodate LEDs or other light indicators mounted to the circuit board 330. Light from the indicators can shine through the recesses 346 in the perimeter to identify a section of the adapter block 310. For example, the cover 340 can define a recess 346 for each port 312 of the adapter block 310. In such implementations, the recesses 346 align with the respective port 312 identified by the corresponding indicator.

In some implementations, the adapter block 310 is configured to be coupled to one or more adapter blocks 310 and/or to be coupled to a tray (e.g., tray 250 of FIGS. 19-20), or other such structure. In certain implementations, each adapter block 310 includes an engagement member 317 that extends outwardly from at least one side 305, 306 of the adapter block 310. In an example, an engagement member 317 extends outwardly from both sides 305, 306 of the adapter block 310.

In certain implementations, the engagement member 317 has an H-shaped profile when viewed from the side 305, 306 the adapter block 310. For example, the engagement member 317 can have a two L-shaped flanges 317a extending outwardly from the side 305, 306 of the adapter block 310; a shelf 317b extending between the flanges 317a, and a ramp or tapered section 317c extending inwardly from the shelf 317b towards the side 305, 306 of the adapter block 310. The L-shaped flanges 317a face forwardly and rearwardly of the adapter block 310 (see FIG. 24). In certain implementations, a stop member 319 also extends outwardly from opposite sides 305, 306 of the adapter block 310.

Figure 30:
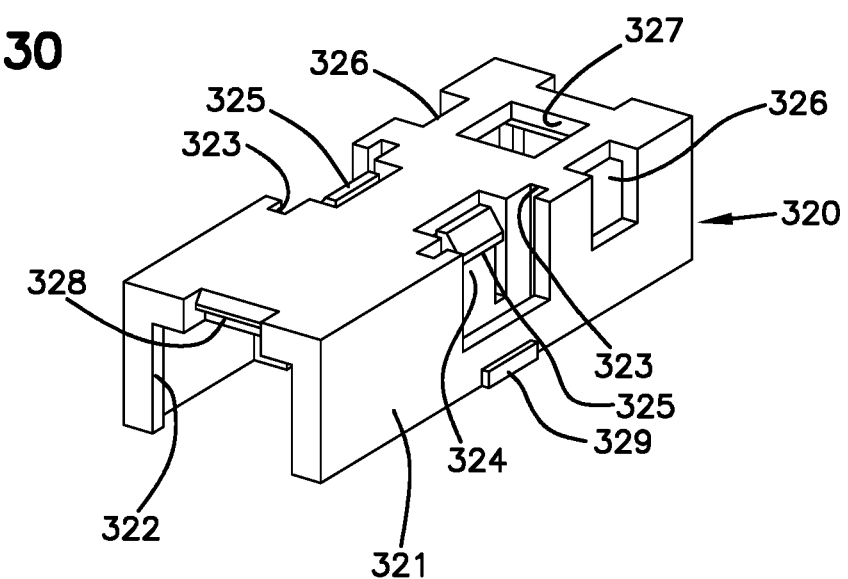
FIGS. 30-31 are perspective views of an example joining member suitable for use with the first adapter block assembly of FIG. 21.
Figure 31:
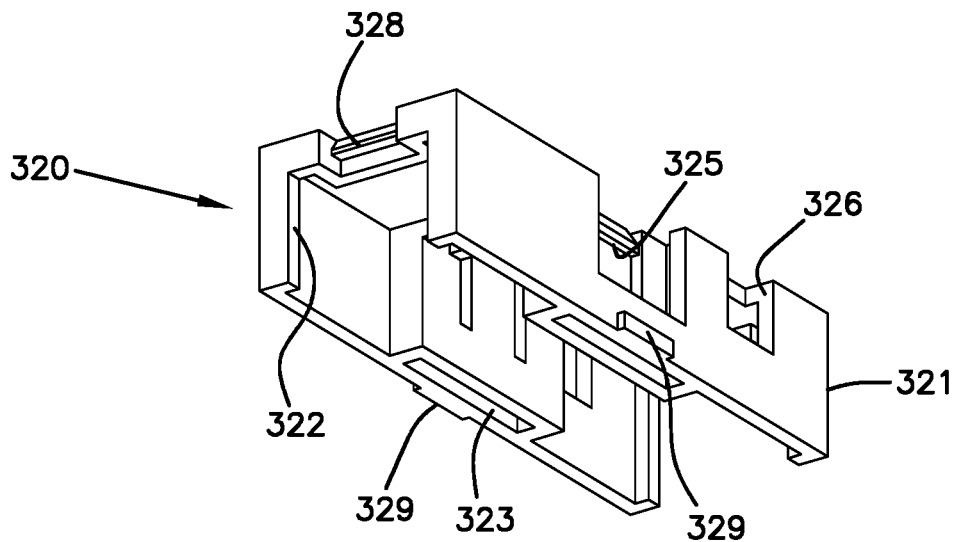
Figure 32:
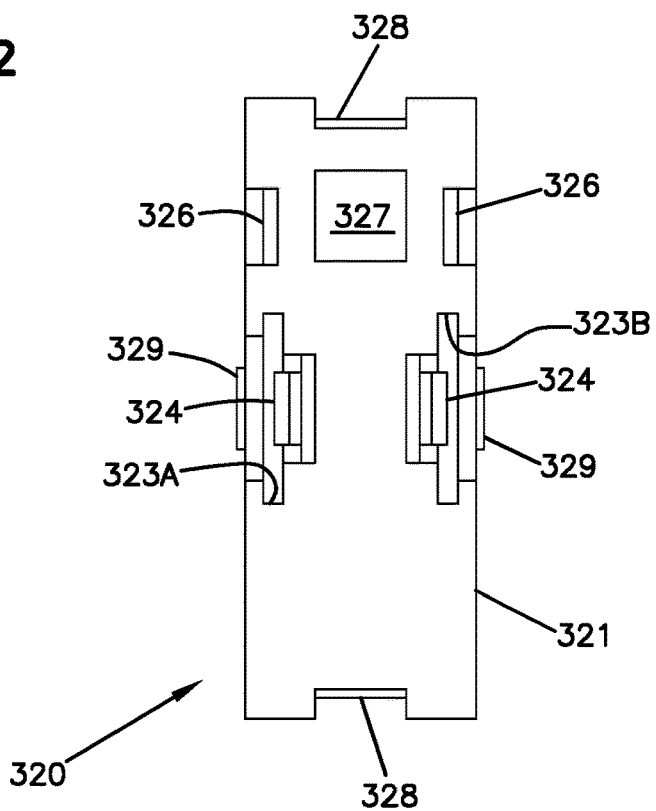
FIG. 32 is a top plan view of the joining member of FIG. 30.
Figure 33:
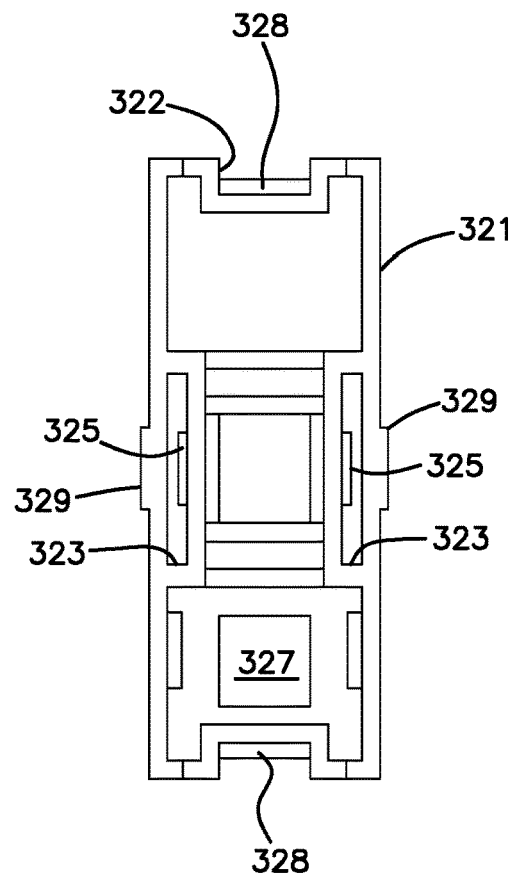
FIG. 33 is a bottom plan view of the joining member of FIG. 30.

Referring to FIGS. 30-33, two or more adapter blocks 310 can be coupled together using a joining member 320. As shown in FIG. 30, the joining member 320 includes a body 321 defining an open bottom leading to a generally hollow interior. The joining body 321 also defines openings 322 at the first and second ends of the body 321 that lead to the hollow interior. The top of the joining body 321 is configured to enable the intermediate portion 336 of the circuit board 330 to extend thereover. For example, in certain implementations, the body 321 defines an aperture 327 through which a circuit board connector 335 can pass (e.g., see FIG. 22) to enable connection between the circuit board 330 and an electrical circuit disposed beneath the adapter blocks 310.

Sidewalls of the body 321 define one or more receiving slots 323 that are sized to receive the engagement members 317 of the adapter blocks 310. In the example shown in FIG. 32, the joining member 320 includes a first receiving slot 323A at a first sidewall of the joining member 320 and a second receiving slot 323B at an opposite sidewall of the joining member 320. The joining member 320 holds two adapter blocks 310 together end-to-end (see FIGS. 21 and 22). Each receiving slot 323 extends through a top and corresponding side of the joining member 320. The slots 323 are sized to enable an adapter block engagement member 317 (e.g., the flanges 317a) to enter the slot 323 through the top of the joining member 320.

In some implementations, the joining member 320 also includes a latching arm 324 that extends upwardly within one or more of the receiving slots 323. The latching arm 324 includes a latching hook 325 that extends outwardly from the arm 324. When the engagement member 317 of the adapter block 310 is slit into the receiving slot 323, the ramp 317c of the engagement member 317 cams against the latching hook 325 to deflect the arm 324 inwardly until the latching hook 325 clears the shelf 317b. The arm 324 returns to its initial position so that the latching hook 325 catches on the shelf 317b. The latching arm 324 inhibits the adapter block 310 from being slid out of engagement with the joining member 320.

In some implementations, opposite sides of the joining member 320 each define a second slot 326 adjacent the receiving slot 323. The second slot 326 does not extend fully through the side of the joining member 320. The second slot 326 is sized to receive the stop member 319 when the adapter block engagement member 317 is slid into the receiving slot 323. Interaction between the second slot 326 and the stop member 319 inhibits the adapter block 310 from sliding all the way through the joining member 320. In some implementations, the joining body 321 also includes protrusions 329 that extend outwardly from the body 321 adjacent the receiving slots 323. For example, the protrusions 329 can be disposed beneath the receiving slots 323 at the sidewalls. In certain implementations, the adapter blocks 310 may seat on the protrusions 329 to inhibit movement of the adapter blocks 310 past the joining member 320.

In some implementations, the joining member 320 includes a retention member 328 disposed at each of the first and second open ends of the body 321. For example, each retention member 328 can be formed at a top of the body 321 and face out towards the respective end opening 322. In certain implementations, the retention member 328 can be inwardly recessed into the top of the body 321 relative to the open end of the body 321.

Figure 34:
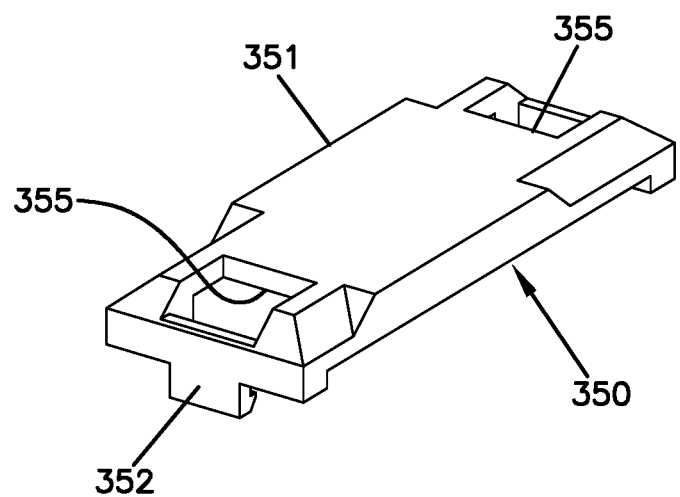
FIGS. 34-35 are perspective views of an intermediate cover piece suitable for use with the first adapter block assembly of FIG. 21.
Figure 35:
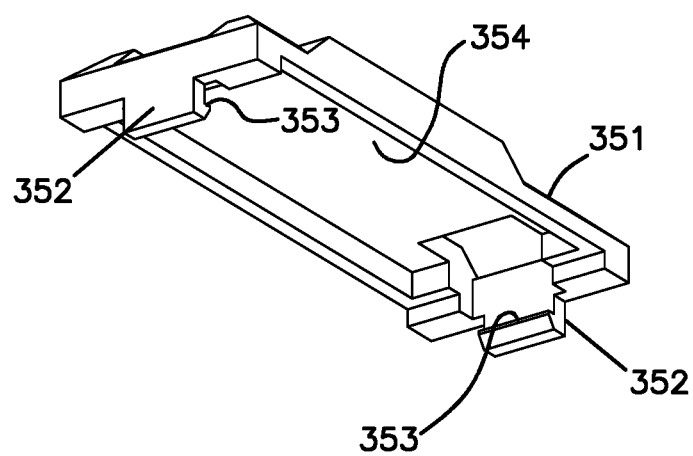

FIGS. 34-35 illustrate one example intermediate cover 350 that is configured to mount over the intermediate portion 336 of the circuit board 330. In some implementations, the intermediate cover 350 is configured to couple to the joining member 320. For example, in certain implementations, the intermediate cover 350 includes a body 351 from which two latching arms 352 extend downwardly at opposite ends. Each latching arm 352 includes a latching hook 353 that is configured to snap-fit, latch, or otherwise secure to the retention member 328 at one end of the joining member body 321. The intermediate cover 350 defines a hollow interior or recessed inner surface that accommodates any components 334 mounted to the intermediate portion 336 of the circuit board 330. In some implementations, the intermediate cover 350 fits between, but does not couple to the first and second covers 340A, 340B (see FIG. 21). In other implementations, the intermediate cover 350 can be coupled to the first and second covers 340A, 340B.

Figure 36:
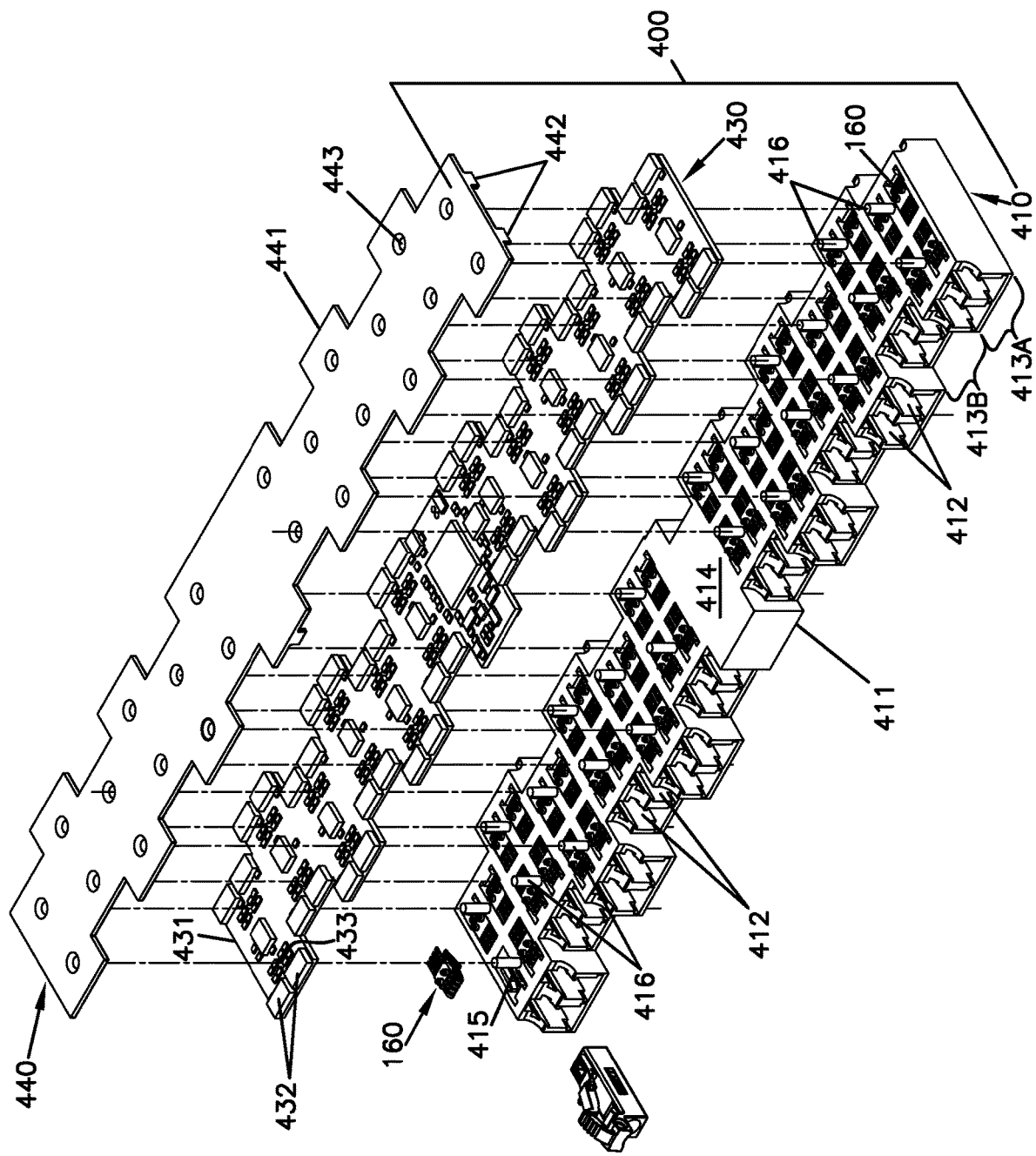
FIG. 36 is an exploded view of a third example adapter block assembly including a cover heat staked to an adapter block to sandwich a circuit board therebetween.
Figure 37:
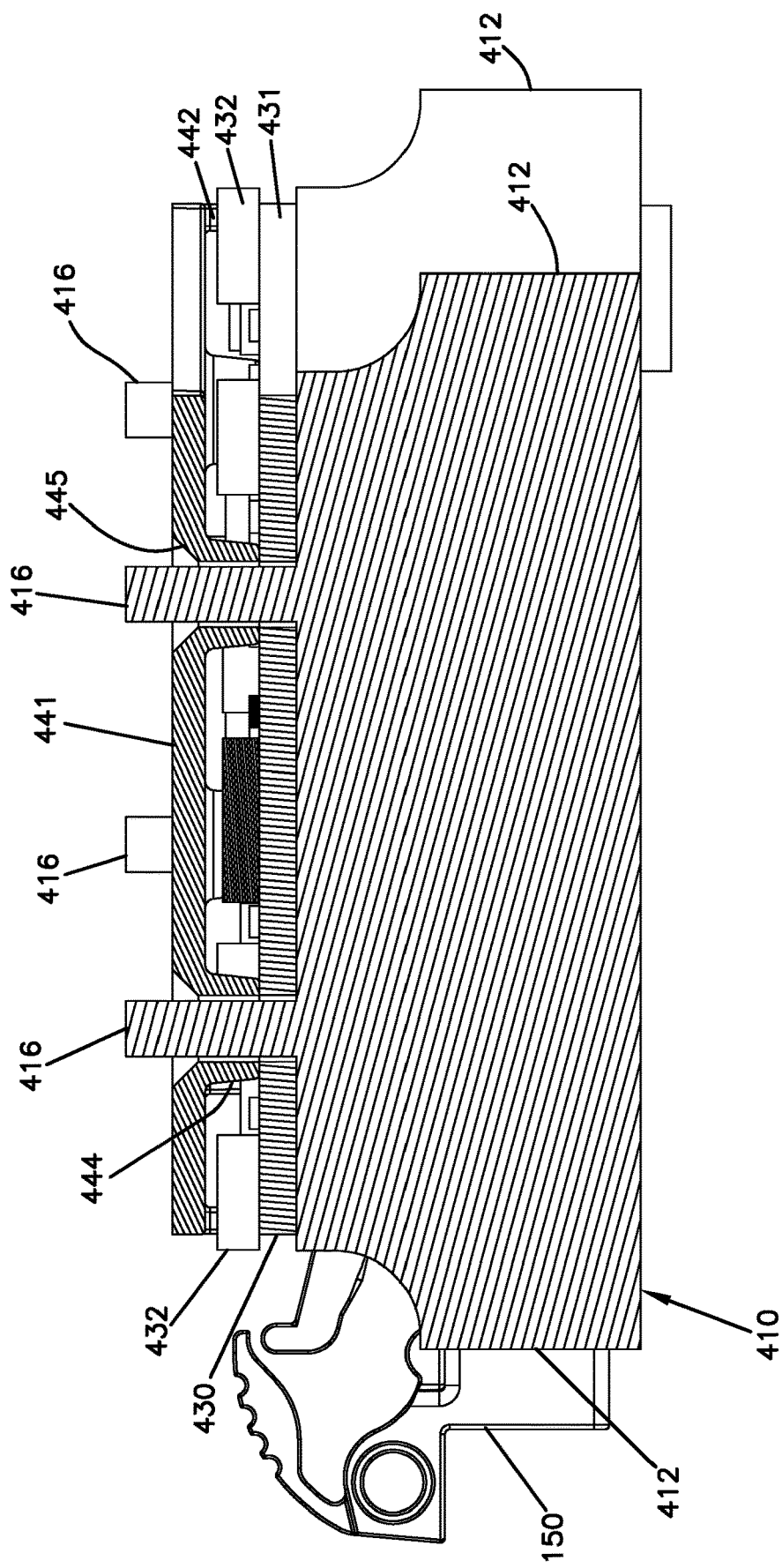
FIG. 37 is a cross-sectional view of the third example adapter block assembly of FIG. 36 with the components assembled together.
Figure 38:
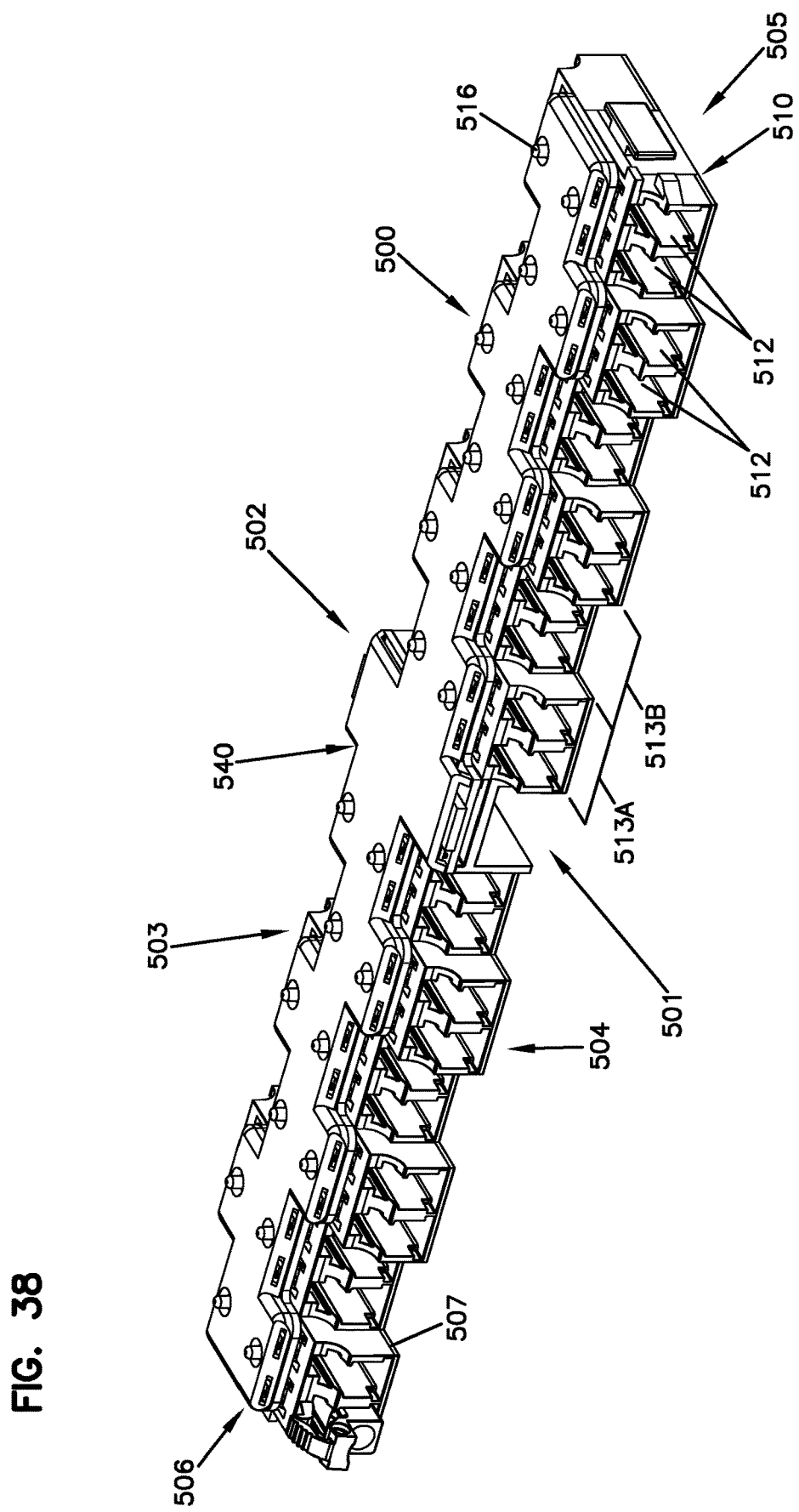
FIG. 38 is a top perspective view of a fourth example adapter block assembly including an adapter block, a circuit board, and a cover.
Figure 39:
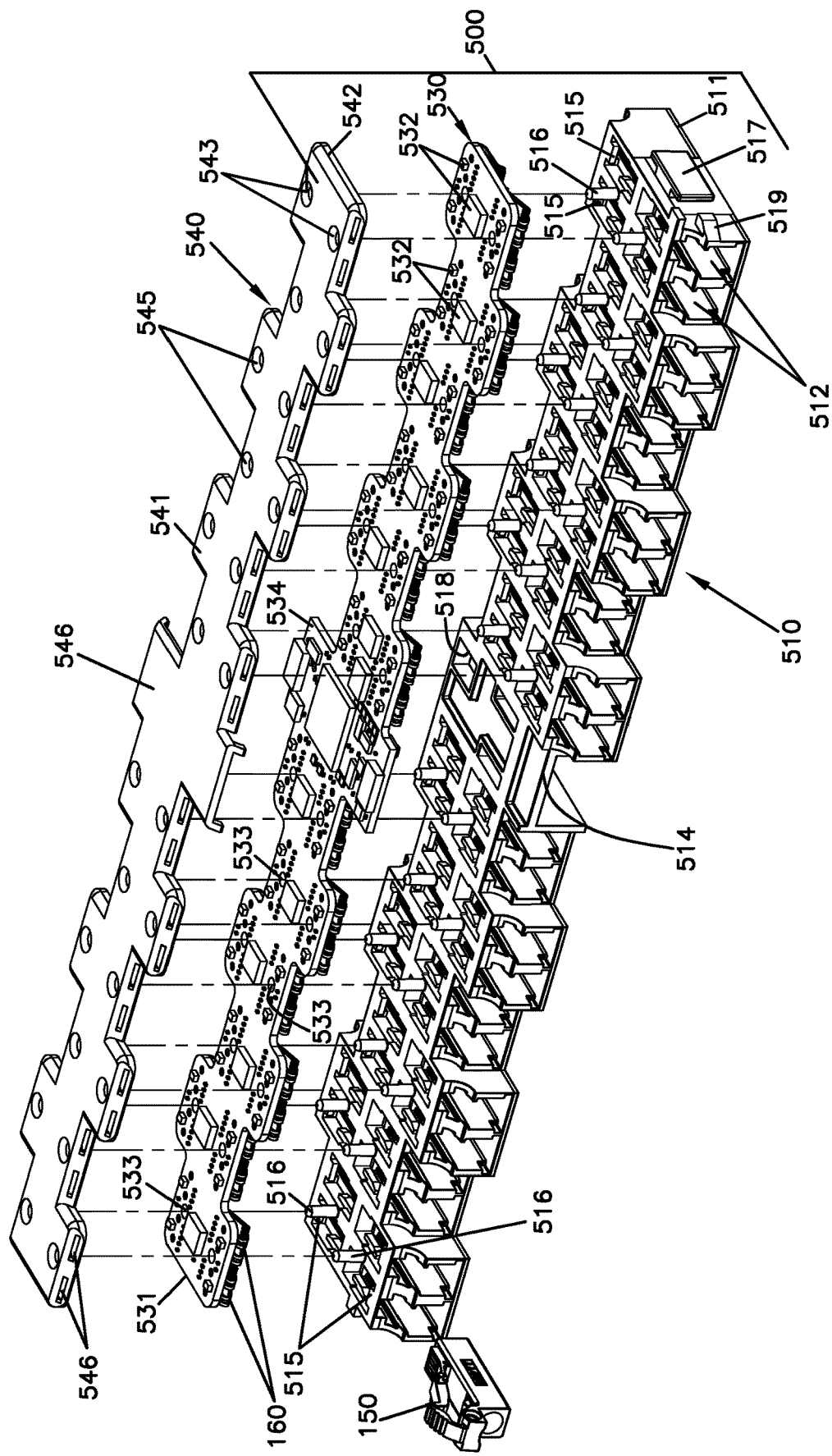
FIG. 39 shows the components of the fourth adapter block assembly of FIG. 38 exploded outwardly from each other.

Referring now to FIGS. 36-37, one or more cover pieces of an adapter block assembly can be secured to one or more adapter blocks using heat staking. For example, FIGS. 36-37 illustrate a third example adapter block assembly 400 including an adapter block 410, a circuit board 430, and a cover 440. In the example shown, each of these three components is formed from as a single-piece unit. In other implementations, however, any of these components could be formed from multiple pieces (e.g., multiple adapter blocks with joining members, multiple circuit boards, multiple cover pieces, etc.). In certain implementations, the adapter block assembly 400 can be configured to mount to a tray (e.g., tray 250 of FIGS. 19 and 20), or other structure.

The adapter block 410 includes a body 411 defining a plurality of front and rear connector ports 412. The adapter body 411 includes some sections 413 that are offset forwardly or rearwardly relative to other sections 413. For example, a first section 413A shown in FIG. 36 is offset forwardly relative to a second section 413B. In other implementations, however, the ports 412 of the adapter block 310 may be flush. In some implementations, the adapter block body 411 has a first group of ports 412 at a first side, a second group of ports 412 at a second side, and an intermediate portion 414 that separates the first and second groups. The intermediate portion 414 does not define ports 412.

A top of the adapter block 410 defines apertures 415 at which contact assemblies 160 can be mounted. In some implementations, a contact assembly 160 is disposed at each port 412. In other implementations, a contact assembly 160 can be disposed at alternate ports 412 and/or at the ports 412 on only the front or rear of the adapter block 410. Heat stakes 416 extend upwardly from the top of the adapter block 410. In the example shown, a front heat stake 416 and a rear heat stake 416 extend upwardly at each section 413 of the adapter block 410 except for the intermediate portion 414. In other implementations, the adapter block 410 can include any desired number of heat stakes 416.

The circuit board 430 includes a board body 431 on which electrical components 432 can be mounted. The circuit board body 431 also is configured to electrically couple to the contact assemblies 160 (e.g., via contact pads). The board body 431 defines openings 433 through which the heat stakes 416 extend when the circuit board 430 is seated on the adapter block 410.

The cover 440 is configured to extend over the circuit board 430 and to attach to the adapter block 410. The cover 440 includes a top plate 441 from which tabs 442 extend downwardly. The tabs 442 are configured to seat on the circuit board 430.

For example, in some implementations, the tabs 442 are configured to seat on the board body 431 (see FIG. 37). In other implementations, the tabs 442 can be configured to seat on components 432 of the circuit board 430. The tabs 442 raise the top plate 441 sufficiently far off the circuit board 430 to accommodate the circuit board components 432 beneath he top plate 441.

The cover 440 defines through-holes 443 that extend through the top plate 441 of the cover 440. The through-holes 443 are defined through wells 444 extending downwardly from the top plate 441. The through-holes 443 are sized to accommodate passage of the heat stakes 416 of the adapter blocks 410 when the circuit board 430 and cover 440 are mounted to the adapter block 410. The wells 444 define counter-bores 445 leading to the exterior surface of the top plate 441. The counter-bores 445 are frustro-conical portions of the through-hole 443 that taper away from the heat stakes 416. In certain implementations, the heat stakes 416 are sized to extend beyond the top plate 441 of the cover 440.

To secure the adapter block assembly 400 together, the tips of the heat stakes 416 are melted. The melted heat stakes 416 at least partially fill the counter-bores 445. In some implementations, the melted heat stakes 416 are generally flush with the exterior surface of the cover top plate 441. In other implementations, the melted heat stakes 416 can be recessed inwardly or can protrude outwardly from the cover top plate 441. In certain implementations, the melted heat stake material filling the counter-bores 445 does not fit through the wells 444, thereby inhibiting removal of the cover 440 from the adapter block 410. For example, the melted material may have a frustro-conical shape or other shape having a maximum cross-dimension that is greater than an internal cross-dimension of the well 444. In certain implementations, the melted heat stake material fuses or otherwise bonds to the material forming the cover 440 to inhibit removal of the cover 440 from the adapter block 410.

In some implementations, the heat stakes 416 are positioned adjacent the contact assemblies 160 (e.g., adjacent the apertures 415) mounted to the adapter block 410. Accordingly, the bond between the cover 440 and the adapter block 410 is strongest near the contact assemblies 160. These bonds facilitate holding the cover 440 and hence the circuit board 430 against the adapter block 410 despite any deflection of the contact assembly 160 (e.g., the sensing contact 166) against the circuit board 430. Maintaining the position of the circuit board 430 even during deflection of the contact assembly 160 enhances the connection between the electrical contacts 162 of the contact assembly 160 and contact pads on the circuit board 430.

FIGS. 38-45 illustrate a fourth example adapter block assembly 500 suitable for implementing the adapter block assembly 110 of FIG. 1. The adapter block assembly 500 has a front 501, a rear 502, a top 503, a bottom 504, a first side 505, and a second side 506. A periphery 507 of the adapter block assembly 500 defined by the front 501, rear 502, and sides 505, 506 defines a staggered configuration. Ports 512 for receiving optical connectors (e.g., optical connectors 150) along insertion axes are provided at the front 501 and rear 502 of the second adapter block assembly 500. In some implementations, adjacent ports 512 are staggered forwardly/rearwardly relative to each other. In the example shown, adjacent pairs of ports 512 are staggered forwardly/rearwardly relative to each other. The staggering of the ports 512 enhances access to individual connectors 150 plugged into the ports 512.

The fourth example adapter block assembly 500 includes an adapter block 510, a circuit board 530, and a cover 540. In the example shown, each of these three components 510, 530, 540 is formed from as a single-piece unit. In other implementations, however, any of these components 510, 530, 540 could be formed from multiple pieces (e.g., multiple adapter blocks with joining members, multiple circuit boards, multiple cover pieces, etc.).

Figure 40:
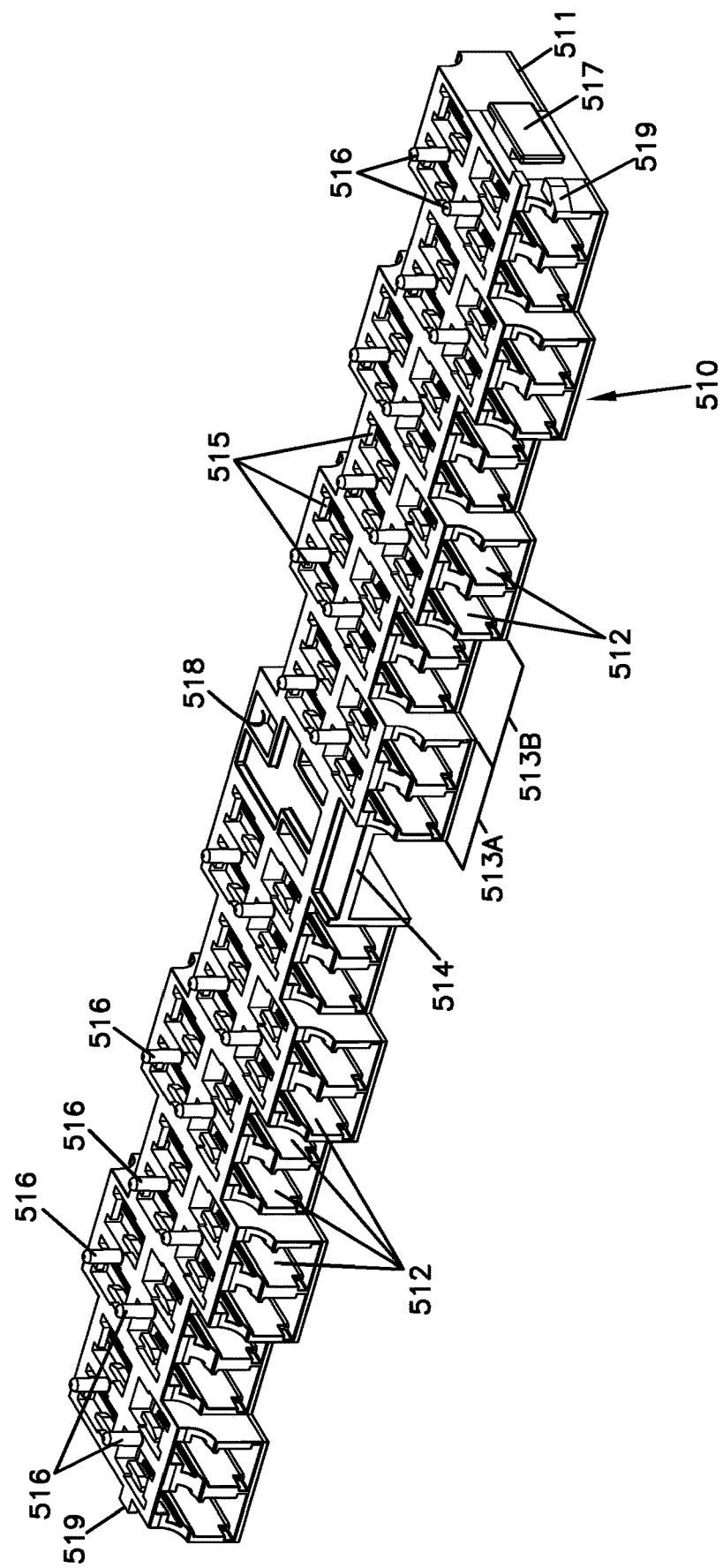
FIGS. 40-42 illustrate an example adapter block suitable for use in the fourth adapter block assembly of FIG. 38.

The adapter block 510 includes a body 511 defining a plurality of front and rear connector ports 512. The adapter body 511 includes some sections 513 that are offset forwardly or rearwardly relative to other sections 513. For example, a first section 513A shown in FIG. 40 is offset forwardly relative to a second section 513B. In other implementations, however, the ports 512 of the adapter block 510 may be flush. In some implementations, the adapter block body 511 has a first group of ports 512 at a first side, a second group of ports 512 at a second side, and an intermediate portion 514 that separates the first and second groups. The intermediate portion 514 does not define ports 512.

A top of the adapter block 510 defines apertures 515 at which contact assemblies 160 can be mounted. In some implementations, a contact assembly 160 is disposed at each port 512. In other implementations, a contact assembly 160 can be disposed at alternate ports 512 and/or at the ports 512 on only the front or rear of the adapter block 510. Heat stakes 516 extend upwardly from the top of the adapter block 510. In the example shown, a front heat stake 516 and a rear heat stake 516 extend upwardly at each section 513 of the adapter block 510 except for the intermediate portion 514. In other implementations, the adapter block 510 can include any desired number of heat stakes 516.

Figure 41:
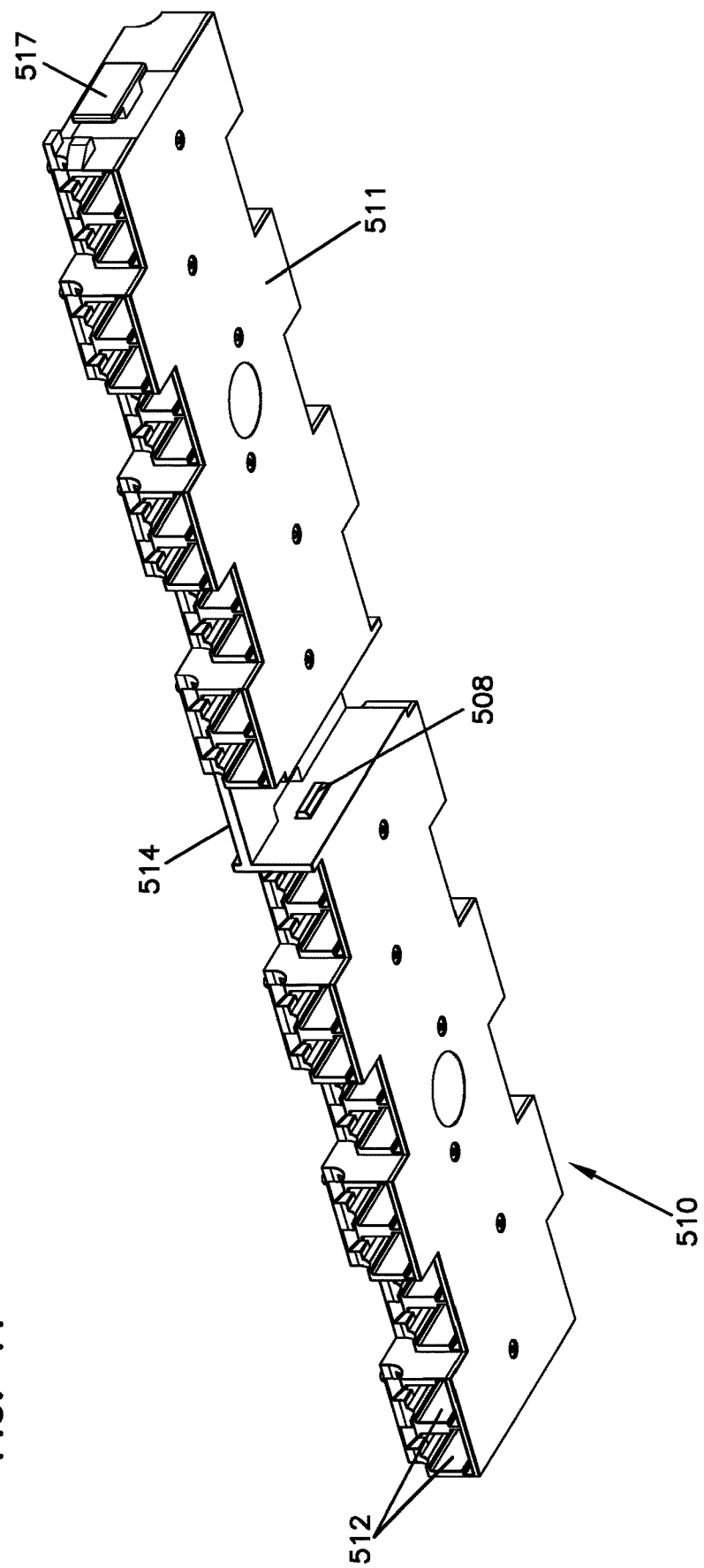
Figure 42:
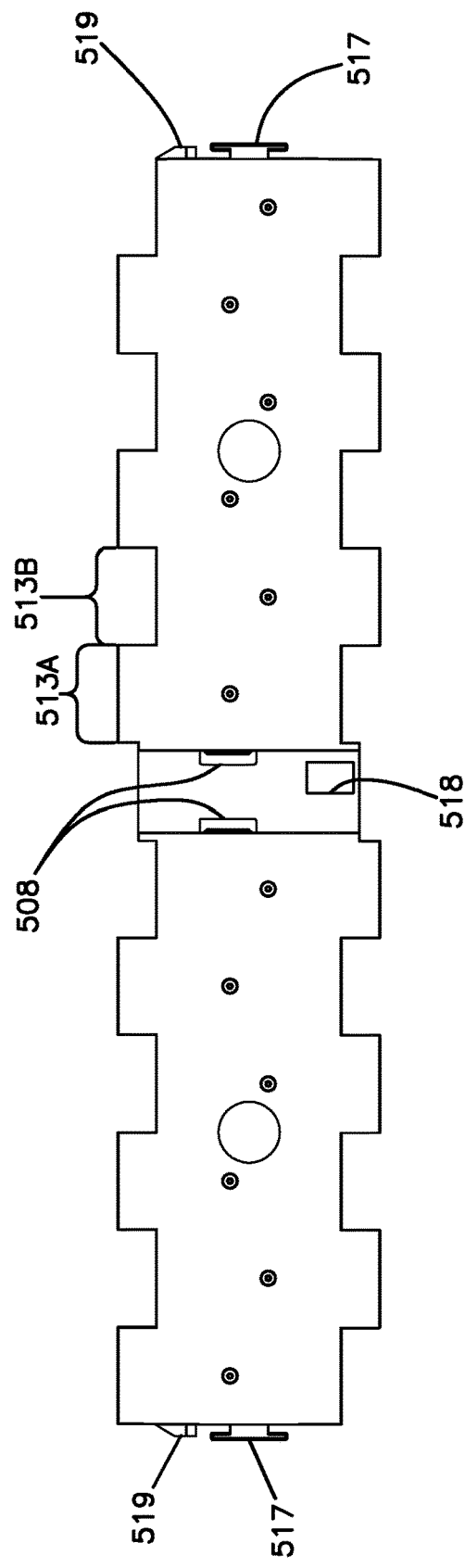
Figure 43:
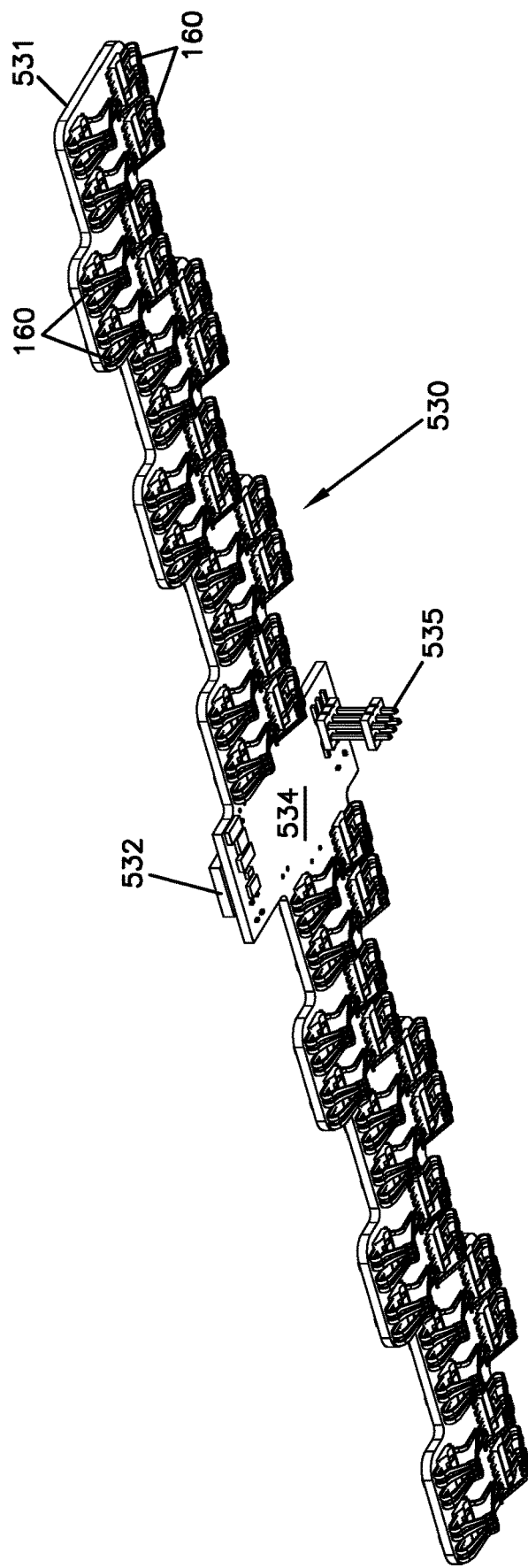
FIG. 43 is a bottom perspective view of contact assemblies mounted to a circuit board suitable for use in the fourth adapter block assembly of FIG. 38.
Figure 44:
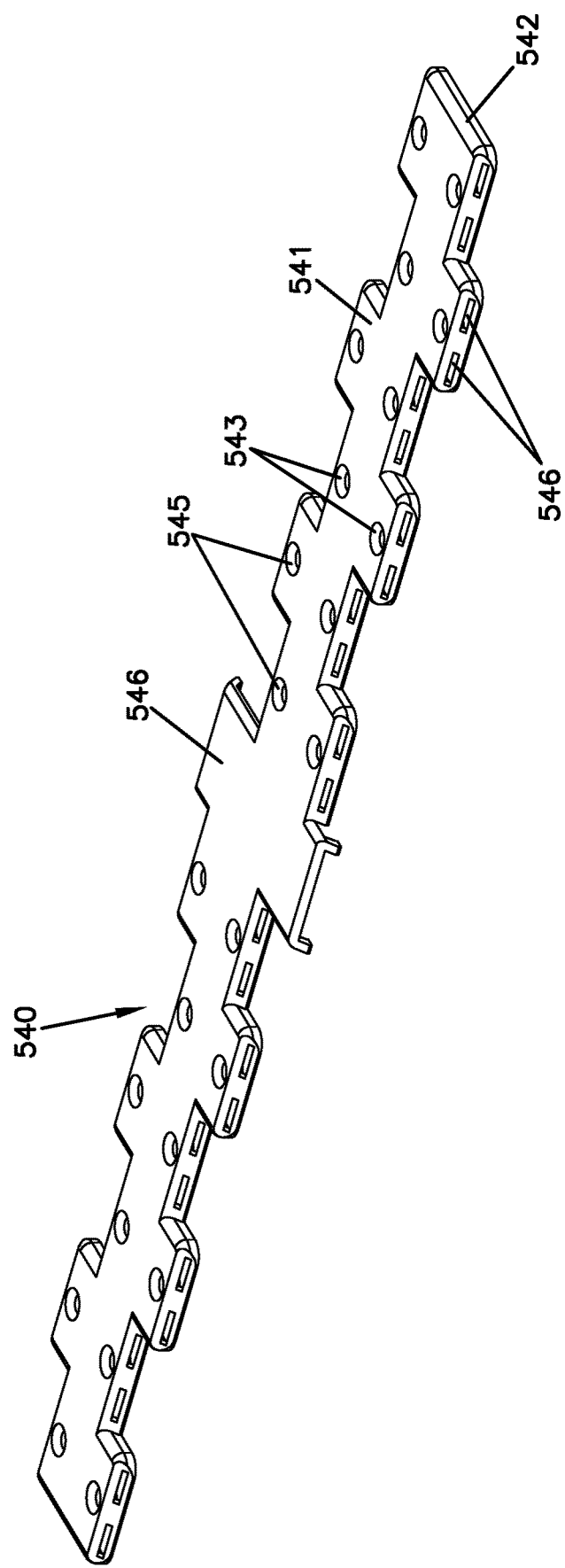
FIGS. 44-45 illustrate one example cover suitable for use in the fourth adapter block assembly of FIG. 38.
Figure 45:
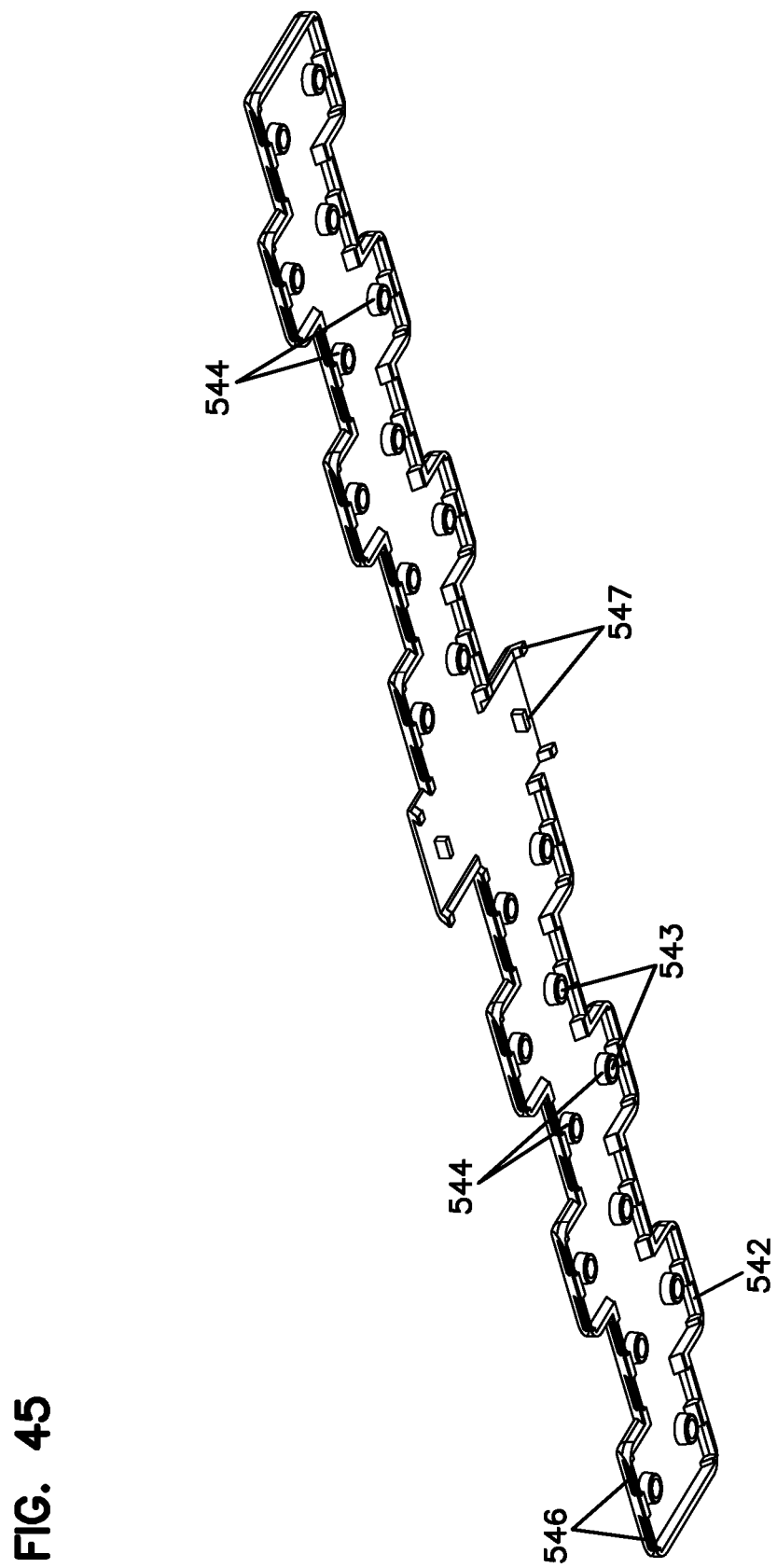

In some implementations, the adapter block 510 can be configured to mount to a tray (e.g., tray 250 of FIGS. 19 and 20), or other structure. For example, in certain implementations, sides 505, 506 of the adapter block 510 include engagement members 517 that extend outwardly from the adapter body 511. The engagement members 517 can be configured to fit into slots defined in the tray. In certain implementations, the adapter block 510 also can include stop members 519 that also are configured to interact with retention structures on the tray. As shown in FIGS. 41-42, the intermediate portion 514 of the adapter block 510 can include inward protrusions 508 that are configured to engage latch arms (e.g., latch arms 256 of FIG. 19) to secure the adapter block 510 to the tray.

The circuit board 530 includes a board body 531 on which electrical components 532 can be mounted. The circuit board body 531 also is configured to electrically couple to the contact assemblies 160 (e.g., via contact pads). The board body 531 defines openings through which the heat stakes 516 extend when the circuit board 530 is seated on the adapter block 510. The board body 531 also includes an intermediate portion 534 that is configured to extend over the intermediate portion 514 of the adapter block 510. A circuit board connector 535 can extend downwardly from the circuit board body 531 and through an aperture 518 defined in the intermediate portion 514 of the adapter block 510 to connect to an electrical circuit disposed beneath the adapter block 510.

The cover 540 is configured to extend over the circuit board 530 and to attach to the adapter block 510. The cover 540 includes a top plate 541 from which sidewalls 542 extend downwardly. The sidewalls 542 are configured to seat on the circuit board 430. For example, in some implementations, the sidewalls 542 are configured to seat on the board body 530. In other implementations, the sidewalls 542 can be configured to seat on components 532 of the circuit board 430. The sidewalls 542 raise the top plate 541 sufficiently far off the circuit board 530 to accommodate the circuit board components 532 beneath he top plate 541. In certain implementations, tabs 547 also extend downwardly from the top plate 541 to hold the top plate 541 off the circuit board 530. In certain implementations, the sidewalls 542 define apertures 546 that lead to a hollow interior of the cover 540. The apertures 546 enable light from indicators (e.g., LEDs) mounted to the circuit board 530 to shine through and indicate an adapter port 512.

The cover 540 defines through-holes 543 that extend through the top plate 541. The through-holes 543 are defined through wells 544 extending downwardly from the top plate 541 (see FIG. 45). The through-holes 543 are sized to accommodate passage of the heat stakes 516 of the adapter blocks 510 when the circuit board 530 and cover 540 are mounted to the adapter block 510. The wells 544 define counter-bores 545 (FIG. 44) leading to the exterior surface of the top plate 541. The counter-bores 545 are frustro-conical portions of the through-hole 543 that taper away from the heat stakes 516. In certain implementations, the heat stakes 516 are sized to extend beyond the top plate 541 of the cover 540.

To secure the components 510, 530, 540 of the adapter block assembly 500 together, the tips of the heat stakes 516 are melted. The melted tips at least partially fill the counter-bores 545. In some implementations, the melted heat stakes 516 are generally flush with the exterior surface of the cover top plate 541. In other implementations, the melted heat stakes 516 can be recessed inwardly or can protrude outwardly from the cover top plate 541. In certain implementations, the melted heat stake material filling the counter-bores 545 does not fit through the wells 544, thereby inhibiting removal of the cover 540 from the adapter block 510. For example, the melted material may have a frustro-conical shape or other shape having a maximum cross-dimension that is greater than an internal cross-dimension of the well 544. In certain implementations, the melted heat stake material fuses or otherwise bonds to the material forming the cover 540 to inhibit removal of the cover 540 from the adapter block 510.

In accordance with some aspects of the disclosure, some of the adapter block assemblies disclosed above have heights of no more than 13 mm including the adapters, the contact assemblies, the circuit board assemblies, and any cover assembly or housing assembly. For example, some of the adapter block assemblies have heights of no more than 12.75 mm. Certain of the adapter block assemblies have heights of no more than 12.5 mm. In an example, certain of the adapter block assemblies have heights of no more than 12.55 mm. In certain implementations, the adapter assemblies by themselves can have heights of no more than 9.5 mm. In an example, certain of the adapter block assemblies by themselves can have heights of no more than 9.35 mm. In certain implementations, the adapter assemblies by themselves can have heights of no more than 9 mm. In certain implementations, the adapter assemblies by themselves can have heights of no more than 8.5 mm. In certain implementations, the adapter assemblies by themselves can have heights of no more than 8 mm.

Figure 46:
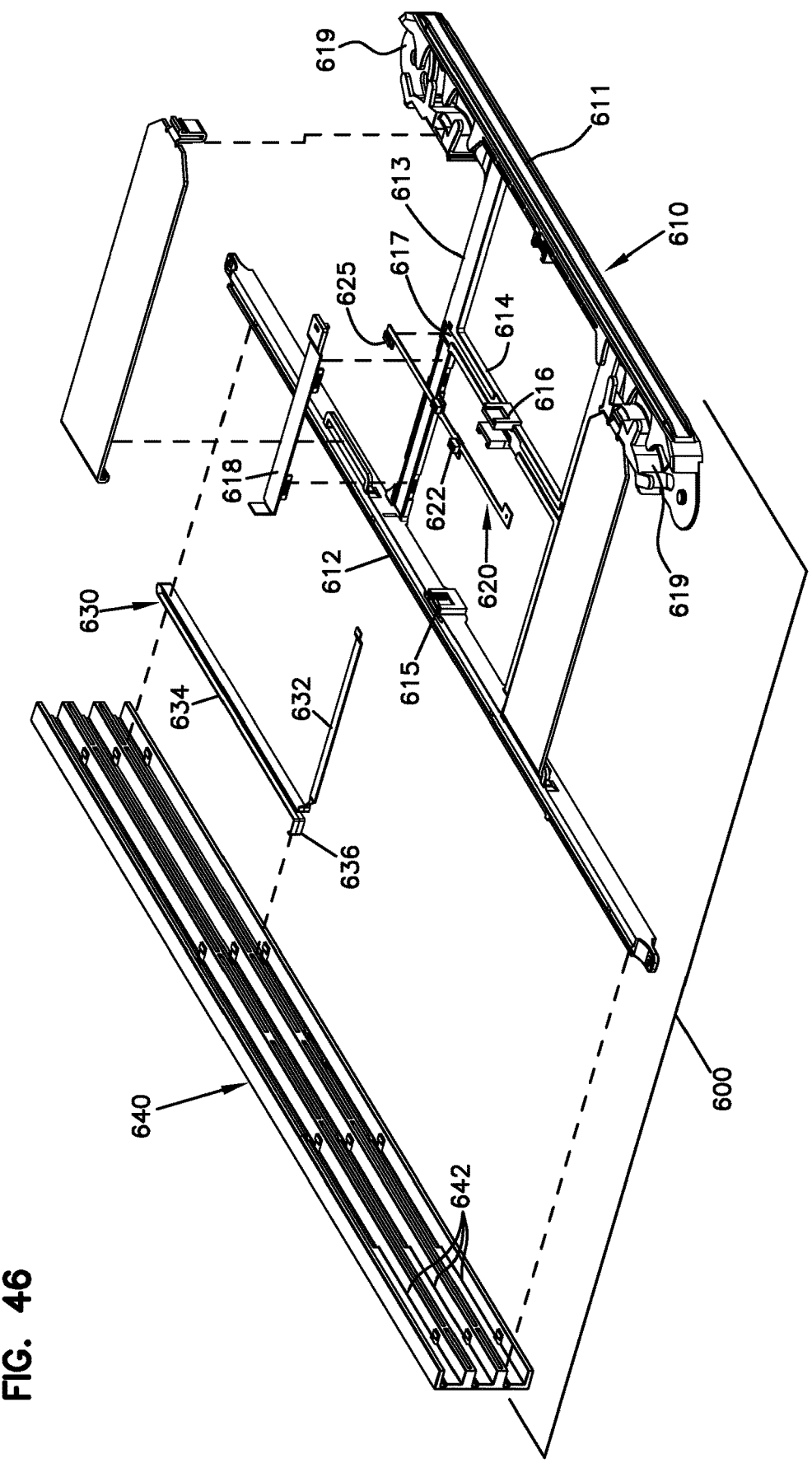
FIG. 46 illustrates an example tray arrangement including another example tray to which any of the adapter block assemblies disclosed herein can be mounted.
Figure 47:
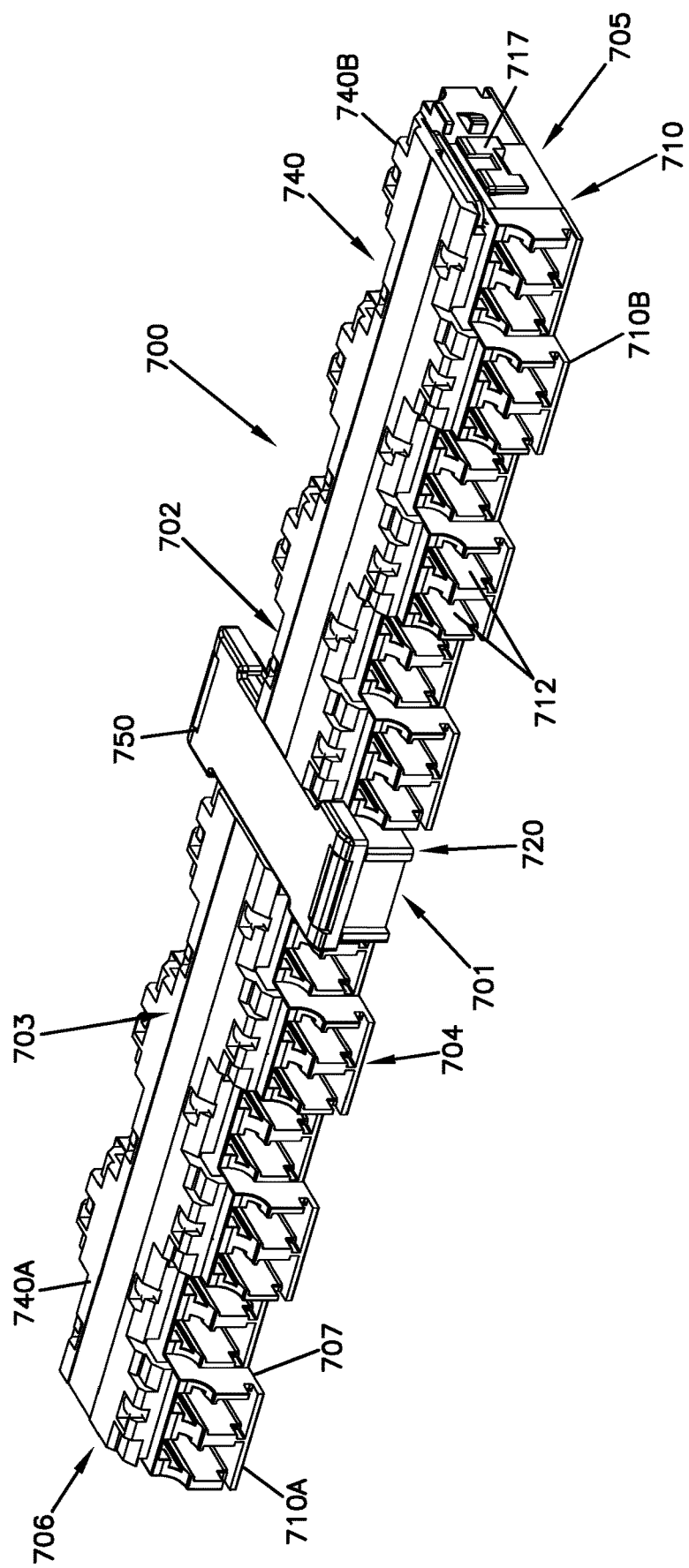
FIG. 47 is a perspective view of another adapter block assembly.

FIG. 46 illustrates an example tray arrangement 600 including another example tray 610 to which any of the adapter block assemblies disclosed herein can be mounted. A circuit board arrangement 620 is configured to mount to the tray 610. The circuit board arrangement 620 is configured to communicate with components (e.g., a controller) of the circuit board arrangement of the adapter block assembly mounted to the tray 610. The tray 610 is configured to be slideably mounted to a side plane 640. A flexible cable 630 or other electrical circuit connects the circuit board arrangement 620 of the tray 610 to an electrical circuit or local processor located at or connected to the side plane 640. The tray 610 also can be configured to manage optical fibers routed to the ports of the adapter block assembly mounted to the tray 610.

In the example shown in FIG. 46, the tray 610 includes cross-members 613 extending between two side rails 611, 612. A mounting rail 614 extends between the cross-members 613. In some implementations, mounting members 616 extend upwardly from the mounting rail 614. The mounting members 616 are configured to engage an adapter block assembly to further secure the adapter block assembly to the tray 610. Mounting structures 615 also are provided at the inner sides of the side rails 611, 612. In certain implementations, the mounting structures 615 are laterally aligned with each other and with the mounting members 616.

The mounting rail 614 defines a pocket 617 at which the circuit board 620 can be mounted. Connection members 622 are mounted to the circuit board 620 in alignment with circuit board contact members of the adapter block assembly to be mounted to the tray 610. The circuit board 620 also includes a connection member 625 at a cross-member 613. In certain implementations, at least part of the cross-member 613 can also define part of the pocket 617. At least a portion 632 of the flexible cable 630 can be routed through the second side rail 612, through the pocket 617 along the cross-member 613, to the connection member 625 of the circuit board 620. A cover 618 can be mounted to the cross-member 613 to cover (e.g., protect) the flexible cable portion 632.

An opposite end 636 of the flexible cable is routed to or through the side plane 640. The side plane 640 defines one or more guide slots 642 along which the tray 610 can slide. For example, one of the side rails 611, 612 of the tray 610 can slide along one of the guide slots 642. The flexible cable 630 includes an intermediate length 634 that extends between the side rail 612 of the tray 610 and the side plane 640. The intermediate length 634 is folded back on itself to accommodate movement of the tray 610 relative to the side plane 640.

Information about how such trays (e.g., trays 610) can be moveably mounted within a chassis or rack and how such an arrangement can be used within a telecommunications system can be found in copending U.S. application Ser. No. 14/169,941, filed Jan. 31, 2014, and titled "Slidable Telecommunications Tray with Cable Slack Management," and having attorney docket number 02316.3597USU1, the disclosure of which is hereby incorporated herein by reference. Another system including trays on which the adapter blocks and cassettes disclosed herein can be mounted is disclosed in copending U.S. application Ser. No. 13/925,375, filed Jun. 24, 2013, and titled "Slidable Fiber Optic Connection Module with Cable Slack Management," the disclosure of which is hereby incorporated herein by reference.

FIGS. 47-55 illustrate a fifth example adapter block assembly 700 suitable for implementing the adapter block assembly 110 of FIG. 1. The adapter block assembly 700 has a front 701, a rear 702, a top 703, a bottom 704, a first side 705, and a second side 706. A periphery 707 of the adapter block assembly 700 defined by the front 701, rear 702, and sides 705, 706 defines a staggered configuration. Ports 712 for receiving optical connectors (e.g., optical connectors 150) along insertion axes are provided at the front 701 and rear 702 of the second adapter block assembly 700. In some implementations, adjacent ports 712 are staggered forwardly/rearwardly relative to each other. In the example shown, adjacent pairs of ports 712 are staggered forwardly/rearwardly relative to each other. The staggering of the ports 712 enhances access to individual connectors 150 plugged into the ports 712.

The fifth example adapter block assembly 700 includes at least one adapter block arrangement 710, a circuit board 730 (FIG. 50), and a cover arrangement 740. The adapter block arrangement 710 includes a first adapter block 710A, a second adapter block 710B, and a joining member 720. The joining member 720 couples the first and second adapter blocks 710A, 710B together. In other implementations, the adapter block arrangement 710 can be formed as a single piece. The circuit board 730 seats on the adapter block arrangement 710 so that a first surface 731 faces away from the adapter block arrangement 710 and a second surface 732 faces towards the adapter block arrangement 710 (see FIG. 50).

Figure 50:
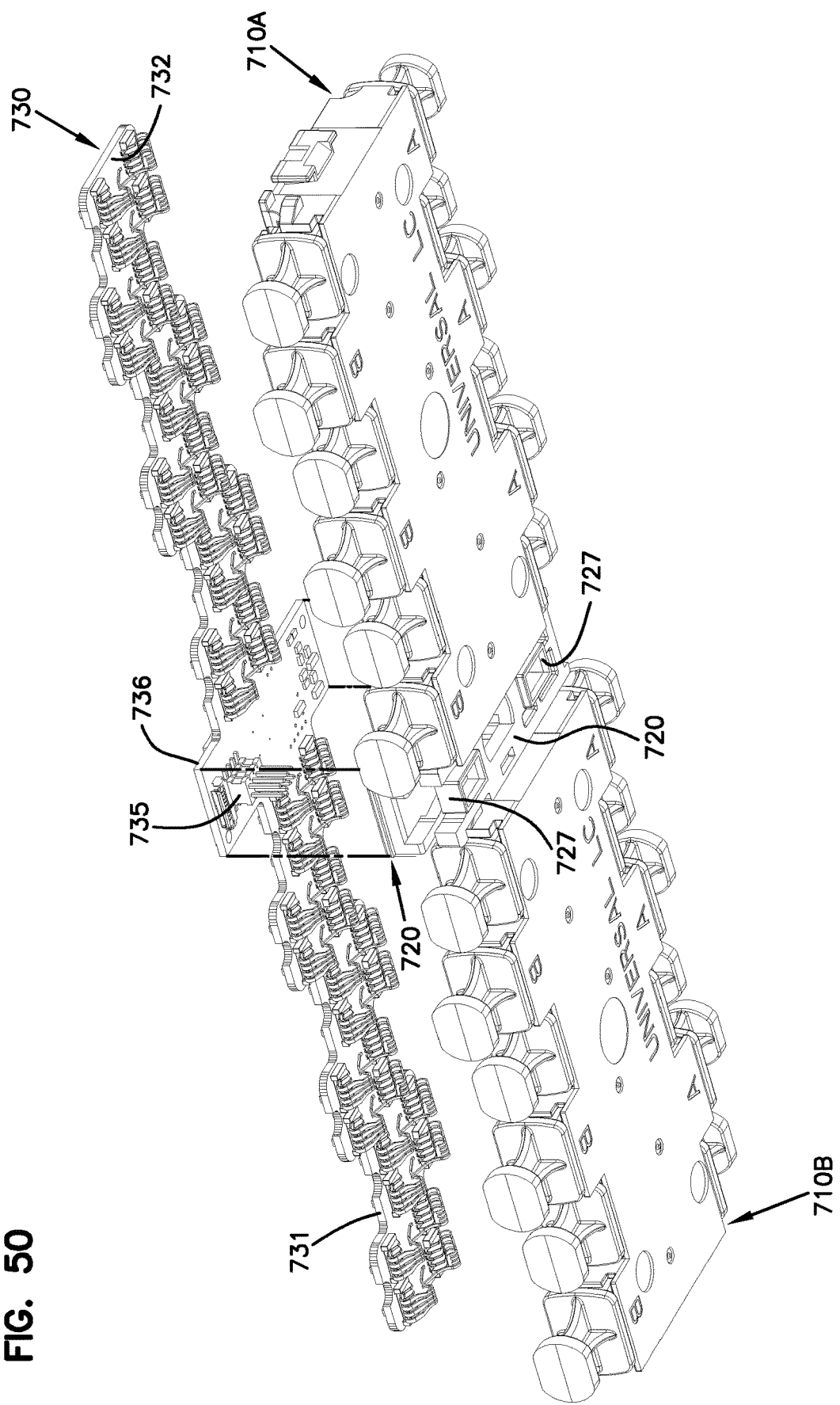
FIG. 50 is a bottom perspective view of the adapter block assembly of FIG. 47 with the circuit board and contact assemblies exploded away from the adapter blocks of the adapter block assembly.

The circuit board 730 shown in FIG. 50 includes an intermediate portion 736 sized to extend over the joining member 720 coupling together the adapter blocks 710A, 710B. A circuit board connector 735 (FIG. 50) extends downwardly from the second surface 732 of the circuit board 730 at the intermediate portion 736. The circuit board connector 735 is configured to electrically connect the circuit board 730 (e.g., and hence contacts 160 mating with the circuit board 730) to a data processing network (e.g., via another circuit board or flex circuit) as will be disclosed in more detail herein. In certain implementations, the joining member 720 is sized to accommodate passage of the circuit board connector 735 therethrough.

In some implementations, the joining member 720 includes a shroud 727 through which pins of the connector 735 extend. The shroud 727 inhibits damage (e.g., bending, breaking, etc.) to the pins when the adapter block arrangement 710 is being mounted to the tray arrangement 600 or other mounting surface. In certain implementations, the joining member 720 includes two shrouds 727 (e.g., a forward shroud and a rearward shroud). The shrouds 727 accommodate multiple connectors on the tray 610. In an example, the pin connector 735 extends through the forward shroud 727 and into a first of two female connectors on the tray 610 and a second of the female connectors is received in the rearward shroud 727. In another example, the adapter block assembly 700 is rotated 180° relative to the tray 610 so that the pin connector 735 extends through the forward shroud 727 and into the second female connector on the tray 610 and the first female connector is received in the rearward shroud 727.

The cover arrangement 740 includes a first cover 740A, a second cover 740B, and an intermediate cover 750. The first and second covers 740A, 740B are disposed over the circuit board 730 and coupled to the adapter blocks 710A, 710B as will be disclosed in more detail herein. The intermediate cover 750 extends over an intermediate portion 736 (FIG. 50) of the circuit board 730 between the first and second covers 740A, 740B. In other implementations, the covers 740A, 740B, 750 can be formed as a single piece. In still other implementations, the circuit board 730 can be separated into multiple pieces.

Figure 56:
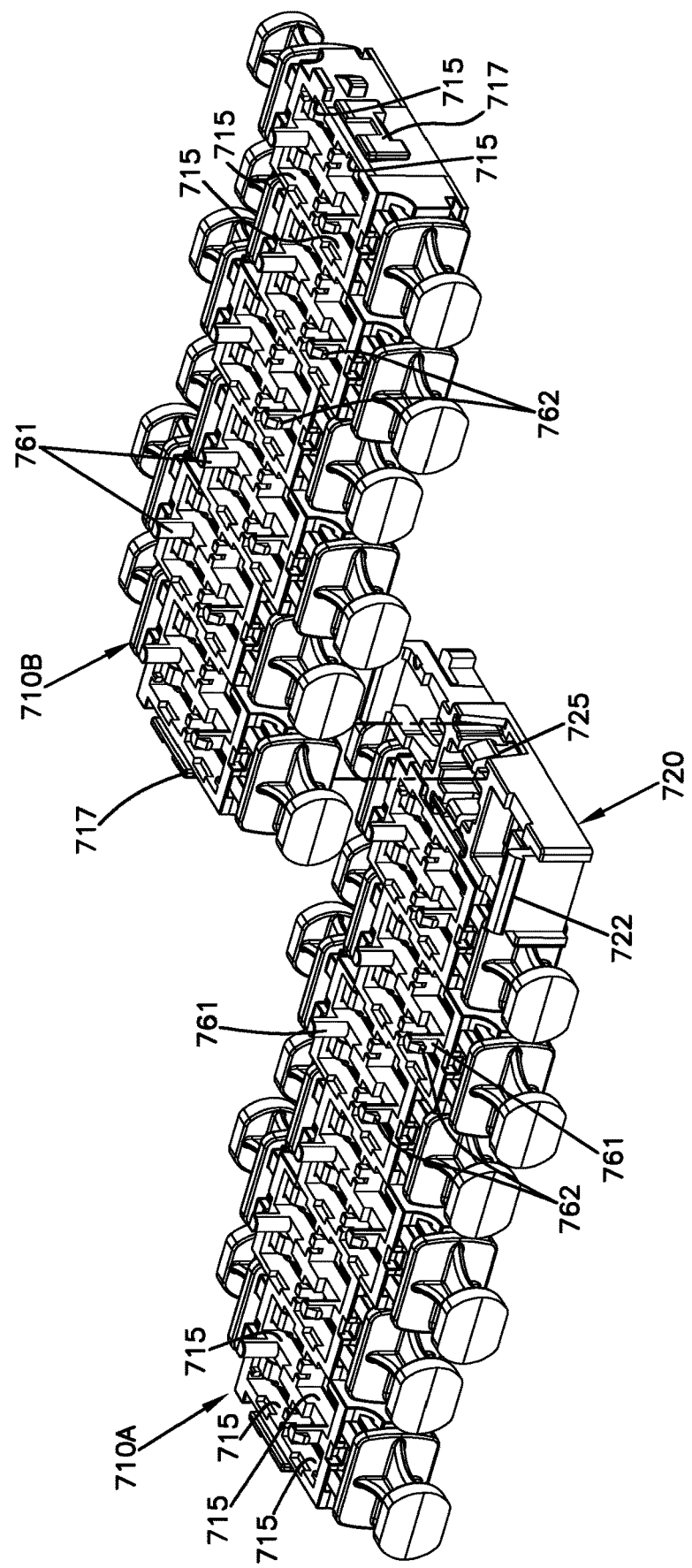
FIG. 56 is a perspective view of an optical adapter block exploded away from a joining member coupled to another optical adapter block.

FIG. 56 illustrates an example first adapter block 710A, an example second adapter block 710B, and an example joining member 720. A top of each adapter block 710A, 710B defines apertures 715 at which contact assemblies 160 can be mounted. Each aperture 715 aligns with one of the ports 712. In some implementations, a contact assembly 160 is disposed at each port 712. In other implementations, a contact assembly 160 can be disposed at alternate ports 712 and/or at the ports 712 on only the front or rear of the adapter block arrangement 710. The second surface 732 of the circuit board 730 includes contact pads that align with the contact assemblies 160 for electrical communication therewith.

Figure 51:
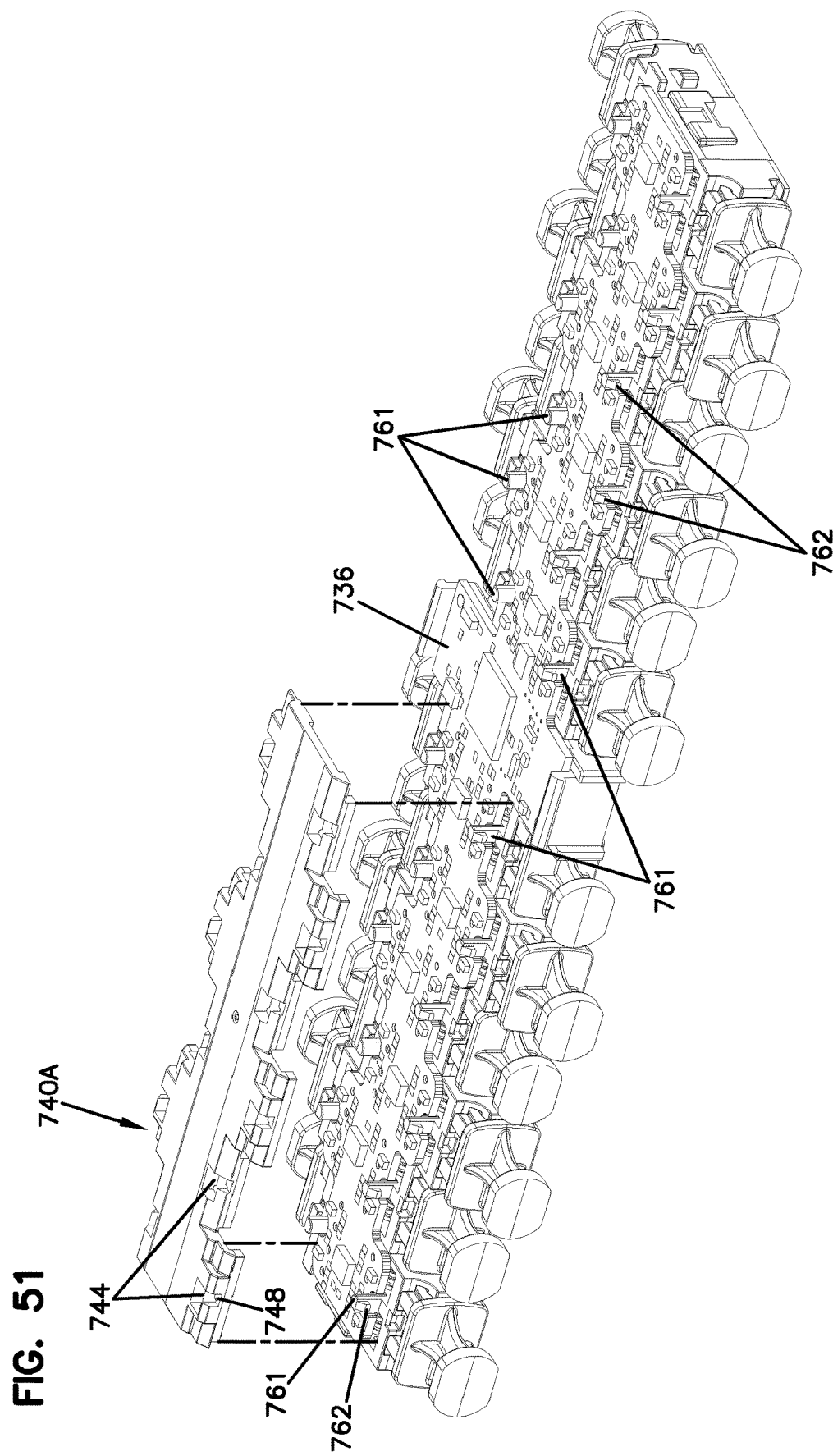
FIGS. 51-55 illustrate steps when latching the cover pieces to the adapter block assembly of FIG. 47.
Figure 52:
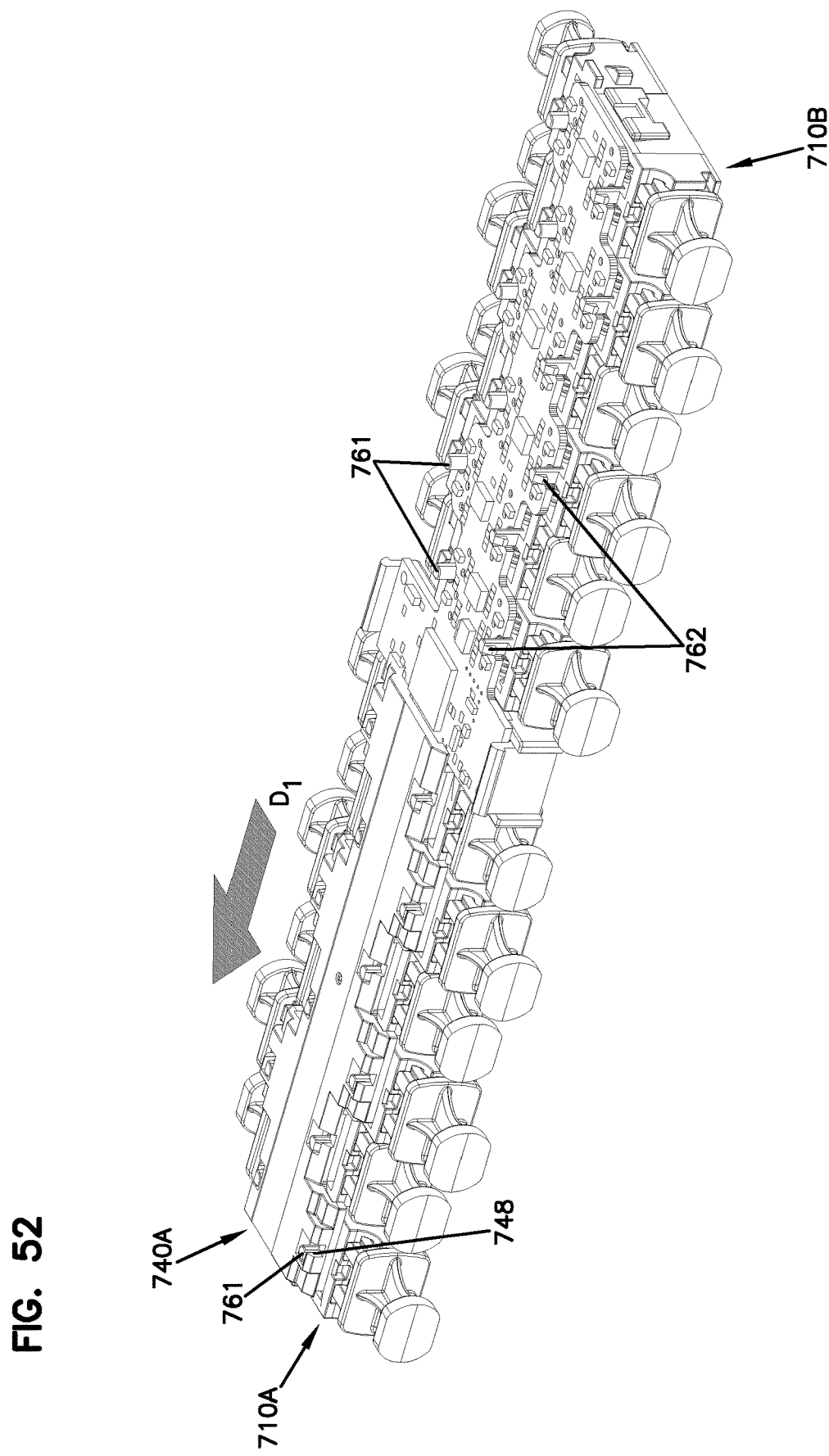
Figure 53:
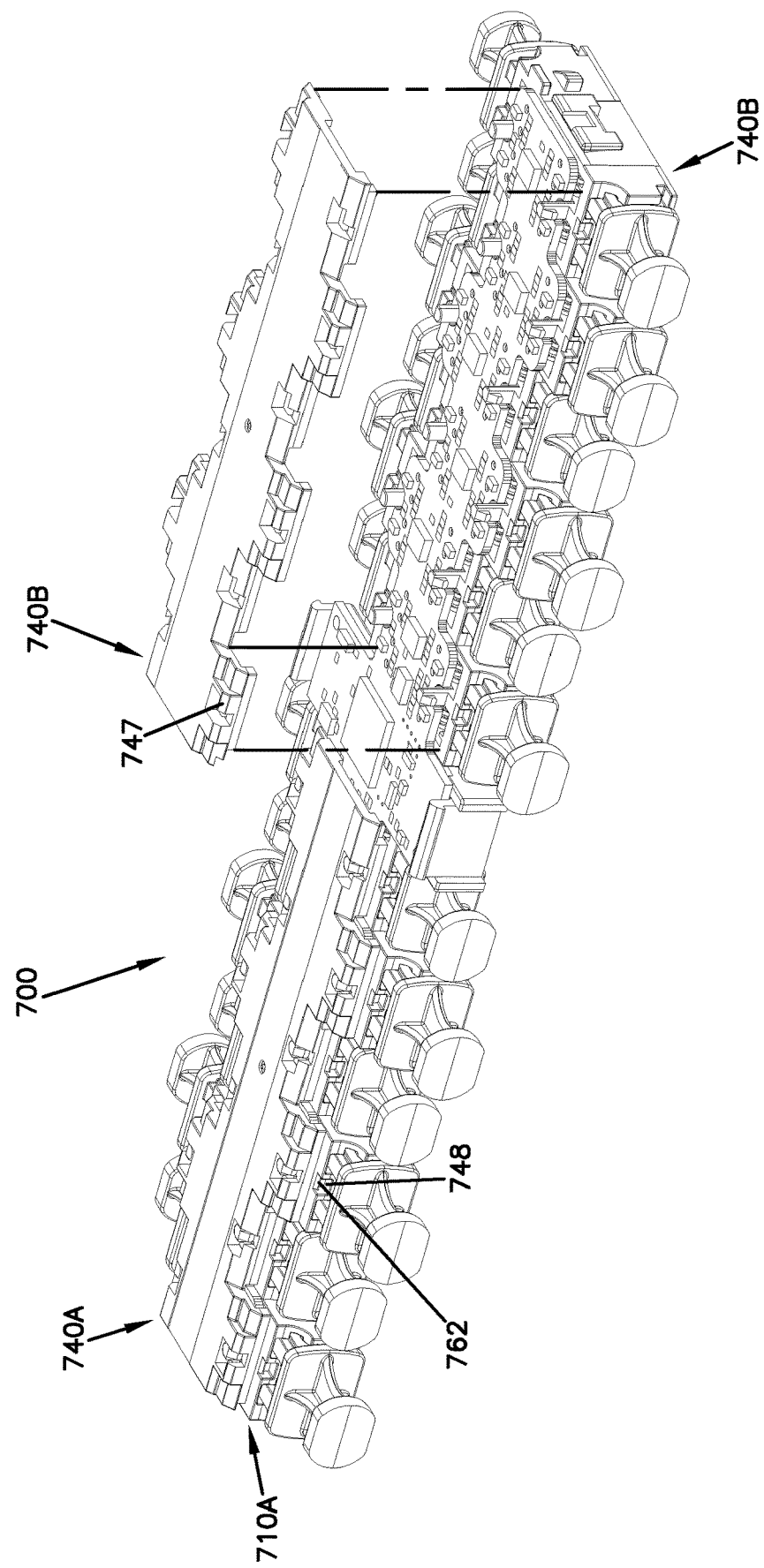

Referring to FIGS. 51-55, the cover arrangement 740 is configured to latch to the adapter block arrangement 710. For example, in some implementations, the adapter block arrangement 710 can include latch arms 761 (FIGS. 51 and 56) that extend upwardly from a top of the adapter blocks 710A, 710B. The latch arms 761 include latch hooks 762 that extend outwardly from the latch arms 761 (FIGS. 51 and 56). In the example shown, a latch arm 761 extends upwardly at each port 712 of the adapter block 710 arrangement. In other implementations, a greater or fewer number of latch arms 761 may extend upwardly from the adapter block arrangement 710.

The cover 740 that is configured to receive the latch arms 761 to secure the cover 740 to the adapter block arrangement 710. The cover 740 also defines through-openings 747 that extend through the cover 740. Each through-opening 747 includes a first portion and a second portion. The first portion is sized to enable the latch hook 762 of the latch arm 761 to pass therethrough. The second portion is sized to inhibit passage of the latch hook 762 therethrough. The cover 740 also defines a platform 748 adjacent the second portion of each through-openings 747.

The first cover piece 740A is mounted to the first adapter block 710A by pressing the first cover piece 740A onto the first adapter block 710A (see FIG. 51). The latch arms 761 (including the latch hooks 762) of the block 710A pass through the first portions of the through-openings 747 of the first cover piece 740A (see FIG. 52). The first cover piece 740A is then slid in a first direction D1 (FIG. 52) so that the through-openings 747 move laterally relative to the latch arms 761 until the latch hooks 762 are disposed over the platforms 748 (see 740A of FIG. 53). In certain implementations, the latch arms 761 are deflected when passing through the first portions of the through-openings 747 and return to normal positions upon entering the second portions of the through-openings 747.

Figure 54:
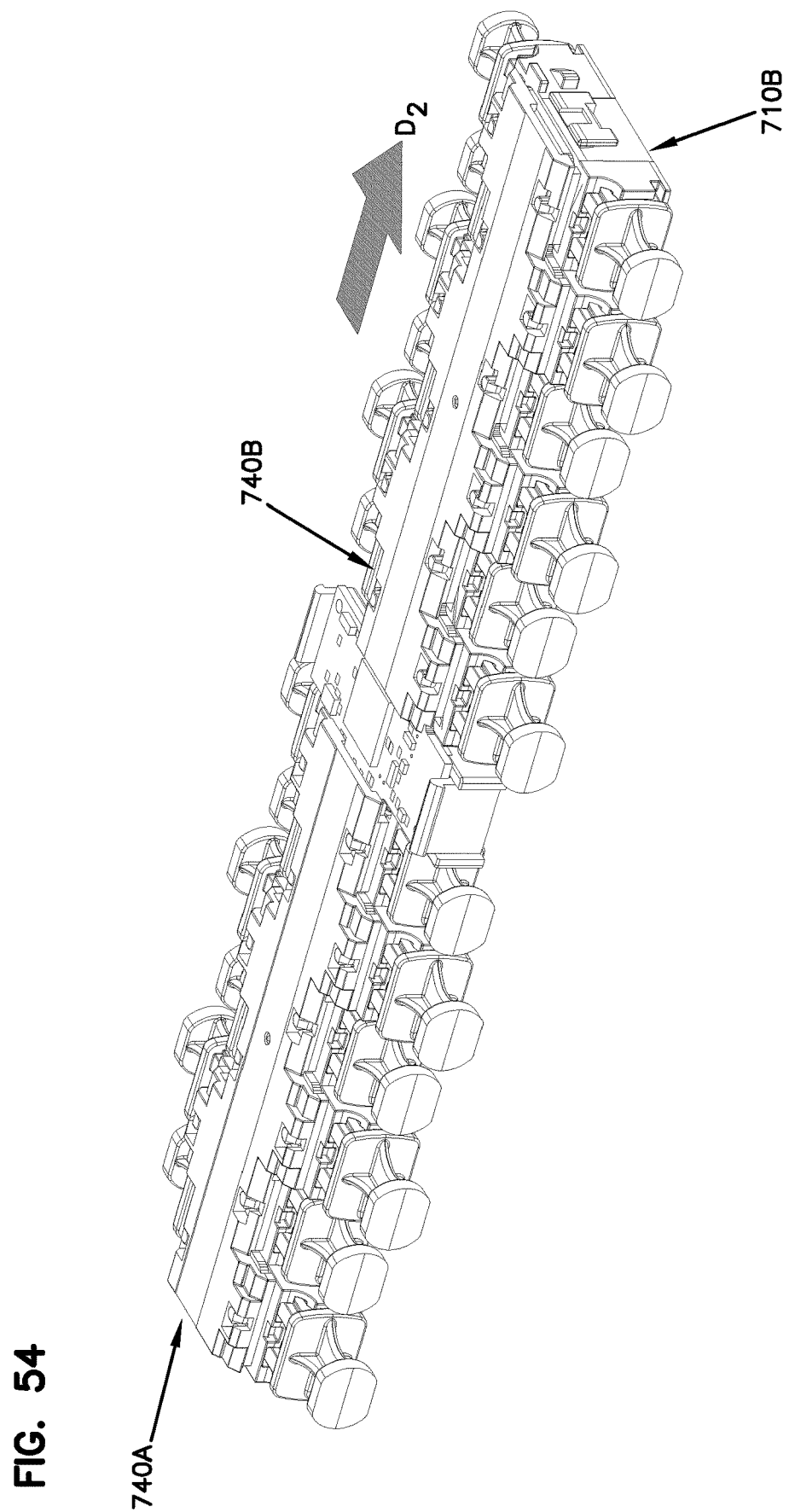
Figure 55:
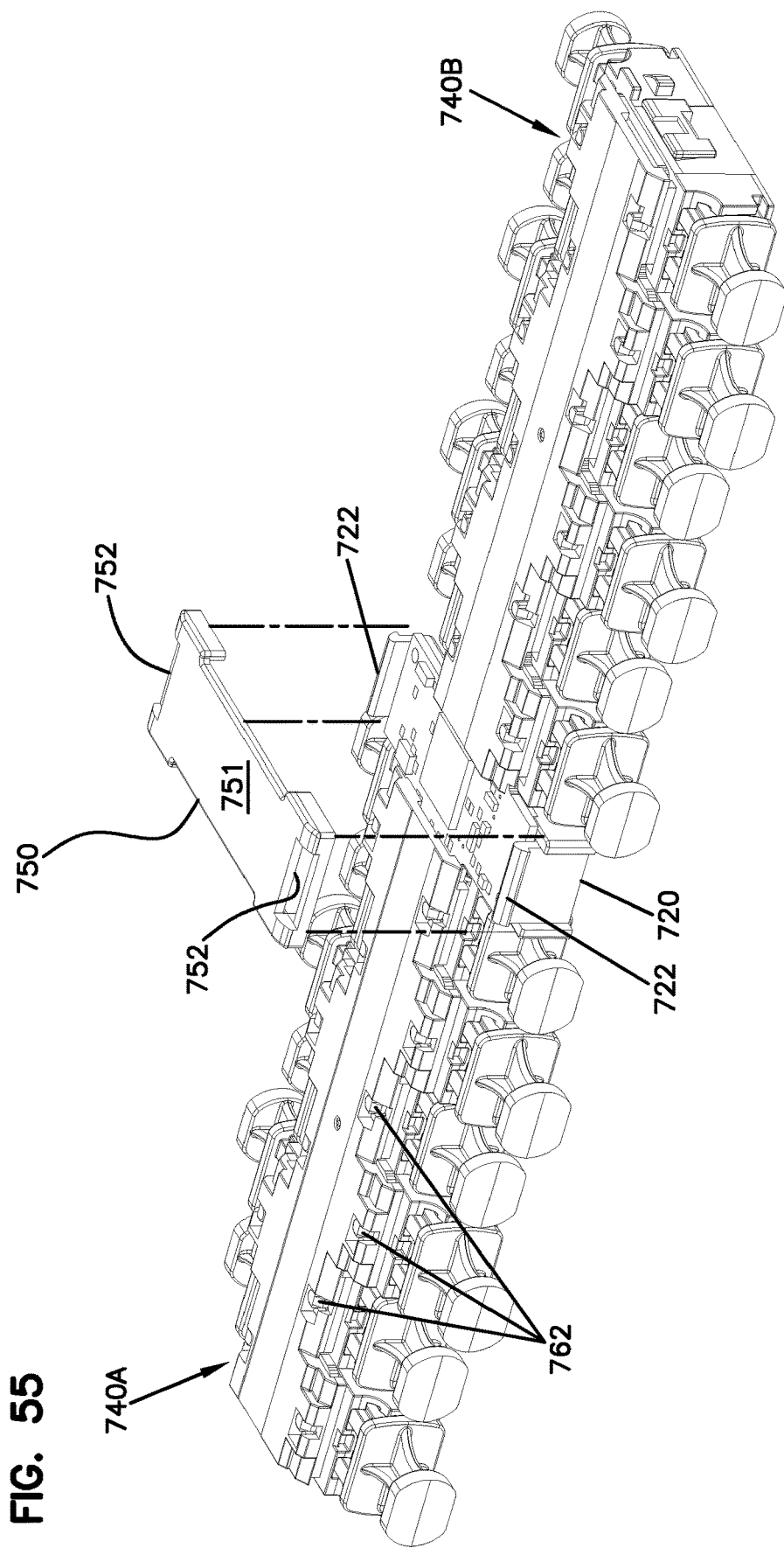

The second cover piece 740B is mounted to the second adapter block 710B using the same process, but sliding the second cover piece 740B in a second direction D2 that is opposite the first direction D1 (see FIG. 54). The intermediate cover 750 is positioned over the circuit board 730 between the first and second cover pieces 740A, 740B (FIG. 55). The intermediate cover 750 inhibits movement of the cover pieces 740A, 740B that would otherwise align the latch arms 761 with the through-openings 748. Accordingly, the intermediate cover 750 inhibits removal of the cover pieces 740A, 740B from the adapter block arrangement 710.

In the example shown, the intermediate cover 750 includes a body 751 defining latching slots 752 that align with latch arms 722 on the joining member 720. The latch arms 722 snap into the latching slots 752 when the intermediate cover 750 is positioned over the intermediate portion 736 of the circuit board, which seats on the joining member 720. In other implementations, the intermediate cover 750 can otherwise be coupled to the adapter block 710.

Figure 48:
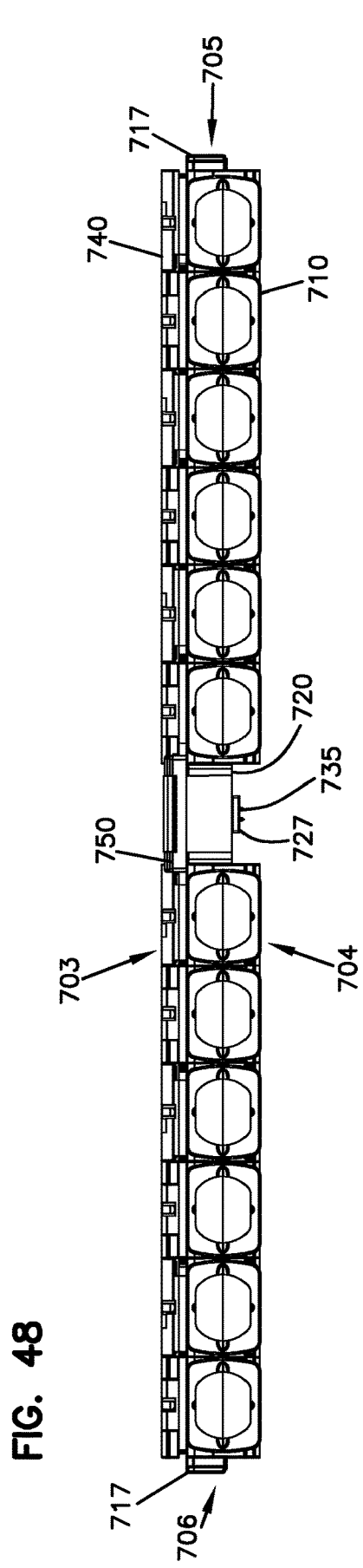
FIG. 48 is a front view of the adapter block assembly of FIG. 47 with part of a forward shroud being visible.
Figure 49:
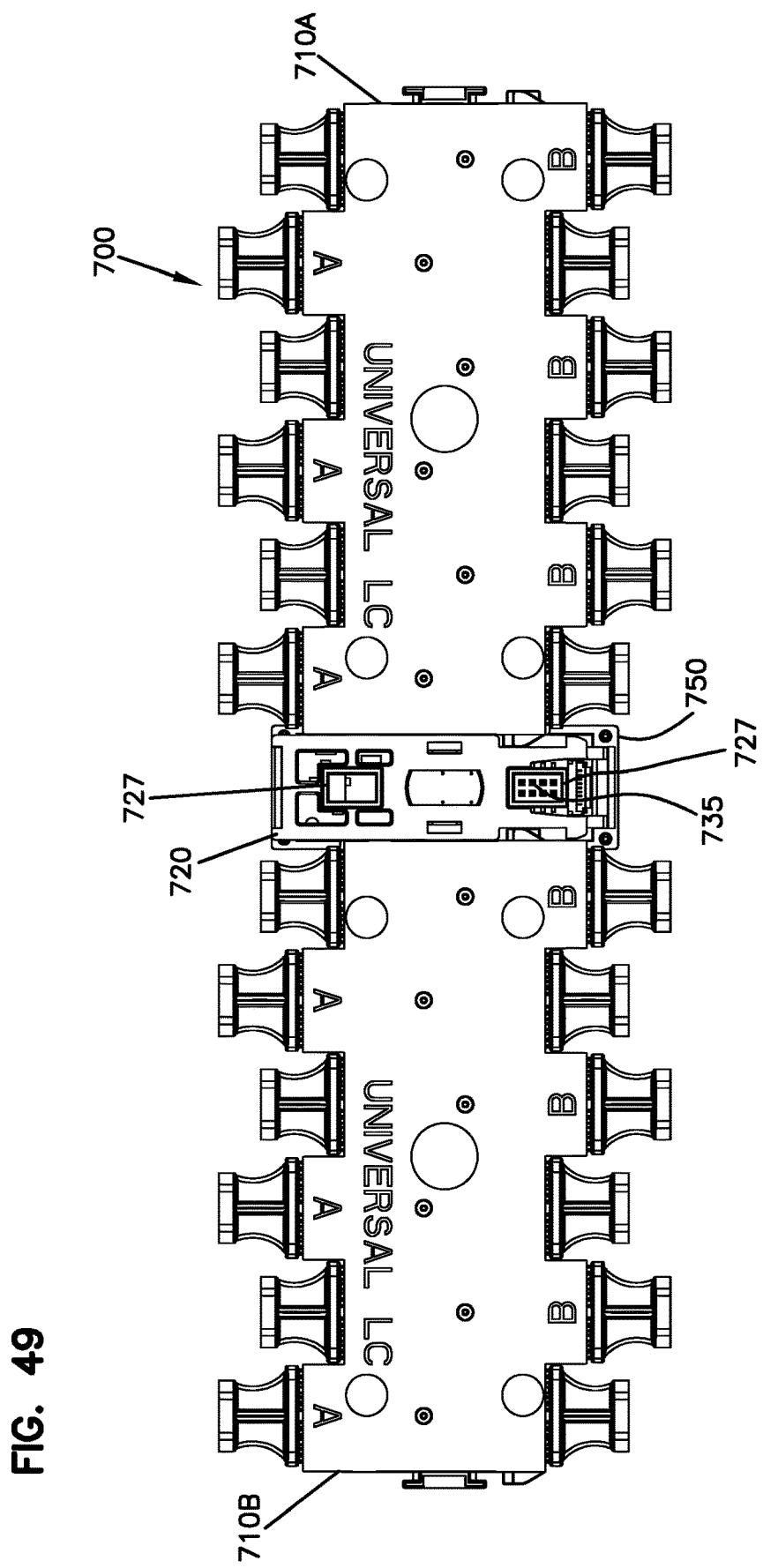
FIG. 49 is a bottom plan view of the adapter block assembly of FIG. 47.

In some implementations, the adapter block assembly 700 is configured to be coupled to a tray (e.g., tray 250 of FIGS. 19-20), or other such structure. In certain implementations, each adapter block assembly 700 includes an engagement member 717 that extends outwardly from at least one side 705, 706 of the adapter block 710 (FIG. 48). In the example shown, an engagement member 717 extends outwardly from both sides 705, 706 of the adapter block 710. In certain implementations, the engagement member 717 has an H-shaped profile when viewed from the side 705, 706 the adapter block arrangement 710. For example, the engagement member 717 can have a two L-shaped flanges extending outwardly from the side 705, 706 of the adapter block 710; a shelf extending between the flanges, and a ramp or tapered section extending inwardly from the shelf towards the side 705, 706.

In certain implementations, the joining member 720 includes latch fingers 725 configured to latch to the engagement members 717 of adapter blocks 710. For example, a joining member 720 may have a first latch finger that hooks to the engagement member at a first side 705 of a first adapter block 710A and a second latch finger 725 that hooks to the engagement member 717 at a second side 706 of a second adapter block 710B. In certain examples, the joining member 720 couples the adapter blocks 710A, 710B together so that front ports 712 of the adapter blocks 710A, 710B extend along a common plane.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An optical adapter block assembly comprising:
   (a) an adapter block extending along a length between opposite first and second ends, along a height between a top and a bottom, and along a depth between a front and a rear, the adapter block defining a plurality of front ports at the front, the top of the adapter block including a top surface that extends along the length of the adapter block and along the depth of the adapter block, the top surface defining a plurality of apertures, each aperture being aligned with one of the front ports;
   (b) first and second engagement members disposed at the first and second ends, respectively, of the adapter block;
   (c) a circuit board extending over the top surface of the adapter block to cover the apertures, the circuit board having opposite first and second major sides, the first major side facing the apertures and carrying a plurality of presence sensing arrangements, each presence sensing arrangement protruding into one of the apertures of the adapter block; and
   (d) a cover mounted over the second major side of the circuit board, the cover being mechanically attached to the adapter block to sandwich at least a portion of the circuit board therebetween, the cover having a height that is smaller than the height of the adapter block.

2. The optical adapter block assembly of claim 1, wherein the adapter block is a first adapter block, and wherein the optical adapter block assembly further comprises:
   (e) a second adapter block coupled to the first adapter block, the second adapter block being identical to the first adapter block; and
   (f) a second cover mechanically attached to the second adapter block to sandwich another portion of the circuit board therebetween.

3. The optical adapter block assembly of claim 2, further comprising a joining member coupling together the first and second adapter blocks.

4. The optical adapter block assembly of claim 3, wherein the joining member couples to the second engagement member of the first adapter block and to the first engagement member of the second adapter block.

5. The optical adapter block assembly of claim 3, wherein the joining member includes a shroud through which a circuit board connector extends from the first major side of the circuit board.

6. The optical adapter block assembly of claim 1, wherein the front ports are disposed in a row extending along the length of the adapter block.

7. The optical adapter block assembly of claim 1, wherein the front ports are disposed in first and second rows extending along the length of the adapter block, the first row being disposed forwardly of the second row.

8. The optical adapter block assembly of claim 1, wherein the adapter block defines a plurality of rear ports aligned with the front ports.

9. The optical adapter block assembly of claim 1, wherein the optical adapter block assembly is mounted to a blade to slidably mount within a chassis.

10. The optical adapter block assembly of claim 1, wherein the front ports include LC ports.

11. The optical adapter block assembly of claim 1, wherein the front ports include twelve front ports.

12. The optical adapter block assembly of claim 1, wherein the front ports include twenty-four front ports.

13. The optical adapter block assembly of claim 1, wherein the presence sensing arrangements each include a deflectable portion extending through the respective aperture into an interior of the adapter block.

14. The optical adapter block assembly of claim 13, wherein the presence sensing arrangements each include first and second contacts configured to short together when actuated.

15. The optical adapter block assembly of claim 1, wherein the cover is latched to the adapter block.

16. The optical adapter block assembly of claim 1, wherein the cover is heat staked to the adapter block.

17. An optical adapter block assembly comprising:
   (a) a first adapter block extending along a length between opposite first and second ends, the first end of the first adapter block carrying a first engagement member and the second end of the first adapter block carrying a second engagement member, the first adapter block defining a first plurality of front ports;
   (b) a second adapter block extending along a length between opposite first and second ends, the first end of the second adapter block carrying a first engagement member and the second end of the second adapter block carrying a second engagement member, the second adapter block defining a second plurality of front ports;
   (c) a joining member coupled to the second engagement member of the first adapter block and to the first engagement member of the second adapter block;
   (d) a circuit board extending over the first adapter block, the joining member, and the second adapter block, the circuit board carrying a plurality of presence sensing arrangements; and (d) a cover arrangement mechanically attached to the first and second adapter blocks to sandwich the circuit board therebetween.

18. The optical adapter block assembly of claim 17, wherein each presence sensing arrangement protrudes into one of the first and second adapter blocks.

19. The optical adapter block assembly of claim 17, wherein each presence sensing arrangement includes a deflectable portion extending through a respective aperture into an interior of one of the first and second adapter blocks.

20. The optical adapter block assembly of claim 17, wherein each of the first and second pluralities of front ports includes twelve front ports.

\* \* \* \* \*